(12) United States Patent
Adogla et al.

(10) Patent No.: US 12,445,419 B2
(45) Date of Patent: Oct. 14, 2025

(54) METADATA CUSTOMIZATION FOR VIRTUAL PRIVATE LABEL CLOUDS

(71) Applicant: Oracle International Corporation, Redwood Shores, CA (US)

(72) Inventors: Eden Grail Adogla, Seattle, WA (US); Thomas Werner Kuehnel, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 220 days.

(21) Appl. No.: 18/468,024

(22) Filed: Sep. 15, 2023

(65) Prior Publication Data
US 2024/0098089 A1 Mar. 21, 2024

Related U.S. Application Data

(60) Provisional application No. 63/407,571, filed on Sep. 16, 2022.

(51) Int. Cl.
*H04L 9/40* (2022.01)
*G06F 9/455* (2018.01)
(Continued)

(52) U.S. Cl.
CPC ...... *H04L 63/0485* (2013.01); *G06F 9/45558* (2013.01); *G06Q 10/10* (2013.01);
(Continued)

(58) Field of Classification Search
CPC . H04L 41/5041; H04L 67/10; H04L 63/0485; G06Q 30/018; G06Q 30/0641; G06Q 20/4014
See application file for complete search history.

(56) References Cited

U.S. PATENT DOCUMENTS 10,318,265 B1 6/2019 To et al.
10,528,995 B2 1/2020 Maes
(Continued)

FOREIGN PATENT DOCUMENTS

CA 2804864 C 11/2018
CA 3159014 A1 6/2021
(Continued)

OTHER PUBLICATIONS

10 Reasons to Become an AwesomeCloud Channel Partner, Available online at: https://www.awesomecloud.com/about/why-awesomecloud/, 2023, 3 pages.
(Continued)

*Primary Examiner* — Barbara B Anyan
(74) *Attorney, Agent, or Firm* — Kilpatrick Townsend & Stockton LLP

(57) ABSTRACT

Novel techniques are disclosed for providing vPLC-specific metadata service including customized vPLC-specific metadata. In certain embodiments, each vPLC may generate a customized metadata using its corresponding vPLC-specific customization instructions. In some embodiments, a vPLC-specific metadata service may be performed using pre-generated customized vPLC-specific metadata, on-the-fly customized metadata, pre-generated CSP-format metadata, or combinations thereof.

20 Claims, 28 Drawing Sheets

(51) Int. Cl.
- *G06Q 10/10* (2023.01)
- *G06Q 20/38* (2012.01)
- *G06Q 20/40* (2012.01)
- *G06Q 30/018* (2023.01)
- *G06Q 30/04* (2012.01)
- *G06Q 30/0601* (2023.01)
- *G06Q 50/40* (2024.01)
- *H04L 41/5041* (2022.01)
- *H04L 67/10* (2022.01)

(52) U.S. Cl.
CPC ....... *G06Q 20/382* (2013.01); *G06Q 20/4014* (2013.01); *G06Q 30/018* (2013.01); *G06Q 30/04* (2013.01); *G06Q 30/0603* (2013.01); *G06Q 30/0641* (2013.01); *G06Q 50/40* (2024.01); *H04L 41/5041* (2013.01); *H04L 63/0272* (2013.01); *H04L 63/10* (2013.01); *H04L 63/107* (2013.01); *H04L 67/10* (2013.01); *G06F 2009/45583* (2013.01); *G06F 2009/45595* (2013.01)

(56) References Cited

U.S. PATENT DOCUMENTS

| | | |
|---|---|---|
| 11,121,985 B2 | 9/2021 | Cidon et al. |
| 11,537,745 B2 | 12/2022 | Yang et al. |
| 11,574,151 B2 | 2/2023 | Wang et al. |
| 11,853,753 B1 | 12/2023 | Chawda et al. |
| 12,067,493 B2 | 8/2024 | Zhang et al. |
| 2010/0131624 A1 | 5/2010 | Ferris |
| 2012/0131162 A1 | 5/2012 | Brandt et al. |
| 2013/0054426 A1 | 2/2013 | Rowland et al. |
| 2013/0111027 A1 | 5/2013 | Milojicic et al. |
| 2013/0226699 A1 | 8/2013 | Long |
| 2013/0282540 A1 | 10/2013 | Bliesner |
| 2014/0007041 A1 | 1/2014 | Schmeling et al. |
| 2014/0236745 A1 | 8/2014 | Vautour |
| 2015/0363852 A1 | 12/2015 | Vautour |
| 2016/0125489 A1 | 5/2016 | Gupte et al. |
| 2016/0132806 A1 | 5/2016 | To et al. |
| 2017/0069011 A1 | 3/2017 | Akkiraju et al. |
| 2018/0025399 A1 | 1/2018 | Nedeltchev et al. |
| 2019/0104035 A1 | 4/2019 | Cidon et al. |
| 2019/0182153 A1 | 6/2019 | Gundavelli et al. |
| 2020/0244549 A1 | 7/2020 | Finch et al. |
| 2020/0250661 A1 | 8/2020 | Padmanabhan et al. |
| 2021/0067372 A1 | 3/2021 | Cidon et al. |
| 2022/0263793 A1 | 8/2022 | Baker et al. |
| 2023/0315726 A1 | 10/2023 | Ponjavic et al. |
| 2023/0328003 A1 | 10/2023 | Agarwal et al. |
| 2024/0095056 A1* | 3/2024 | Adogla .............. G06Q 30/0641 |
| 2024/0095739 A1* | 3/2024 | Adogla .................. H04L 67/10 |
| 2024/0095809 A1* | 3/2024 | Adogla ................ G06Q 30/018 |
| 2024/0095865 A1* | 3/2024 | Adogla .............. G06Q 20/4014 |
| 2024/0098088 A1* | 3/2024 | Adogla .................. H04L 67/10 |
| 2024/0098089 A1* | 3/2024 | Adogla ................... G06Q 10/10 |
| 2024/0106832 A1* | 3/2024 | Adogla .............. H04L 41/5041 |
| 2024/0362142 A1 | 10/2024 | Berg et al. |

FOREIGN PATENT DOCUMENTS

| | | |
|---|---|---|
| CN | 102656589 A | 9/2012 |
| CN | 104106276 A | 10/2014 |
| CN | 108197493 A | 6/2018 |
| WO | 2010088081 A1 | 8/2010 |
| WO | 2012006638 A1 | 1/2012 |
| WO | 2020252088 A1 | 12/2020 |
| WO | 2021051933 A1 | 3/2021 |
| WO | 2022104396 A1 | 5/2022 |

OTHER PUBLICATIONS

Awesome Cloud Services, Available online at: https://www.awesomecloud.com/about/, Accessed from internet on Jan. 18, 2023, 2 pages.
Azure Marketplace Service Providers Guide, Available online at: https://docs.azure.cn/en-us/articles/azure-marketplace/publishguide, Mar. 9, 2021, 9 pages.
Cloud Reseller Program Overview, Available online at: https://www.awesomecloud.com/cloud-reseller-program/, 2023, 3 pages.
Create a Private Marketplace, Available online at: https://cloud.google.com/marketplace/docs/governance/private-marketplace, Accessed from internet on Jan. 18, 2023, 2 pages.
Direct As-a-Service Sales Platform, Available online at: https://www.appxite.com/cloud-saas-sellers, 2022, 3 pages.
Drive Revenue by Selling in AWS Marketplace, Available online at: https://aws.amazon.com/marketplace/partners/management-tour, Accessed from internet on Jan. 18, 2023, 7 pages.
Enable Google Private Marketplace, Available online at: https://cloud.google.com/marketplace/docs/governance/enable-private-marketplace, Accessed from internet on Jan. 18, 2023, 2 pages.
Google Cloud Platform Services Summary, Available online at: https://cloud.google.com/terms/services, Accessed from internet on Jan. 18, 2023, 25 pages.
Marketplace Management, Available online at: https://www.appxite.com/platform/manage-marketplace?hsLang=en, 2022, 4 pages.
Marketplace Setup, Available online at: https://www.appxite.com/platform/launch-marketplace?hsLang=en, 2022, 3 pages.
Organization Governance for Google Cloud Marketplace, Available online at: https://cloud.google.com/marketplace/docs/governance, Accessed from internet on Jan. 18, 2023, 1 page.
Power your Cloud Business with StreamOne Cloud Marketplace, Available online at: https://asia.techdata.com/sg/wp-content/uploads/2021/01/SCM_TD_10.23.pdf, 2 pages.
Private Marketplace, Available online at: https://aws.amazon.com/marketplace/features/privatemarketplace, 2023, 4 pages.
Private-Labeled Cloud for Resellers with Cloud Connex, Available online at: https://ananova.com/news/story/sm_755269, 2023, 6 pages.
Resell Cloud Marketplace Products from Independent Software Vendors (ISVs), Available online at: https://cloud.google.com/marketplace/docs/partners/resell, Accessed from internet on Jan. 18, 2023, 1 page.
Set up your Cloud Marketplace Products for Resale, Available online at: https://cloud.google.com/marketplace/docs/partners/resell/set-up-reselling, Accessed from internet on Jan. 18, 2023, 2 pages.
Want to Resell Public Cloud Services?, Available online at: https://ngkloud.com/resell-public-cloud/, 2021, 3 pages.
What is AWS Marketplace, Available online at: https://docs.aws.amazon.com/marketplace/latest/userguide/what-is-marketplace.html, Accessed from internet on Jan. 18, 2023, 5 pages.
What is Azure Marketplace?, Available online at: https://learn.microsoft.com/en-us/marketplace/azure-marketplace-overview?source=recommendations, Dec. 30, 2022, 9 pages.
What is Google Cloud Marketplace?, Available online at: https://cloud.google.com/marketplace/docs, Accessed from internet on Jan. 18, 2023, 2 pages.
"CNAME Record", Wikipedia, Available Online at: https://en.wikipedia.org/w/index.php?title=CNAME_record&oldId=1105641340, Accessed from Internet on Jan. 24, 2024, 4 pages.
"Dedicated Region Cloud@Customer", Available Online at: https://web.archive.org/web/20220705140320if_/https://www.oracle.com/a/ocom/docs/cloud/dedicated-region-cloud-customer-product-brief.pdf, Jul. 5, 2022, 4 pages.
International Application No. PCT/US2023/074322, International Search Report and Written Opinion, mailed on Nov. 22, 2023, 12 pages.
International Application No. PCT/US2023/074323, International Search Report and the Written Opinion, mailed on Nov. 22, 2023, 15 pages.
International Application No. PCT/US2023/074325, International Search Report and the Written Opinion, mailed on Nov. 22, 2023, 13 pages.
International Application No. PCT/US2023/074330, International Search Report and the Written Opinion, mailed on Dec. 19, 2023, 14 pages.

(56) References Cited

OTHER PUBLICATIONS

International Application No. PCT/US2023/074341, International Search Report and Written Opinion, mailed on Dec. 8, 2023, 15 pages.
International Application No. PCT/US2023/074342, International Search Report and Written Opinion, mailed on Dec. 8, 2023, 13 pages.
International Application No. PCT/US2023/074343, International Search Report and Written Opinion, mailed on Jan. 29, 2024, 13 pages.
International Application No. PCT/US2023/074344, International Search Report and Written Opinion, mailed On Dec. 19, 2023, 13 pages.
Machine translation of CN 102656589 A, published on Sep. 5, 2012, 228 pages.
Machine translation of CN 104106276 A, published on Oct. 15, 2014, 347 pages.
Machine translation of CN 108197493 A, published on Jun. 22, 2018, 43 pages.
U.S. Appl. No. 18/368,870, Non-Final Office Action mailed on Mar. 31, 2025, 11 pages.
U.S. Appl. No. 18/368,884, Non-Final Office Action mailed on Mar. 6, 2025, 44 pages.
U.S. Appl. No. 18/468,037, Non-Final Office Action mailed on Mar. 20, 2025, 8 pages.
International Application No. PCT/US2023/074322, International Preliminary Report on Patentability mailed on Mar. 27, 2025, 9 pages.
International Application No. PCT/US2023/074323, International Preliminary Report on Patentability mailed on Mar. 27, 2025, 10 pages.
International Application No. PCT/US2023/074325, International Preliminary Report on Patentability mailed on Mar. 27, 2025, 10 pages.
International Application No. PCT/US2023/074330, International Preliminary Report on Patentability mailed on Mar. 27, 2025, 10 pages.
International Application No. PCT/US2023/074341, International Preliminary Report on Patentability mailed on Mar. 27, 2025, 11 pages.
International Application No. PCT/US2023/074342, International Preliminary Report on Patentability mailed on Mar. 27, 2025, 10 pages.
International Application No. PCT/US2023/074343, International Preliminary Report on Patentability mailed on Mar. 27, 2025, 9 pages.
International Application No. PCT/US2023/074344, International Preliminary Report on Patentability mailed on Mar. 27, 2025, 10 pages.
U.S. Appl. No. 18/468,044, Non-Final Office Action mailed on May 19, 2025, 22 pages.
U.S. Appl. No. 18/468,047, Non-Final Office Action mailed on May 23, 2025, 11 pages.

* cited by examiner

1900

```
┌─────────────────────────────────────────────────────────────────────────┐
│ Receive information identifying a host region in a host realm where a vPLC to be │
│              created is to be physically hosted 1902                    │
└─────────────────────────────────────────────────────────────────────────┘
                                     ↓
┌─────────────────────────────────────────────────────────────────────────┐
│ Receive information identifying a region in a particular realm, where the particular │
│ realm is different from the host realm received in 1902, that are to be configured │
│       as the virtual region and virtual realm for the vPLC to be created 1904 │
└─────────────────────────────────────────────────────────────────────────┘
                                     ↓
┌─────────────────────────────────────────────────────────────────────────┐
│   Obtain identity and trust profile information for the particular realm identified in │
│                              1904  1906                                 │
└─────────────────────────────────────────────────────────────────────────┘
                                     ↓
┌─────────────────────────────────────────────────────────────────────────┐
│ Generate a vPLC ID for the vPLC to be created, where the vPLC ID identifies the │
│         region and particular realm identified in 1904  1908            │
└─────────────────────────────────────────────────────────────────────────┘
                                     ↓
┌─────────────────────────────────────────────────────────────────────────┐
│   Create the vPLC and allocate resources to the vPLC, where the allocated │
│ resources are selected from resources in infrastructure provided by the CSP in │
│    the region identified in 1902 that is in the realm identified in 1902  1910 │
└─────────────────────────────────────────────────────────────────────────┘
                                     ↓
┌─────────────────────────────────────────────────────────────────────────┐
│  Configure the vPLC using the identity and trust profile information obtained in │
│                              1906  1912                                 │
└─────────────────────────────────────────────────────────────────────────┘
                                     ↓
┌─────────────────────────────────────────────────────────────────────────┐
│ vPLC communicates with CSP-provided infrastructure in the the particular realm │
│                     identified in 1904  1914                            │
└─────────────────────────────────────────────────────────────────────────┘
```

FIG. 19

2100
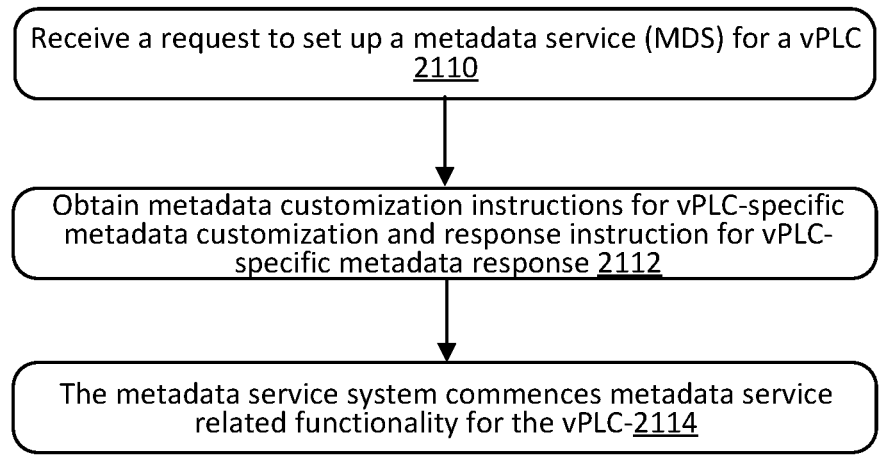
FIG. 21

METADATA CUSTOMIZATION FOR VIRTUAL PRIVATE LABEL CLOUDS

CROSS-REFERENCES TO RELATED APPLICATIONS

This application is a non-provisional of and claims the benefit and priority under 35 U.S.C. 119(e) U.S. Provisional Application No. 63/407,571, titled "VIRTUAL PRIVATE LABEL CLOUD," and filed on Sep. 16, 2022, which is incorporated herein by reference in its entirety for all purposes.

This application is also related to the following applications. The entire contents of each of the following applications are incorporated herein by reference for all purposes.
(1) Non-provisional application Ser. No. 18/368,881, titled "VIRTUAL PRIVATE LABEL CLOUDS" filed concurrently with the present application;
(2) Non-provisional application Ser. No. 18/368,863, titled "CONSOLE CUSTOMIZATION FOR VIRTUAL PRIVATE LABEL CLOUDS" filed concurrently with the present application;
(3) Non-provisional application Ser. No. 18/368,870, titled "RESOURCE ALLOCATION FOR VIRTUAL PRIVATE LABEL CLOUDS" filed concurrently with the present application;
(4) Non-provisional application Ser. No. 18/368,877, titled "ENDPOINTS FOR VIRTUAL PRIVATE LABEL CLOUDS" filed concurrently with the present application;
(5) Non-provisional application Ser. No. 18/368,884, titled "IDENTITY MANAGEMENT FOR VIRTUAL PRIVATE LABEL CLOUDS" filed concurrently with the present application;
(6) Non-provisional application Ser. No. 18/468,037, titled "REMOTE DATA PLANES FOR VIRTUAL PRIVATE LABEL CLOUDS" filed concurrently with the present application;
(7) Non-provisional application Ser. No. 18/468,238, titled "CONNECTIVITY FOR VIRTUAL PRIVATE LABEL CLOUDS" filed concurrently with the present application;
(8) Non-provisional application Ser. No. 18/468,047, titled "RESOURCE USAGE MONITORING, BILLING AND ENFORCEMENT FOR VIRTUAL PRIVATE LABEL CLOUDS" filed concurrently with the present application; and
(9) Non-provisional application Ser. No. 18/468,044, titled "CLOUD INFRASTRUCTURE-BASED ONLINE PUBLISHING PLATFORMS FOR VIRTUAL PRIVATE LABEL CLOUDS" filed concurrently with the present application.

FIELD

The present disclosure generally relates to techniques for providing cloud services. More specifically, novel techniques are disclosed for providing vPLC-specific metadata service, including customized vPLC-specific metadata. A vPLC may be created for a reseller of a Cloud Services Provider (CSP) using CSP-provided infrastructure in a region and used for providing one or more reseller-offered cloud services to customers of the reseller.

BACKGROUND

Cloud computing has gradually become a part of modern life and plays a significant role in everyday activities because of its ubiquitous presence and ease of access to essential data. However, there are only a few players in the cloud infrastructure business, just like in the early telecommunication era. Thus, there is a need to make cloud infrastructure services more widely available.

BRIEF SUMMARY

The present disclosure generally relates to techniques for providing cloud services. More specifically, novel techniques are disclosed for providing vPLC-specific metadata service, including customized vPLC-specific metadata. A vPLC is created for a reseller of a Cloud Services Provider (CSP) using CSP-provided infrastructure in a region such that the reseller can provide one or more reseller-offered cloud services to customers of the reseller. Various embodiments are described herein, including methods, systems, non-transitory computer-readable storage media storing programs, code, or instructions executable by one or more processors, and the like.

The present disclosure generally relates to techniques for providing cloud services. More specifically, novel techniques are disclosed that enable cloud infrastructure in a region provided by a Cloud Services Provider (CSP), for providing CSP-offered cloud services to customers of the CSP, to be used to create one or more virtual private clouds (referred to herein as virtual private label clouds or "vPLCs"). Various embodiments are described herein, including methods, systems, non-transitory computer-readable storage media storing programs, code, or instructions executable by one or more processors, and the like.

The vPLCs created according to the various techniques described in this disclosure may be used for different purposes. For example, in one use case, a vPLC may be created for a reseller who is a customer of the CSP and can be used by the reseller to provide one or more reseller-offered cloud services to customers of the reseller. As another use case, a vPLC may be used as a virtual data center and may be associated with a different realm than the realm associated with the cloud infrastructure in the region provided by the CSP.

In certain implementations, a vPLC represents a virtual cloud comprising a set of resources that have been allocated to the vPLC from the CSP-provided infrastructure in a region. One or more vPLCs can be created using CSP-provided infrastructure in a region.

In certain embodiments, regional infrastructure provided by a CSP in a region can be used both to provide cloud services to customers of the CSP and also reseller-offered cloud services to customer of a reseller, who is a customer of the CSP. This is achieved by creating, from the CSP-provided regional infrastructure, one or more vPLCs for one or more resellers, where a vPLC created for a particular reseller can be used to provide reseller-offered and reseller-branded cloud services to customers of the particular reseller. This enables a reseller to become a provider of reseller-branded cloud services to its customers without having to invest in the infrastructure needed for providing those cloud services. Instead, the reseller uses infrastructure provided by the CSP to provide the reseller-branded cloud services to the reseller's customers. In this manner, a first portion of the infrastructure provided in a region by the CSP can be used to provide CSP-offered cloud services to customers of the CSP, a second portion of the infrastructure provided in the region by the CSP and allocated to a first vPLC created for a first reseller can be used to provide first reseller-offered cloud services to customers of the first reseller, a third portion of the infrastructure provided in the region by the CSP and allocated to a second vPLC created for a second reseller can be used to provide second reseller-offered cloud services to customers of the second reseller, and so on.

In certain embodiments, techniques are provided including a method that comprises creating a first virtual private label cloud (vPLC) for a first reseller based upon a cloud service provider (CSP)-provided infrastructure in a region, wherein creating the first vPLC comprises allocating a first portion of the CSP-provided infrastructure to the first vPLC; creating a second vPLC for a second reseller based upon the CSP-provided infrastructure, wherein creating the second vPLC comprises allocating a second portion of the CSP-provided infrastructure to the second vPLC; using the first vPLC to provide one or more first reseller-offered cloud services to one or more customers of the first reseller; using the second vPLC to provide one or more second reseller-offered cloud services to one or more customers of the second reseller; creating a first set of metadata customization instructions for the first vPLC; creating a second set of metadata customization instructions for the second vPLC; generating a first customized metadata associated with the first vPLC based at least upon the first set of metadata customization instructions; and generating a second customized metadata associated with the second vPLC based at least upon the second set of metadata customization instructions.

In yet another embodiment, the first set of metadata customization instructions for the first vPLC is different from the second set of metadata customization instructions for the second vPLC.

In yet another embodiment, generating the first customized metadata associated with the first vPLC is performed independent of generating the second customized metadata associated with the second vPLC.

In yet another embodiment, generating the first customized metadata associated with the first vPLC occurs before receiving a request for the first customized metadata associated with the first vPLC.

In yet another embodiment, the method further comprises storing the first customized metadata associated with the first vPLC in a repository before receiving the request.

In yet another embodiment, generating the first customized metadata associated with the first vPLC comprises: obtaining a raw metadata associated with the first vPLC before receiving the request; and applying the first set of metadata customization instructions to the obtained raw metadata associated with the first vPLC before receiving the request.

In yet another embodiment, generating the first customized metadata associated with the first vPLC occurs upon receiving a request for the first customized metadata associated with the first vPLC.

In yet another embodiment, generating the first customized metadata associated with the first vPLC comprises: obtaining a raw metadata associated with the first vPLC upon receiving the request; and applying the first set of metadata customization instructions to the obtained raw metadata associated with the first vPLC.

In yet another embodiment, generating the first customized metadata associated with the first vPLC comprises: obtaining a raw metadata associated with the first vPLC before receiving the request; and applying the first set of metadata customization instructions to the obtained raw metadata associated with the first vPLC upon receiving the request.

In yet another embodiment, the method further comprises storing the first customized metadata associated with the first vPLC in a repository before receiving the request.

In various embodiments, a system is provided that includes one or more data processors and a non-transitory computer readable medium containing instructions which, when executed on the one or more data processors, cause the one or more data processors to perform part or all of one or more methods disclosed herein.

In various embodiments, a non-transitory computer-readable medium, storing computer-executable instructions which, when executed by one or more processors, cause the one or more processors of a computer system to perform one or more methods disclosed herein.

In various embodiments, a computer-program product, comprising computer program/instructions which, when executed by a processor, cause the processor to perform any of the methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 19 is a flow chart illustrating an example method for creating a vPLC where the vPLC is hosted by CSP-provided infrastructure in a particular region in a particular realm but is associated virtually with a different region in a different realm, according to certain embodiments.

FIG. 21 is an example flowchart illustrating a metadata service setup process, according to certain embodiments.

DETAILED DESCRIPTION

Figure 1:
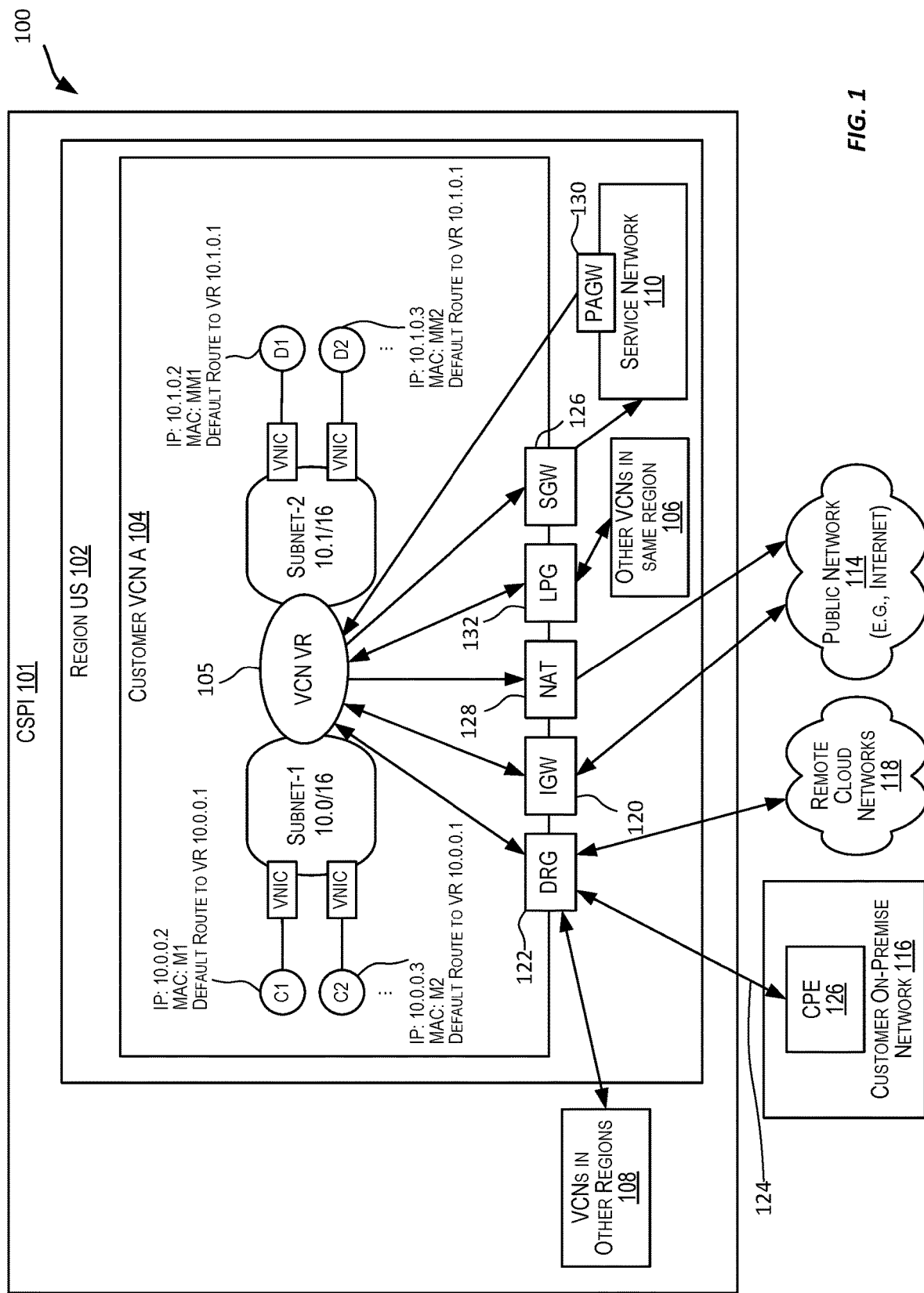
FIG. 1 is a high level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure generally relates to techniques for providing cloud services. More specifically, novel techniques are disclosed that enable cloud infrastructure in a region provided by a Cloud Services Provider (CSP), for providing CSP-offered cloud services to customers of the CSP, to be used to create one or more virtual private clouds (referred to herein as virtual private label clouds or "vPLCs"). Various embodiments are described herein, including methods, systems, non-transitory computer-readable storage media storing programs, code, or instructions executable by one or more processors, and the like.

The vPLCs created according to the various techniques described in this disclosure may be used for different purposes. For example, in one use case, a vPLC may be created for a reseller who is a customer of the CSP and can be used by the reseller to provide one or more reseller-offered cloud services to customers of the reseller. As another use case, a vPLC may be used as a virtual data center and may be associated with a different realm than the realm associated with the cloud infrastructure in the region provided by the CSP.

In certain implementations, a vPLC represents a virtual cloud comprising a set of resources that have been allocated to the vPLC from the CSP-provided infrastructure in a region. One or more vPLCs can be created using CSP-provided infrastructure in a region. In some embodiments, a virtual private label cloud (vPLC) refers to a model and architecture provided by the CSP within the CSP-provided infrastructure in a region that enables and facilitates the reseller-offered and reseller-branded cloud services.

Just as the CSP-provided infrastructure in a region provides cloud resources that can be accessed by the CSP's customers, a vPLC created for a reseller provides a set of resources that can be accessed by customers of the reseller. From the perspective of the reseller's customers, the vPLC is like reseller-provided infrastructure in a region providing resources that can be accessed by customers of the reseller. The vPLC resembles a data center in a region provided by the reseller offering reseller-offered cloud services to customers of the reseller.

In certain embodiments, regional infrastructure provided by a CSP in a region can be used both to provide cloud services to customers of the CSP and also reseller-offered cloud services to customer of a reseller, who is a customer of the CSP. This is achieved by creating, from the CSP-provided regional infrastructure, one or more vPLCs for one or more resellers, where a vPLC created for a particular reseller can be used to provide reseller-offered and reseller-branded cloud services to customers of the particular reseller. This enables a reseller to become a provider of reseller-branded cloud services to its customers without having to invest in the infrastructure needed for providing those cloud services. Instead, the reseller uses infrastructure provided by the CSP to provide the reseller-branded cloud services to the reseller's customers.

In the reseller use case, a vPLC is created for a reseller using cloud infrastructure in a region provided by a Cloud Services Provider (CSP). A vPLC created for a reseller can be used by the reseller to provide one or more reseller-offered cloud services to customers of the reseller. In certain implementations, the CSP-provided regional infrastructure providing the services that are used by the resellers to provide one or more reseller-offered services is partitioned into securely isolated portions, and the isolated portions (or partitions) allocated to different resellers such that a partition allocated to a reseller is isolated from other resellers. In this manner, a first portion of the infrastructure provided in a region by the CSP can be used to provide CSP-offered cloud services to customers of the CSP, a second portion of the infrastructure provided in the region by the CSP and allocated to a first vPLC created for a first reseller can be used to provide first reseller-offered cloud services to customers of the first reseller, a third portion of the infrastructure provided in the region by the CSP and allocated to a second vPLC created for a second reseller can be used to provide second reseller-offered cloud services to customers of the second reseller, and so on. Each portion of the infrastructure allocated to a reseller can also be further partitioned into a second level of securely isolated portions to provide multi-tenant cloud infrastructure services to the reseller's customers.

A reseller can be an entity such as an enterprise or business or an individual. Using the techniques described herein enables the reseller entity to quickly become a cloud services provider while avoiding all the barriers to entry discussed in the Background section of this disclosure. For example, the reseller does not have to procure the infrastructure that is used for providing the cloud services since the cloud services provided are using infrastructure provided by the CSP. To the customers of a reseller, it appears as if the reseller is providing the reseller-offered cloud services. From the perspective of the customers of the reseller, the reseller is thus the cloud services provider providing the services subscribed to by the customers. A reseller's customer may not even know or be aware of the CSP whose infrastructure is being used by the reseller to provide the reseller-offered and reseller-branded cloud services.

The ability to provide vPLCs may be offered as a service by the CSP and can be subscribed to by one or more customers. For example, an entity desiring to provide cloud services to its customers but not wanting to invest for procuring infrastructure needed for offering the services can subscribe to this CSP-offered vPLC service. Once subscribed to the vPLC service, the entity is a customer of the CSP, but is a "special" customer since the CSP-provided infrastructure allocated to the entity in the form of a vPLC is in turn used to provide entity-offered and branded services to customers of that entity. The customer is thus a customer of the CSP and also a reseller of cloud services using the vPLC created for the entity. The entity is thus referred to as a "reseller" to differentiate it from actual direct customers of the CSP. A direct customer of the CSP who is entity that is subscribes to and consumes one or more CSP-offered and branded services, and is not using the CSP infrastructure to sell cloud services to its customers. For purposes of this disclosure, a direct customer of the CSP is also referred to as a "non-reseller customer" to differentiate from a reseller. With respect to a reseller, as part of the vPLC service, the CSP provides infrastructure to the reseller in the form of a vPLC, and the vPLC is used by the reseller to offer reseller-branded cloud services to the reseller's customers.

A vPLC can be used for various other applications that do not involve a reseller. As an example, a vPLC can be created and associated with a realm that is different from a realm associated with the CSP-provided regional infrastructure that is used to create the vPLC. For example, the CSP-provided regional infrastructure may be associated with a first realm and the vPLC may be associated with a second realm that is different from the first realm. In such a scenario, the infrastructure corresponding to the vPLC is hosted by the first realm but is considered to belong to the second realm. This can be used for various different purposes. For example, since the vPLC is associated with the second realm it can communicate with other infrastructure (e.g., other data centers) in the second realm. Accordingly, a data center in the second realm can communicate with the vPLC since they are both in the same realm and share the second realm trust and identity profile.

The creation and management of the vPLCs is performed using infrastructure and services provided by the CSP and very technically complicated tasks. When a vPLC is created for a reseller, technical functionality is be provided to enable the reseller to use the vPLC to provide reseller-offered cloud services to the reseller's customers using the vPLC. This includes the ability to segregate traffic between resellers, segregate the traffic of different customers of a reseller, dynamically managing allocation of CSP-provided resources to the vPLC, managing the allocation of resources allocated to the vPLC among the different customers of the vPLC, measuring usage of vPLC-allocated for the reseller and performing related billing functions, measuring usage of vPLC-allocated among the different customers of the vPLC and performing related billing functions, enabling marketplaces for the different resellers, performing identity management functions of the resellers and their customers, and the like. The present disclosure describes various embodiments depicting various architectures and corresponding methods for performing and enabling the vPLC-related functions.

A reseller may use a vPLC created for the reseller to provide reseller-offered and reseller-branded cloud services offering specialized services in a domain in which the reseller specializes. The reseller-offered services may be tailored to different segments of customers. In certain implementations, a reseller-offered cloud service may be different from a cloud service offered by the CSP. In some other implementations, a reseller-offered cloud service may be based upon a cloud service offered by the CSP, for example, the reseller-offered service may be a customized version of a CSP-offered cloud service.

For example, a first vPLC may be created from CSP-provided infrastructure in a first region for a first reseller specialized in providing financial services. Customers of the first reseller may be banks and other financial institutions. Accordingly, the first reseller may use the first vPLC to provide customized and first reseller-branded financial cloud services to its customers. A second vPLC may be created from the same CSP-provided infrastructure in the first region for a second reseller specialized in providing telecom services. Customers of the second reseller may be users of telecom services. The second reseller may use the second vPLC to provide customized and second reseller-branded telecom cloud services to its customers. In addition to the first vPLC and the second vPLC, the CSP-provided infrastructure in the first region may be used by the CSP to provide CSP-offered and branded cloud services to one or more direct (non-reseller) customers of the CSP. In this manner, the same CSP-provided infrastructure in a region is used to provide CSP-offered and branded cloud services to one or more direct (non-reseller) customers of the CSP, to provide customized and first reseller-branded financial cloud services to customers of the first reseller, and to provide customized and second reseller-branded telecom cloud services to customers of the second reseller.

Metadata service (MDS) provides information about a running instance in a cloud infrastructure, for example, a running compute instance (whether a virtual machine or bare-metal instance). The metadata information includes various details about the instance, for example, its attached virtual network interface cards (VNICs), its attached multipath-enabled volume attachments, and any custom metadata a customer defines. MDS can also provide information that customers can use for various system initialization tasks. For example, a user launches a compute instance, and then the user can call a particular API to request specific data related to the launched instance to complete the initialization of that instance to perform the specific task that the instance was supposed to perform.

As the demand for cloud services increases, more businesses and enterprises want to become CSPs and offer cloud services to their customers. However, cloud services may need to become more diversified if CSPs want to provide cloud services to customers across different segments. As a result, the one-size-fits-all approach may not meet the need of today's cloud services.

The present disclosure generally relates to techniques for providing cloud services. More specifically, novel techniques are disclosed for providing vPLC-specific metadata service, including customized vPLC-specific metadata. A vPLC is created for a reseller of a Cloud Services Provider (CSP) using CSP-provided infrastructure in a region such that the reseller can provide one or more reseller-offered cloud services to customers of the reseller.

Using the techniques described in the present disclosure, each reseller can provide a customized version of a CSP-offered metadata service. For example, a first reseller specializing in providing financial services may provide a customized reseller-offered metadata service tailored to its customers, such as banks and other financial institutions. A second reseller specializing in providing telecom services may provide a customized reseller-offered metadata service tailored to its customers, such as telecommunication companies. Such customized metadata service may help efficient system initialization and deployment for customers across different segments.

The techniques described in the present disclosure enable vPLC-specific metadata service for multiple resellers allowing each reseller associated with a vPLC to provide customized metadata using vPLC-specific customization instructions. For example, a metadata request from a user associated with a customer of a reseller may be received by one of a set of endpoints associated with the vPLC, processed by a metadata service system by collecting raw metadata from instances in the vPLC, customizing the collected raw data using vPLC-specific customization instructions to generate customized vPLC-specific metadata, and preparing a response using vPLC-specific response instructions. As a result, the requesting user associated with the customer of the reseller may receive a response including the customized vPLC-specific metadata.

In some embodiments, the vPLC-specific metadata service for each vPLC may be performed independently and concurrently using its corresponding vPLC-specific customization instructions and response instructions.

In some embodiments, a vPLC-specific metadata service for a vPLC may be performed using pre-generated customized vPLC-specific metadata, where the customized vPLC-specific metadata is generated before the metadata service receives a metadata request from a user associated with a customer of a reseller associated with the vPLC.

In other embodiments, a vPLC-specific metadata service for a vPLC may be performed using on-the-fly customized metadata, where upon receiving a request from a user associated with a customer of a reseller, a metadata service system may collect raw metadata from the vPLC, customize the raw data using vPLC-specific customization instructions to generate a customized vPLC-specific metadata, which is then sent to the requesting user directly.

In other embodiments, the raw metadata from a vPLC may be collected and stored in a repository before the metadata service receives a metadata request from a user associated with a customer of a reseller associated with the vPLC.

FIGS. 1-5 and the associated description provided in the "Example Virtual Networking Architecture" section below describes networking concepts including network virtualization, substrate networks, overlay networks, VNICs, etc., and provides examples of environments in which certain embodiments described in this disclosure may be implemented. FIGS. 6-23 describe examples and embodiments related to the vPLC architecture and vPLC-specific metadata service described in this disclosure. FIGS. 24-27 depict examples of architectures for implementing cloud infrastructures for providing one or more cloud services, where the infrastructures may incorporate teachings described herein. FIG. 28 depicts a block diagram illustrating an example computer system or device, according to at least one embodiment.

Example Virtual Networking Architecture

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN-IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with publicly accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 1, 2, 3, and 4 (see references 116, 216, 316, and 416) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 1, 2, 3, and 4 (for example, gateways referenced by reference numbers 134, 136, 138, 234, 236, 238, 334, 336, 338, 434, 436, and 438) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
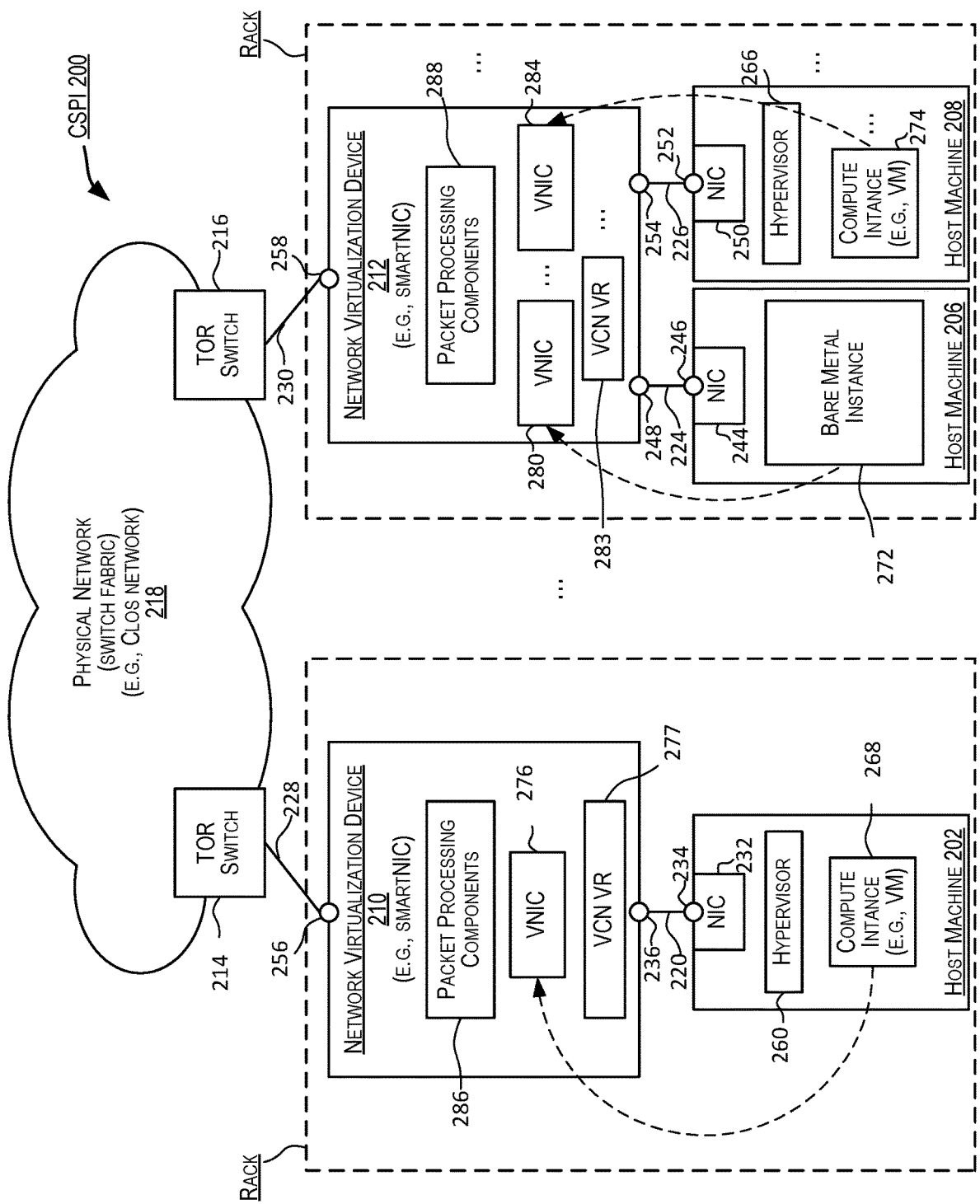
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP.

Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
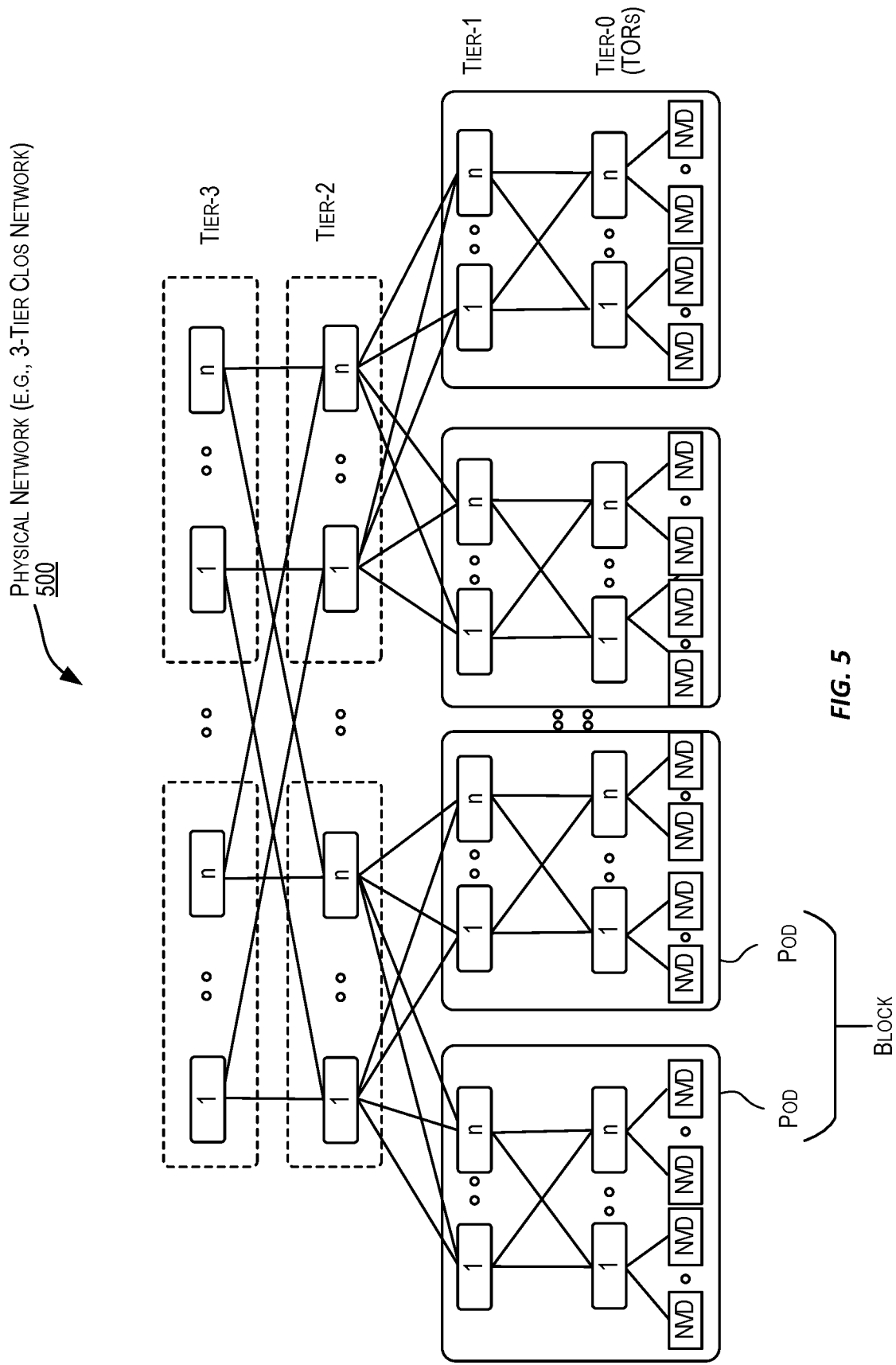
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
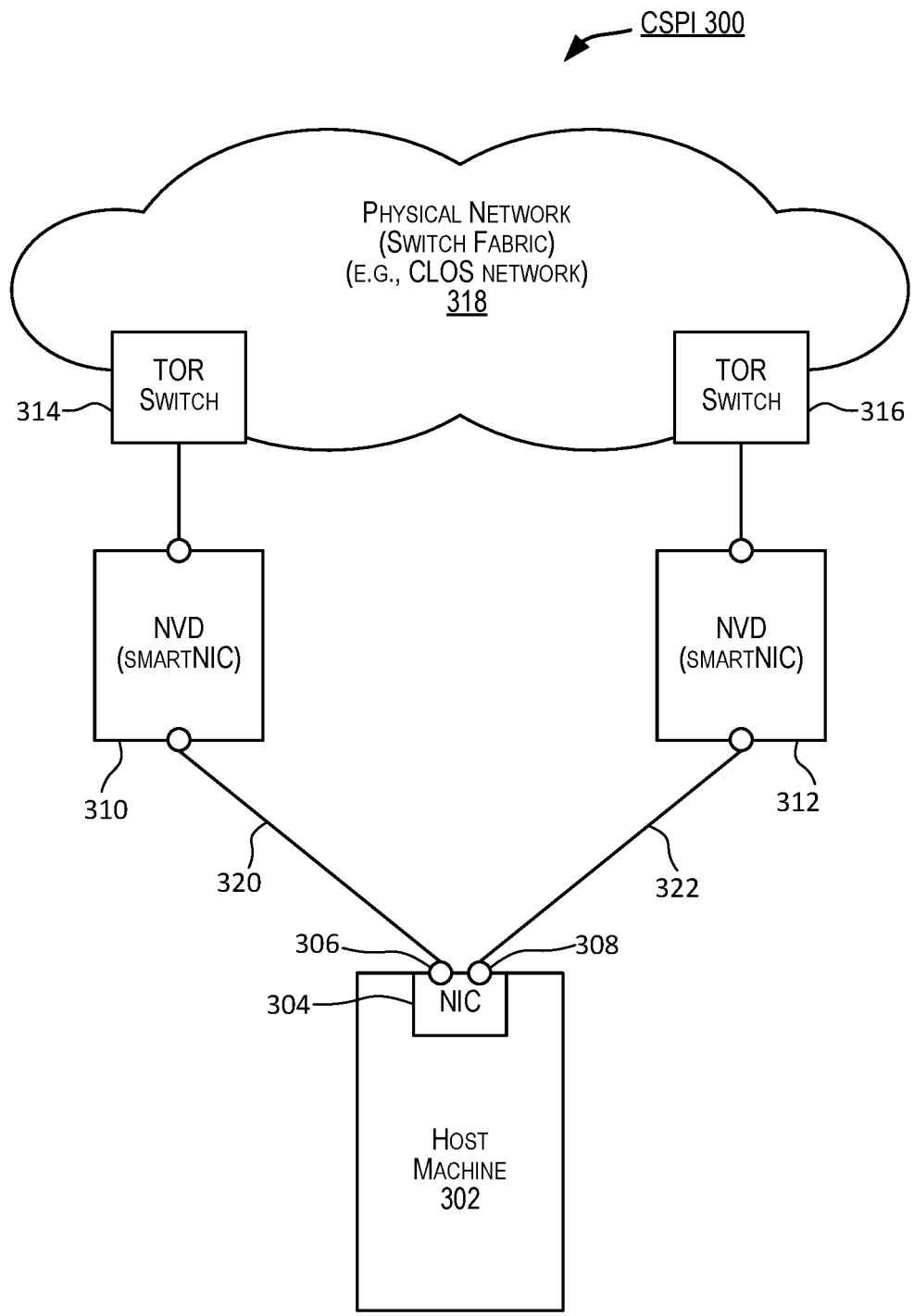
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 1, 2, 3, and 4 (see references 116, 216, 316, and 416) and described below. Examples of a VCN Data Plane are depicted in FIGS. 1, 2, 3, and 4 (see references 118, 218, 318, and 418) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
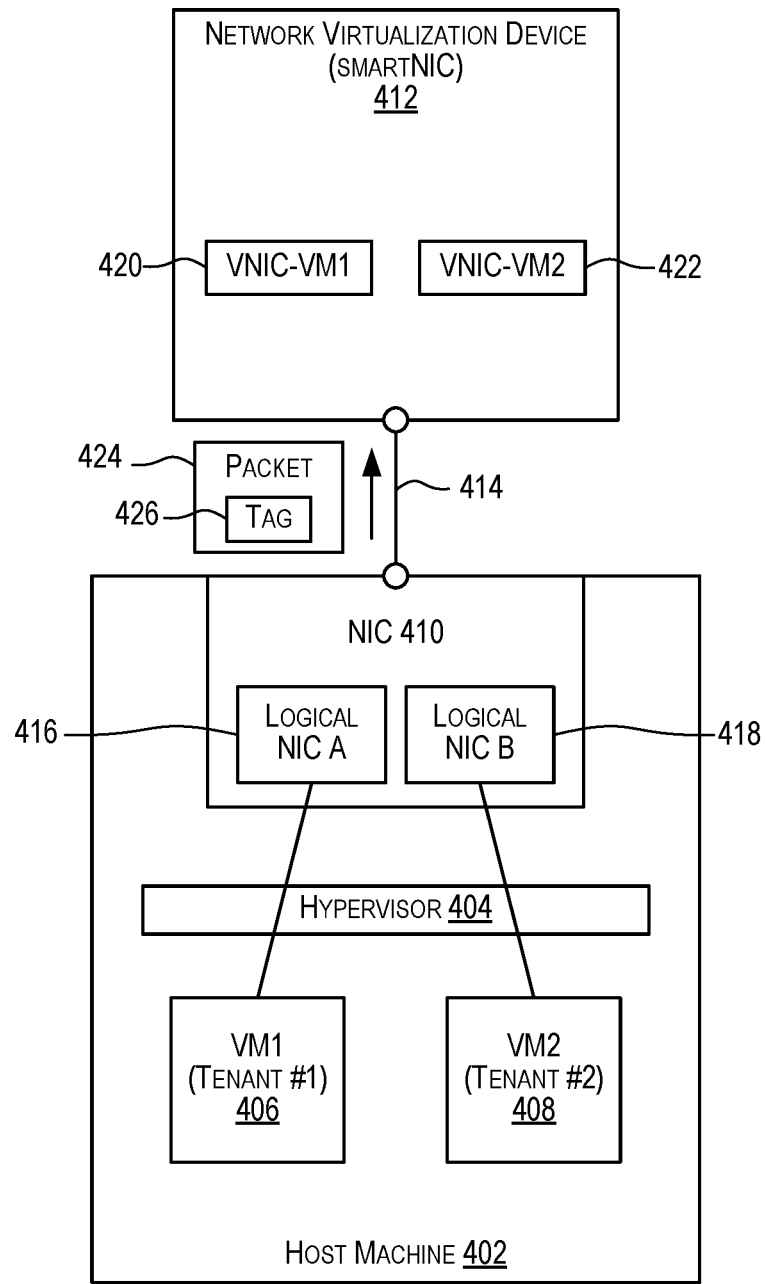
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multitenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where, ocid1: The literal string indicating the version of the CID;
resource type: The type of resource (for example, instance, volume, VCN, subnet, user, group, and so on);
realm: The realm the resource is in. Example values are "c1" for the commercial realm, "c2" for the Government Cloud realm, or "c3" for the Federal Government Cloud realm, etc. Each realm may have its own domain name;
region: The region the resource is in. If the region is not applicable to the resource, this part might be blank;
future use: Reserved for future use.
unique ID: The unique portion of the ID. The format may vary depending on the type of resource or service.

Virtual Private Label Clouds (vPLCs)

Techniques are described herein that enable cloud infrastructure in a region provided by a Cloud Services Provider (CSP), for providing CSP-offered cloud services to customers of the CSP, to be used to create one or more virtual private clouds (referred to herein as virtual private label clouds or "vPLCs"). The vPLCs created according to the various techniques described in this disclosure may be used for different purposes. For example, in one use case, a vPLC may be created for a reseller who is a customer of the CSP and can be used by the reseller to provide one or more reseller-offered cloud services to customers of the reseller. As another use case, a vPLC may be used as a virtual data center and may be associated with a different realm than the realm associated with the cloud infrastructure in the region provided by the CSP.

A cloud service provider (CSP) provides infrastructure (referred to as cloud service provider infrastructure or CSPI or CSP-provided infrastructure) that is used to provide one or more cloud services to customers of the CSP. The CSP customers can include direct customers of the CSP and/or resellers. The CSPI may include physical infrastructure components and virtual infrastructure components. The physical CSPI may comprise interconnected high-performance compute resources including racks, servers and host machines, memory resources, network resources that are used to form a physical substrate or underlay network, network virtualization devices, and other resources. The virtual CSPI components may include components in the overly network such as virtual machines, virtual routers and gateways, and other virtual components.

A CSP may offer various types of cloud services. These may include various types of services including Software-as-a-Service (SaaS), Platform-as-a-Service (PaaS), Infrastructure-as-a-Service (IaaS), and others. In certain embodiments, as described in this disclosure, the CSP may offer a "vPLC cloud service." A customer of the CSP can subscribe to one or more cloud services provided by the CSP. The customer can be any entity such as an individual, an organization, an enterprise, and the like.

Infrastructure-as-a-Service (IaaS) is a particular type of cloud computing service. In an IaaS model, the CSP provides infrastructure that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer. In certain embodiments, vPLC-as-a-service is a type of IaaS service where infrastructure is allocated for creating a virtual private label cloud for a customer. For example, if the customer of the CSP is a reseller, the vPLC created for the reseller can be used to provide reseller-offered cloud services.

When a customer subscribes to or registers for a cloud service provided by a CSP, a tenancy (or an account) is created for that customer. The customer can then, via this account/tenancy, access the subscribed-to one or more cloud resources associated with the account/tenancy. Each tenancy is identified by a tenancy identifier (T_ID) that is assigned to the tenancy and uniquely identifies the tenancy. The tenancy identifier is generated and associated with a tenancy when the tenancy is created. For example, when a direct customer of the CSP subscribes to a service provided by the CSP, a tenancy is created for the customer and a tenancy identifier that uniquely identifies that tenancy is created for the direct customer. When a reseller subscribes to the vPLC service, a tenancy is created for the reseller and a tenancy identifier that uniquely identifies that tenancy is created for that reseller. A tenancy may be a logical and secure compartment that contains all the resources and services utilized by the customer associated with the tenancy.

Resources within CSP-provided infrastructure are typically identified using unique resource identifiers (resource ID or RID). Since these resources are provided in a cloud and used for providing cloud services, the resource IDs are also referred to as cloud resource identifiers (or cloud IDs or CIDs). For example, in the cloud environment provided by Oracle Corporation, resources are identified using "ocids" or "Oracle cloud identifiers." In certain implementations, a resource ID is a globally unique identifier string that identifies a cloud resource. In some implementations, a tenancy ID is a type of cloud resource ID (or called cloud identifier (CID)).

A resource or cloud ID (CID) may be represented, as an example, in the following format:

RID_version.<RESOURCETYPE>.<REALM>.[REGION][.FUTURE USE].<UNIQUE ID>

Where:

RID_version—refers to the version of the resource ID.
"resource type"—identifies the specific type of resource the resource ID references. Examples of different resource types can include, instances, virtual network subnets, tenancies, etc. For example, "instance RID" identifies compute instances.
"Realm" and "region"—indicate the location (realm and region) of the resource.
"Unique ID"—is a unique portion of the ID (e.g., a unique string for identifying a particular resource). Thus, a tenancy ID can identify a unique id within the tenancy resource type of CID.

CIDs are generated for resources at the time of creation of those resources. Virtual machines, accounts, tenancies, authorization policies, virtual network subnets, access control lists (ACLs), and load balancers are examples of cloud resources and can therefore be referenced by their respective CIDs. A tenancy is a logical container used to group other cloud resources that belong to the same cloud customer account.

When an entity becomes a customer of the CSP and subscribes to the vPLC service, a vPLC is created for the customer and associated with the tenancy of the customer. For example, if the customer is a reseller, a vPLC is created for the reseller and associated with the tenancy of the reseller. The vPLC that is created for the reseller is treated as a resource and assigned a unique resource identifier, which is referred to as a vPLC identifier (vPLC ID) and the vPLC ID is associated with the reseller's tenancy. As described herein, for a vPLC created for a reseller, the vPLC ID for the vPLC is used to identify all resources and requests related to vPLC. Each vPLC ID uniquely identifies a vPLC.

For example, in certain implementations, all resources allocated to a vPLC are tagged with the vPLC identifier for that vPLC. In certain implementations, a vPLC ID field is inserted in the representation of the CID described above. When a resource is associated with a vPLC, the vPLC ID corresponding to that vPLC may be provided in this field of the CID, else the field may be left blank if the resource is not associated with a vPLC.

For the purpose of present disclosure, the following terminologies are used for clarity.

CSP.Cn (or just Cn)—Identifies direct and non-reseller customers of the CSP. For example, "CSP.C1" refers to a non-reseller direct customer C1 of the CSP, "CSP.C2" refers to a non-reseller direct customer C2 of the CSP.

CSP.Rn (or just Rn)—Identifies reseller customers of the CSP. For example, "CSP.R1" refers to a reseller customer R1 of the CSP, "CSP.R2" refers to a reseller customer R2 of the CSP.

Rn.Cm—A reseller can have its own customers. This identifies a particular customer of a particular reseller. For example, "R1.C1" refers to customer C1 of reseller R1, "R2.C1" refers to customer C1 of reseller R2.

T.Cn—Identifies a tenancy for non-reseller customer of the CSP. For example, "T.C1" refers to tenancy for direct non-reseller customer C1.

T.Rn—Identifies a tenancy for reseller. For example, "T.R1" refers to tenancy for reseller R1.

T.Rn.Cm—Customers of a resellers each have their own tenancies. This identifies a tenancy associated with a particular customer of a particular reseller. For example, "T.R1.C1" refers to the tenancy associated with customer C1 of reseller R1, "T.R2.C1" refers to tenancy associated with customer C1 of reseller R2.

T_ID.T.Cn—Identifies a tenancy identifier identifying a tenancy for non-reseller customer of the CSP. For example, "T_ID.T.C1" refers to tenancy ID for a tenancy for direct non-reseller customer C1.

T_ID.T.Rn—Identifies a tenancy identifier for a tenancy for reseller. For example, "T_ID.T.R1" refers to a tenancy identifier for tenancy for reseller R1.

T_ID.Rn.Cm—Identifies a tenancy identifier for a tenancy associated with a particular customer of a particular reseller. For example, "T_ID.T.R1.C1" refers to a tenancy identifier for the tenancy associated with customer C1 of reseller R1, "T_ID.T.R2.C1" refers to a tenancy identifier for a tenancy associated with customer C1 of reseller R2.

vPLC.Rn—Identifies a vPLC created for reseller Rn. For example, "vPLC.R1" identifies a tenancy created for and associated with reseller R1. This identifies a particular vPLC created for the reseller and associated with the reseller's tenancy.

vPLC_ID.vPLC.Rn—Identifies a vPLC identifier for a vPLC created for a particular reseller. For example, "vPLC_ID.vPLC.R1" refers to a vPLC identifier for a vPLC created for reseller R1.

As describe herein, a vPLC is created for a reseller, who is a customer of the CSP. The vPLC is associated with the tenancy for the reseller. In certain implementations, the vPLC ID identifying the vPLC may be associated with the tenancy ID identifying the tenancy for the reseller. Accordingly, given a vPLC ID, the corresponding vPLC and the reseller for whom the vPLC is created, including the tenancy and tenancy identifier for the reseller, can be identified.

The CSPI or CSP-provided infrastructure may be organized into realms, regions, and data centers. A region refers to a localized geographic area comprising one or more connected data centers. Regions are independent of other regions and can be separated by vast distances, for example, across countries or even continents. A set of application programming interfaces (APIs) is provided for CSP-provided infrastructure in a region, where the APIs are used to perform operations using the infrastructure in the region. Operations that may be performed using infrastructure in a region may include creating a resource in infrastructure in the region, accessing a resource in infrastructure in a region, performing an operation involving a resource in infrastructure in the region, deleting a resource from infrastructure in the region, and performing other operations involving infrastructure in the region.

The set of APIs are region-specific. Accordingly, CSP-provided infrastructure in a region is characterized by a set of APIs that can be used with the infrastructure in the region. CSP-provided infrastructure in a different region has a different set of APIs that are provided for that different region. Accordingly, for purposes of this application, the phrase "CSP-provided infrastructure in a region" or "infrastructure provided by the CSP in a region" means that the infrastructure is characterized by a particular set of APIs provided for that region. Accordingly, a first set of APIs may be provided for a first region, a second set of APIs may be provided for a for a second region that is different from the first region, a third set of APIs may be provided for a third region that is different from the first and second regions, and so on. A particular set of APIs thus identifies CSP-provided infrastructure in a specific region. In other words, CSP-provided infrastructures in two separate regions will have two separate sets of APIs. A region is thus characterized by infrastructure in the region and a set of APIs associated with the region to perform operations involving the regional infrastructure. The CSP-provided infrastructure in a region is also referred to as "regional infrastructure" or "region-specific infrastructure."

For example, a CSP may provide first infrastructure in Seattle and second infrastructure in Portland. A first set of APIs may be provided for the first infrastructure in Seattle and these APIs may be characterized by the following format:

"<service_identifier>.us-seattle.oci.oraclecloud.com"

A second set of APIs may be provided for the second infrastructure in Portland and these APIs may be characterized by the following format:

"<service_identifier>.us-portland.oci.oraclecloud.com"

It is to be noted that Seattle and Portland are merely being used as examples here. The geographical locations of the regions can vary. For example, it is possible to have two or more regions in the same geographical city. For example, it is possible to have a first region in a first building in a city and a second region in a second separate building in the same city. As yet another example, it is possible to have a first region on one floor of a building and a second region in another floor of the building. As yet another example, for infrastructure provided by the CSP on a floor, a first portion of the infrastructure may belong to a first region associated with a first set of APIs and a second portion of the infrastructure may belong to a second region associated with a second set of APIs that is different from the first set of APIs.

The CSP-provided infrastructure in a region may be organized into one or more data centers. For example, in a particular region where the CSP may have two buildings, each building hosting infrastructure that is used to provide cloud services, the infrastructure in the first building may be organized and referred to as a first data center and the infrastructure in the second building may be organized and referred to as a second data center. As another example, in a particular region where the CSP may have a single building with multiple floors, each floor hosting infrastructure that is used to provide cloud services, the infrastructure on a first floor may be organized and referred to as a first data center and the infrastructure on the second floor may be organized and referred to as a second data center. As yet another example, in a particular region where the CSP may have infrastructure that is used to provide cloud services, a first portion of the infrastructure may be organized and referred to as a first data center and a second separate portion of the infrastructure may be organized and referred to as a second data center.

A region may have one or more data centers. In certain implementations, all the regional infrastructure may be contained in only one data center, while in other implementations, infrastructure in a region can have organized into multiple data centers. Each data center may include infrastructure resources, such as compute, storage, and networking resources, that the CSP provides. Within a region, the data centers in the region may be organized into one or more availability domains (ADs). Availability domains are isolated from each other, fault-tolerant, and very unlikely to fail simultaneously. ADs are configured such that a failure at one AD within a region is unlikely to impact the availability of the other ADs within the same region.

A realm refers to a logical collection of one or more regions. A realm can include one or more regions. Realms are typically isolated from each other and do not share data. Each realm has its own identity and trust profile (e.g., passwords, credentials, etc.). The identity and trust profile for a realm is configured such that cross-realm communications are not allowed. In this manner, each realm represents an isolated domain. For example, one realm may be created for a government entity that is a customer of the CSP, another realm may be created for commercial customers of the CSP, and yet a separate realm may be created for certain private party customers of the CSP, and the like. For regions within a realm, the regional-infrastructures can communicate with each other, but a regional-infrastructure associated a first realm is not allowed to communicate with a regional-infrastructure associated with a second different realm.

A cloud services reseller can be an entity such as a corporation (e.g., a telecom company), a system integrator, a government agency, an IT department of a big corporation, a school, etc.

Figure 6:
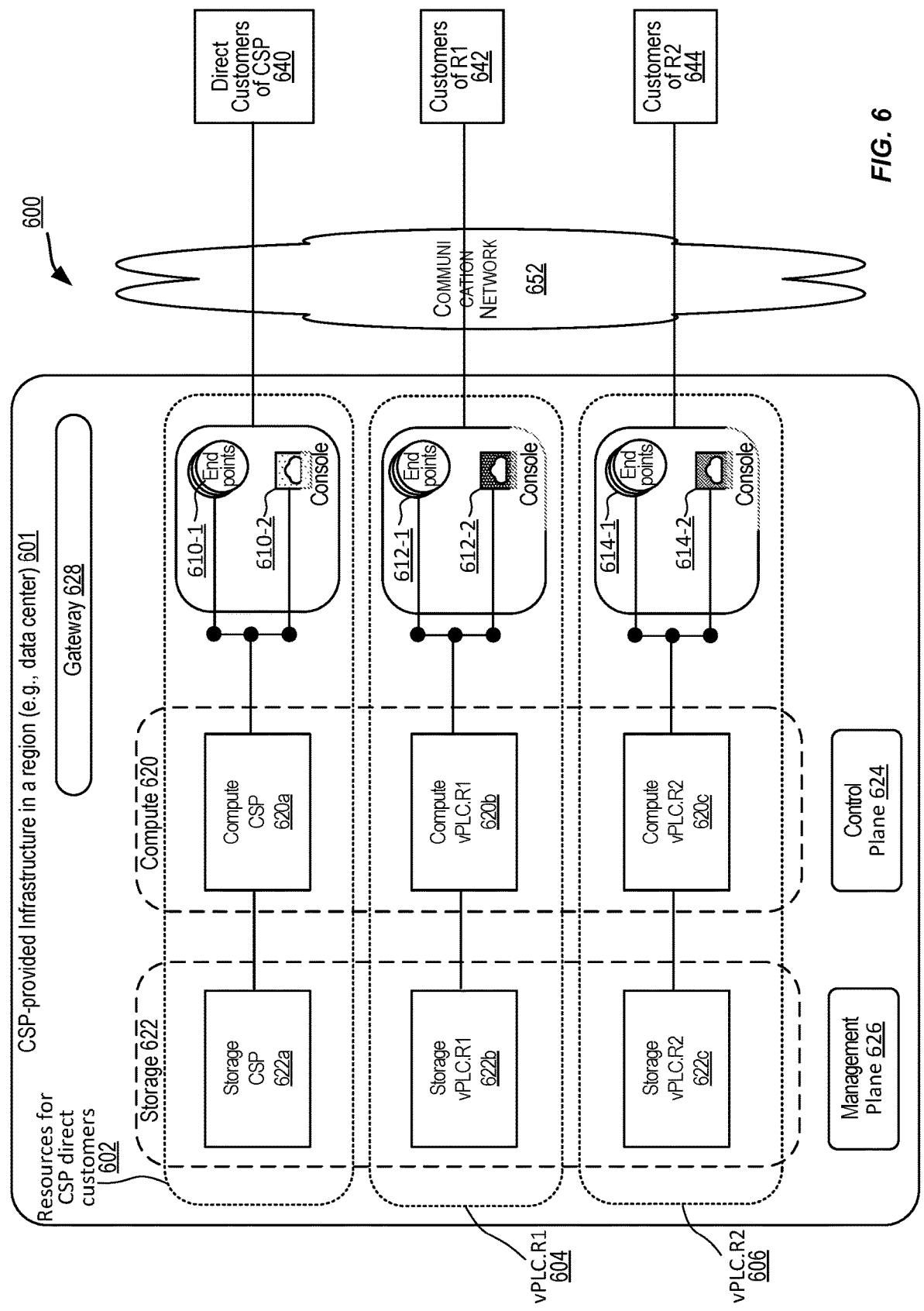
FIG. 6 is a block diagram of a distributed environment illustrating an example of virtual private label clouds (vPLCs) hosted by a CSP-provided infrastructure in a region, according to certain embodiments.

FIG. 6 is a simplified block diagram of a distributed environment 600 comprising CSP-provided infrastructure in a region and illustrating an example of virtual private label clouds (vPLCs) hosted by the CSP-provided infrastructure, according to certain embodiments. Distributed environment 600 depicted in FIG. 6 is merely an example and is not intended to unduly limit the scope of claimed embodiments. Many variations, alternatives, and modifications are possible. For example, in some implementations, distributed environment 600 may have more or fewer systems or components than those shown in FIG. 6, may combine two or more systems, or may have a different configuration or arrangement of systems. The systems, subsystems, and other components depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

FIG. 6 depicts CSP-provided infrastructure in a region 601. Infrastructure 601 may be organized as one or more data centers. Infrastructure 601 can include memory or storage resources 622, compute resources 620, networking resources (not shown), and other physical and logical resources provided by the CSP. Storage resources 622 can include one or more volatile or non-volatile memory resources. Compute resources 620 can include one or more racks, each rack comprising one or more servers, and each server hosting one or more operating systems.

CSP-provided regional infrastructure 601 may be used by the CSP to provide one or more CSP-offered cloud services to one or more direct customers of the CSP and can also be used to create one or more vPLCs. In the example depicted in FIG. 6 two vPLCs, vPLC.R1 604 and vPLC.R2 606, have been created for resellers R1 and R2, respectively. The vPLC.R1 604 is used to provide one or more reseller R1-offered and R1-branded cloud services to one or more customers of R1 642. The vPLC.R2 606 is used to provide one or more reseller R2-offered and R2-branded cloud services to one or more customers of R2 644.

As shown, infrastructure 601 can be communicatively coupled with computing devices used by users associated with direct customers 640 and with computing devices used by users associated with customers of resellers (e.g., users associated with customers 642 of reseller R1 and users associated with customers 644 of reseller R2) via communication network 652. Communication network 652 can be of various types and can include one or more communication networks. Examples of communication network 652 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication network 652 may include any infrastructure that facilitates communications with infrastructure 601.

As shown in FIG. 6, infrastructure 601 is partitioned into three securely isolated portions: (1) a first portion 602 that is used for providing CSP-offered and CSP-branded cloud services to one or more direct (or non-reseller) customers 640 of the CSP; (2) a second portion allocated to vPLC.R1 604 created for reseller R1; and (3) a third portion allocated to vPLC.R2 606 created for reseller R2. In certain implementations, the three portions are securely partitioned from each other.

Partitioning of the resources includes partitioning storage resources 622 and compute resources 620. For example, as shown in FIG. 6, storage resources 622 include storage portion 622a, which is included in first portion 602 that is used to provide CSP-offered cloud services to the CSP's direct customers. Storage resources 622 also includes storage portion 622b, which is allocated to vPLC.R1 604 and storage portion 622c, which is allocated to vPLC.R2 606. A storage or memory portion allocated to a vPLC can include one or more volatile and/or non-volatile memory resources.

As also shown in FIG. 6, compute resources 620 are also partitioned. Compute resources 620 include compute portion 620a, which is included in first portion 602 that is used to provide CSP-offered cloud services to the CSP's direct customers. Compute resources 620 also includes a portion 620*b*, which is allocated to vPLC.R1 604 and a portion 620*c*, which is allocated to vPLC.R2 606.

As described above, a set of APIs are provided for accessing and performing functions with respect to CSP-provided infrastructure in a region. These set of APIs can be accessed by users associated with direct customers 640 of the CSP using a set of end points 610-1 provided by the CSP. For example, one or more of endpoints 610-1 may be used by users to access and/or use compute resources 620*a* or memory resources 622*a* allocated to infrastructure that is used to provide CSP-offered cloud service to the CSP's customers. An endpoint in 610-1 may refer to an URL with an associated fully qualified domain name (FQDN) that is used to access cloud services provided by infrastructure 601. Example of these endpoints:

"createVM.compute.us-seattle.oci.oraclecloud.com"—
To create a VM
"deleteVM.compute.us-seattle.oci.oraclecloud.com"—
To delete a VM
"storeObject.storage.us-seattle.oci.oraclecloud.com"—
To store data etc.
Users associated with direct customers 640 of the CSP and who are connected to infrastructure 601 via a communication network may use one or more of endpoints 610-1.

In certain embodiments, a set of vPLC-specific endpoints are created for each vPLC. For example, as depicted in FIG. 6, a set of endpoints 612-1 is created for vPLC.R1 and a set of endpoints 614-1 is created for vPLC.R2. Endpoints 612-1 can be used by users associated with customers 642 of reseller R1 to access resources associated with vPLC.R1 and to perform one or more functions or operations involving resources allocated to vPLC.R1. Endpoints 614-1 can be used by users associated with customers 644 of reseller R2 to access resources associated with vPLC.R2 and to perform one or more functions or operations involving resources allocated to vPLC.R2.

In certain implementations, a set of vPLC-specific endpoints for a vPLC is created based upon endpoints provided by the CSP for its direct customers. For example, in FIG. 6, endpoints 612-1 for vPLC.R1 are created based upon endpoints 610-1. The endpoints created for a vPLC may include an identifier that specifically identifies the vPLC for which the endpoints are created. For example, given the example endpoints provided by the CSP for its direct customers, the endpoints 612-1 for vPLC.R1 may include:

"createVM.compute.vplcR1.us-seattle.oci.oraclecloud.
com"—To create a VM
"deleteVM.compute.vplcR1.us-seattle.oci.oraclecloud.
com"—To delete a VM
"storeObject.storage.vplcR1.us-seattle.oci.oraclecloud.
com"—To store data etc., where "vplcR1" uniquely identifies the vPLC corresponding to the endpoints.

Endpoints 614-1 for vPLC R2 may also be created based upon endpoints 610-1. For example, the endpoints 614-1 for vPLC.R2 may include:

"createVM.compute.vplcR2.us-seattle.oci.oraclecloud.
com"—To create a VM
"deleteVM.compute.vplcR2.us-seattle.oci.oraclecloud.
com"—To delete a VM
"storeObject.storage.vplcR2.us-seattle.oci.oraclecloud.
com"—To store data etc., where "vplcR2" uniquely identifies the vPLC corresponding to the endpoints.

Since endpoints associated with a vPLC include an identifier identifying a particular vPLC, when an API call is received by infrastructure 601, the endpoint invocation can be parsed to determine whether the invocation is for a direct customer of the CSP or for a reseller. Further, since the endpoints use unique identifiers for the different vPLCs, the particular vPLC and the associated reseller can also be identified from the endpoint invocation. In this manner, based upon the results of parsing of the endpoint invocation, the endpoint request can be appropriately forwarded to be processed.

The CSP also provides a console 610-2 for use by its direct customers 640. Users associated with direct customers 640 of the CSP can use console 610-2 to configure, access and manage the first portion 602 of the CSP-provided regional infrastructure. In certain implementations, console 610-2 can provide a set of web-based graphical user interfaces (GUI) that can be used to access and manage CSP-provided cloud infrastructure in the region. In some implementations, the console is a web-based application.

In certain embodiments, a console is also provided for each vPLC. For example, as depicted in FIG. 6, a console 612-2 is provided for vPLC.R1 and a console 614-2 is provided for vPLC.R2. Console 612-2 provided for vPLC.R1 can be used by users associated with customers 642 of reseller R1 to configure, access and manage the second portion the CSP-provided regional infrastructure allocated to vPLC.R1 604 created for reseller R1. Console 614-2 provided for vPLC.R2 can be used by users associated with customers 644 of reseller R2 to configure, access and manage the third portion the CSP-provided regional infrastructure allocated to vPLC.R2 606 created for reseller R2.

In some embodiments, a reseller may subscribe to two or more vPLCs, but each vPLC can still have a set of endpoints and a console. For example, if a reseller subscribes to two vPLCs, vPLC 1 and vPLC 2, then vPLC 1 may have a set of endpoints (e.g., 612-1) and a console (e.g., 612-2), and vPLC 2 (e.g., 614-1) may have another set of endpoints and a console (e.g., 614-2). Both vPLC 1 (e.g., 604) and vPLC 2 (606) may be associated with the same reseller.

Infrastructure 601 may include networking resources that enable communications to and from infrastructure 601. These network resources may include, for example, a network gateway 628 may be provided that enables communication of traffic to and from the CSP-provided regional infrastructure 601 to other destinations, where a destination may be communicatively coupled to infrastructure 601 via a public (e.g., the Internet) or private network, the destination may be in an on-premise network, in another cloud network, and the like. Gateway 628 may be implemented as a physical network device (e.g., a router), as a logical networking component (e.g., a virtual router), or some combination of a physical component and a logical component.

Infrastructure 601 may include a control plane (CP) 624 and a management plane (MP) 626 provided by CSP. In certain embodiments, CP 624 may be responsible for providing management, deployment, and orchestration functions within a cloud environment provided by a CSP. For example, CP may receive requests from the direct customers of CSP, customers of reseller R1, and customers of reseller R2, through endpoints and consoles, work with other components in the infrastructure, such as resource manager and management plane, to determine whether the requests can be fulfilled, and respond to the direct customers of CSP, customers of reseller R1, and customers of reseller R2, accordingly. In other words, CSP CP 624 may be responsible for performing vPLC related functions. In certain embodiments, the CSP may also provide vPLC-specific control planes that are configured specifically for performing vPLC operations. In some embodiments, there may be one vPLC control plane, that can perform processing for multiple vPLCs. In other embodiments, each vPLC may be provided its own CP.

In some embodiments, MP 626 may be a collection of software components that are responsible for provisioning all the processes and workflows that are needed for a requested operation. For example, for a service request to access a cloud service, the MP may provision a workflow that involves identity check for the requester and checking a DNS record to obtain an IP address for accessing a service backend. The MP ensures different tasks are performed properly and in the right order by the data plane.

In certain implementations, compute resources 620 can include one or more racks, each rack comprising one or more servers, and each server hosting one or more operating systems. Partitioning of compute resources 620 into resources 620a that are allocated to infrastructure for servicing the CSP's direct customers 640 and resources 620b and 620c that are allocated to the vPLCs can be done along different levels or boundaries. The partitioning of compute resources at a particular level may also be referred to herein as segmentation level. In certain implementations, the partitioning may be performed at the rack-level (i.e., segmented at the rack-level), where one or more individual racks are allocated to 620a, 620b, and 620c. In this implementation, a rack is exclusively allocated to a particular vPLC and is not used by other vPLCs or by the CSP for providing CSP-offered services to its direct customers 640.

In another implementation, the partitioning may be performed at the server level (i.e., segmented at the server-level), where one or more individual servers from the same or different racks are allocated to 620a, 620b, and 620c. In this implementation, a server is exclusively allocated to a particular vPLC and is not used by other vPLCs or by the CSP for providing CSP-offered services to its direct customers 640. Since a rack can have multiple servers, one server on the rack may be allocated to 620a, another server to 620b, and a third server to 620c. Thus, a rack may be shared between two vPLCs, or between infrastructure used by the CSP for providing CSP-offered services to its direct customers 640 and a vPLC.

In some implementations, the partitioning may be performed at the hypervisor level (i.e., segmented at the hypervisor-level), where one or more individual hypervisors from the same or different servers on the same or different racks are allocated to 620a, 620b, and 620c. In this implementation, a hypervisor is exclusively allocated to a particular vPLC and is not used by other vPLCs or by the CSP for providing CSP-offered services to its direct customers 640. Since a server can host multiple hypervisors, one hypervisor on the server may be allocated to 620a, another hypervisor on the same server may be allocated to 620b, and a third hypervisor on the same server may be allocated to 620c. Thus, a server may be shared between two vPLCs, or between infrastructure used by the CSP for providing CSP-offered services to its direct customers 640 and a vPLC.

A hypervisor on a server on a rack can manage and execute multiple virtual machines (VMs). In some implementations, the partitioning may be performed at the VM-level (i.e., segmented at the VM-level), where VMs executed by the same hypervisor can be allocated to 620a, 620b, and 620c. In this implementation, a VM is exclusively allocated to a particular vPLC and is not used by other vPLCs or by the CSP for providing CSP-offered services to its direct customers 640. Since a hypervisor can support multiple VMs, one VM may be allocated to 620a, another VM to 620b, and a third VM on the same hypervisor may be allocated to 620c. Thus, a hypervisor may be shared between two vPLCs, or between infrastructure used by the CSP for providing CSP-offered services to its direct customers 640 and a vPLC.

In yet other embodiments, a combination of the above partitioning techniques may be used. Irrespective of the partitioning technique used, the partitioning is done in a secure and safe manner, which ensure that traffic and storage intended for a particular vPLC for a particular reseller cannot be seen or accessed by other resellers or their customers, or by other direct customers of the CSP. Also, traffic and storage intended for a particular customer of a reseller cannot be seen or accessed by other customers of that reseller.

Figure 7:
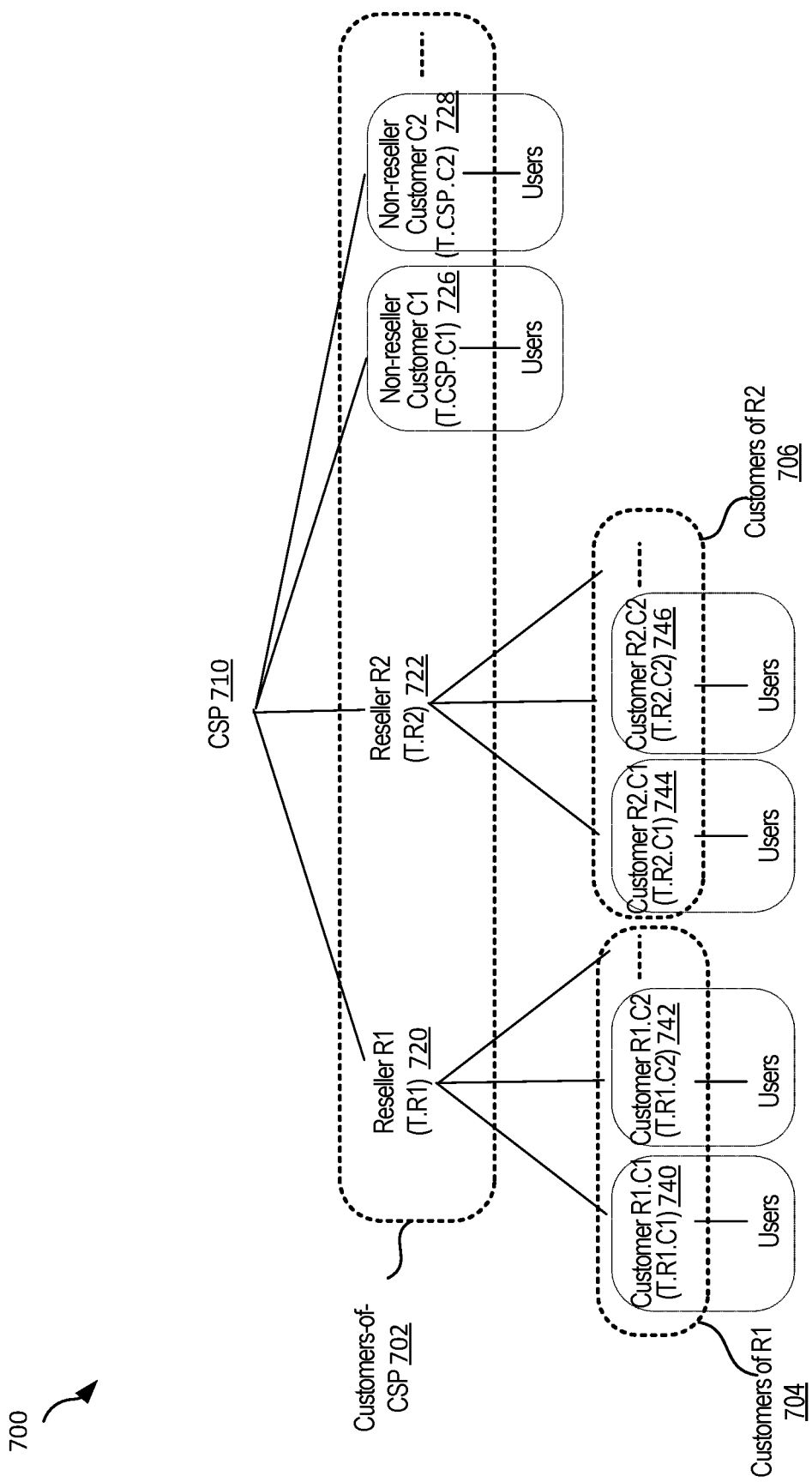
FIG. 7 is a diagram illustrating relationships between a CSP, the CSP's direct and reseller customers and their associated users, and customers of individual resellers and their associated users, according to certain embodiments.

FIG. 7 is a diagram illustrating relationships between the CSP, the CSP's direct and reseller customers and their associated users, and customers of individual resellers and their associated users, according to certain embodiments. As shown in FIG. 7, CSP 710 is at the top or root of the hierarchy. CSP 710 may offer one or more cloud services that may be subscribed to by customers of the CSP. In FIG. 7, customers of CSP 710 are represented by 702. A tenancy, identified by a tenancy ID, is created for each subscribing customer of CSP 710.

Customers 702 of CSP 710 may include direct or non-reseller customers and reseller customers. A reseller customer is an entity that subscribes to the vPLC service provided by the CSP and the vPLC created for the reseller as a result of subscribing to the vPLC service is used to provide reseller-offered and reseller-branded cloud services to customers of the reseller. The customer of a reseller may be different from the customers of the CSP. A direct or non-reseller customer of the CSP is an entity that subscribes to one or more CSP-offered cloud services but does not have use the CSP's infrastructure to provide any cloud services of its own to its customers.

In the example depicted in FIG. 7, the direct or non-reseller customers of CSP 710 include customer C1 726 having an associated tenancy T.CSP.C1 and customer C2 728 having an associated tenancy T.CSP.C2. There may be multiple such direct customers of CSP 710. One or more users may be each direct customer of CSP, where the user can use one or more of the CSP-offered cloud services subscribed to by the corresponding direct customer. For example, users associated with a customer of the CSP can be employees or agents of the customer.

In the depicted in FIG. 7, the reseller customers of CSP 710 include reseller R1 720 having an associated tenancy T.CSP.R1 and reseller R2 722 having an associated tenancy T.CSP.R2. There may be multiple such reseller customers of CSP 710. One or more users (not shown in FIG. 7) may be each reseller customer of CSP.

A reseller may in turn have its own customers that subscribe to one or more reseller-offered and reseller-branded cloud services, where the reseller-offered and branded cloud services are provided using a vPLC created by the CSP for the reseller. In FIG. 7, the customers of reseller R1 720 are shown using reference 704 and the customers of reseller R2 722 are shown using reference.

A customer of a reseller may have their own tenancy and associated set of users. For example, as depicted in FIG. 7, reseller R1 can have multiple customers including customer R1.C1 740 having a tenancy T.R1.C1 and associated users, customer R1.C2 742 having a tenancy T.R1.C2 and associated users, and others. Reseller R1 may offer a set of R1-offered and branded cloud services and customers of R1 can subscribe to one or more of the R1-offered services. The set of one or more R1-offered services subscribed to by R1.C1 740 may be the same as or different from the set of one or more R1-offered services subscribed to by R1.C2 742. The cloud services offered by R1 722 may be different from the cloud services offered by reseller R2 722 and from the cloud services offered by CSP 710.

Reseller R2 722 can have multiple customers of its own subscribing to R2-offered and branded cloud services that are provided using the vPLC created for R2. As shown in FIG. 7, the customers of R2 722 include a customer R2.C1 744 having a tenancy T.R2.C1 and associated users, a customer R2.C2 746 having a tenancy T.R2.C2 and associated users, and others. The cloud services offered by R2 722 may be different from the cloud services offered by reseller R1 720 and from the cloud services offered by CSP 710. Customers of R2 may subscribe to one or more of the R2-offered cloud services. The set of one or more R2-offered services subscribed to by R2.C1 744 may be the same as or different from the set of one or more R2-offered services subscribed to by R2.C2 746.

As shown in FIG. 7, there are two levels of tenancies that come into play when vPLCs are used by a reseller to sell reseller-offered cloud services to the reseller's customer. A first level of tenancies corresponds to tenancies associated with the customers of CSP 710, including the direct or non-reseller customers and the reseller customers. These tenancies may also be referred to as Customer-of-CSP tenancies (or CoCTs). In FIG. 7, the CoCTs include the tenancies associated with reseller R1 720, reseller R2 722, direct customer C1 726, and direct customer C2 728. A second level of tenancies incudes tenancies associated with customers of resellers. These tenancies may also be referred to as Customer-of-Reseller Tenancies (or CoRTs). In FIG. 7, the CoRTs include the tenancies associated with R1.C1 740, R1.C2 742, R2.C1 744, R2.C2 746, and so on.

Figure 8:
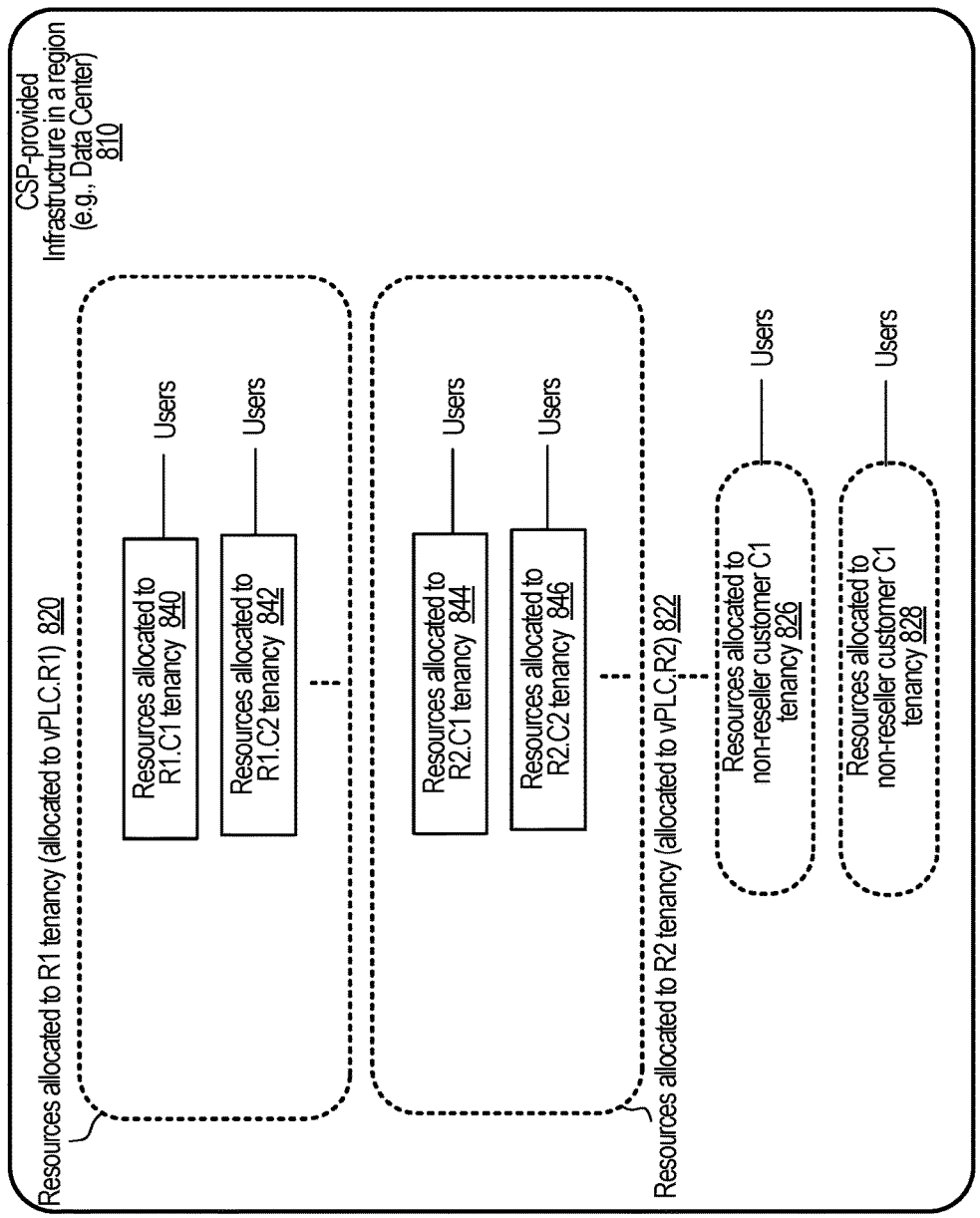
FIG. 8 is a diagram illustrating relationships between resources allocated to the tenancies for CSP's direct customers, tenancies for resellers of the CSP, and tenancies for customers of individual resellers, according to certain embodiments.

FIG. 8 is a diagram illustrating relationships between resources allocated to the tenancies for CSP's direct customers, tenancies for resellers of the CSP, and tenancies for customers of individual resellers, according to certain embodiments. Referring to FIG. 8, in certain embodiments, a CSP-provided infrastructure in a region (e.g., data center) 810 may be partitioned into several securely isolated portions for the resellers of the CSP, such as resources allocated to vPLC.R1 820 created for the reseller R1 and associated with reseller R1's tenancy (T.R1), resources allocated to vPLC.R2 822 created for the reseller R2 and associated with reseller R2's tenancy (T.R2), and so on. The resource partitions may also include securely isolated partitions for CSP's non-reseller direct customers C1 and C2, such as resources 826 allocated to non-reseller customer CSP.C1's tenancy (T.CSP.C1), and resources 828 allocated to non-reseller customer CSP.C2's tenancy (T.CSP.C2). The partitions of resource CSP-provided regional infrastructure that are allocated to reseller R1's tenancy 820, reseller R2' 822, customer CSP.C1's tenancy and customer CSP.C2's tenancy may be referred to as first-level resource partition.

Each securely isolated portion of resources associated with the first-level resource partition or tenancy for the resellers (i.e., R1 tenancy and R2 tenancy) may be assigned or tagged with a vPLC ID (i.e., a resource ID), such as vPLC_ID.vPLC.R1 820 and vPLC_ID.vPLC.R2 822. Each of these partitions for CSP's non-reseller direct customers may be tagged with a resource IDs. Each tenancy of CSP's non-reseller direct customers may be accessed by their respective users, where the users can use one or more of the CSP-offered cloud services subscribed to by their corresponding direct customers.

Inside each first-level resource partition (or portion) for a reseller may have additional second-level resource partitions that are allocated to the tenancies of customers of resellers. For example, a securely isolated resource partition (vPLC.R1.C1) 840 may be allocated to tenancy (T.R1.C1) associated with customer C1 of reseller R1, and a securely isolated resource partition (vPLC.R1.C2) 842 may be allocated to tenancy (T.R1.C2) associated with customer C2 of reseller R1. The isolated partition vPLC.R1.C1 may be tagged with a customer resource ID identifying resources allocated to T.R1.C1, and the isolated partition vPLC.R1.C2 may be tagged with a customer resource ID identifying resources allocated to T.R1.C1.

Similarly, a securely isolated resource partition (vPLC.R2.C1) 844 may be allocated to tenancy (T.R2.C1) associated with customer C1 of reseller R2 and a securely isolated resource partition (vPLC.R2.C2) 846 may be allocated to tenancy (T.R2.C2) associated with customer C2 of reseller R2. The isolated partition vPLC.R2.C1 may be tagged with a customer resource ID identifying resources allocated to T.R2.C1, and the isolated portion vPLC.R2.C2 may be tagged with a customer resource ID identifying resources allocated to T.R1.C1. Each tenancy (e.g., 840 for R1.C1, 842 for R1.C2, 844 for R2.C1, or 846 for R2.C2) associated with a customer of a reseller may be accessed by one or more users associated with the customer, where the user can use one or more of the reseller-offered cloud services subscribed to by the corresponding customer.

Figures 9A, 9B:
FIG. 9A is a diagram illustrating a mechanism for storing information in tenancies for customers of individual resellers of a CSP, according to certain embodiments.
FIG. 9B is a diagram illustrating a mechanism for storing information in tenancies for customers of individual resellers of a CSP, according to certain embodiments.

FIGS. 9A and 9B are diagrams illustrating mechanisms for storing information in tenancies for customers of individual resellers of a CSP, according to certain embodiments. In some embodiments, vPLC IDs and tenancy IDs for tenancies associated with customers of resellers (may also be referred to as customer tenancy IDs or CT IDs) may be associated in two approaches—1) a distributed scheme (or per-vPLC record space), as illustrated in FIGS. 9A, and 7) a centralized scheme (or vPLC ID as a partition key), as illustrated in FIG. 9B. Although FIGS. 9A and 9B illustrate storing information in a table format, in some embodiments, the information may be stored in different formats, such as arrays, key-value stores, XML, JSON, and the like.

FIG. 9A illustrates the first approach, per-vPLC record space. In some embodiments, a per-vPLC record space may be an approach that stores tenancy-related information in a vPLC-specific table under a vPLC ID for each reseller. In other words, the information may be stored in a distributed way. Each table is assigned a vPLC ID. Inside each table, one row may be designated for a customer of the reseller, and another row may be designated for another customer of the reseller, and so on. For example, in FIG. 9A, there are two tables for storing information, such as identity information (e.g., the user's login, associated credentials, and certificates) or billing information (e.g., resource usage, pricing). Table 910 is assigned a vPLC ID (vPLC_ID.vPLC.R1) for vPLC.R1 associated with reseller R1, and table 920 is assigned a vPLC ID (vPLC_ID.vPLC.R2) for vPLC.R2 associated with reseller R2. Inside table 910, there are three records for three customers, C1, C2, and C3, of reseller R1. The first record/row may include the tenancy ID (T_ID.T.R1.C1) for a tenancy associated with customer C1 of reseller R1 and customer C1's associated information, for example, identity, billing, etc. The second record/row may include the tenancy ID (T_ID.T.R1.C2) for a tenancy associated with customer C2 of reseller R1 and customer C2's associated information. The third record/row may include the tenancy ID (T_ID.T.R1.C3) for a tenancy associated with customer C3 of reseller R1 and customer C3's associated information.

The same structure may also be used for table 920, storing three records for three customers, C1, C2, and C3, of reseller R2. The first record/row may include the tenancy ID (T_ID.T.R2.C1) for a tenancy associated with customer C1 of reseller R2 and customer C1's associated information, for example, identity, billing, etc. The second record/row may include the tenancy ID (T_ID.T.R2.C2) for a tenancy associated with customer C2 of reseller R2 and customer C2's associated information. The third record/row may include the tenancy ID (T_ID.T.R2.C3) for a tenancy associated with customer C3 of reseller R2 and customer C3's associated information.

FIG. 9B illustrates the second approach, using vPLC ID as a partition key. In FIG. 9B, the second approach stores information in a table with both customer tenancy ID and vPLC ID as two table columns for lookup by using vPLC ID as a partition key. In other words, the information may be stored in a centralized way inside a table. For example, in FIG. 9B, a reseller R1 associated with vPLC ID (vPLC_ID.vPLC.R1) has three customers, C1, C2 and C3, associated with tenancy IDs, T_ID.T.R1.C1, T_ID.T.R1.C2, and T_ID.T.R1.C3, identifying tenancies for these three customers, respectively. Then, the first three rows of table 930 under the vPLC ID column may be marked as vPLC_ID.vPLC.R1, which is the vPLC ID for vPLC.R1 created for reseller R1. The customer tenancy ID column of the first row can be marked as tenancy ID (T_ID.T.R1.C1) for a tenancy associated with customer C1 of reseller R1, while the tenancy ID column of the second row can be marked as tenancy ID (T_ID.T.R1.C2) for a tenancy associated with customer C2 of reseller R1, and the tenancy ID column of the third row can be marked as tenancy ID (T_ID.T.R1.C3) for a tenancy associated with customer C3 of reseller R1. The information stored in the first three rows belongs to customers C1, C2 and C3 of reseller R1.

The same structure may also be used to store the records for customers C1, C2 and C3 of reseller R2 in the same table 930, for example, the fourth row, the fifth row, and the sixth row. For example, the last three rows of table 930 under the vPLC ID column may be marked as vPLC_ID.vPLC.R2, which is the vPLC ID for vPLC.R2 created for reseller R2. The customer tenancy ID column of the fourth row can be marked as tenancy ID (T_ID.T.R2.C1) for a tenancy associated with customer C1 of reseller R2, while the tenancy ID column of the fifth row can be marked as tenancy ID (T_ID.T.R2.C2) for a tenancy associated with customer C2 of reseller R2, and the tenancy ID column of the sixth row can be marked as tenancy ID (T_ID.T.R2.C3) for a tenancy associated with customer C3 of reseller R2. The information stored in the last three rows belongs to customers C1, C2 and C3 of reseller R2.

Figure 10:
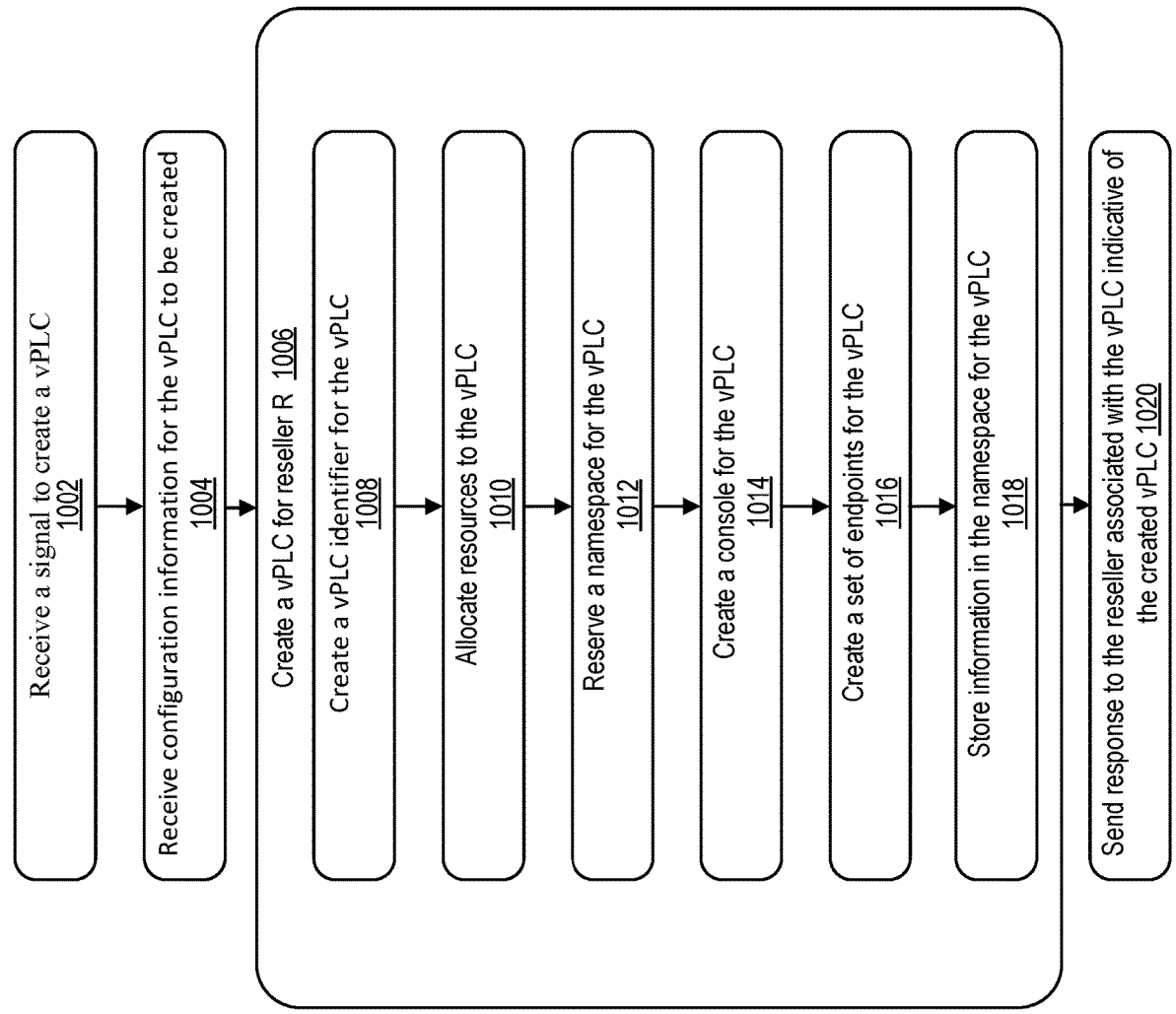
FIG. 10 is a flow chart illustrating an example of vPLC setup process for a reseller of a CSP, according to certain embodiments.

FIG. 10 is a flow chart illustrating an example of vPLC setup process, according to certain embodiments. The processing depicted in FIG. 10 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 10 may include a greater number or a lesser number of steps than those depicted in FIG. 10.

In certain embodiments, for example, the processing depicted in FIG. 10 may be performed by CSP. Some steps may be performed by components (e.g., control plane (CP), resource manager (RM), and management plane (MP), etc.) within CSP-provided regional infrastructure or one or more CSP-provided cloud services, such as endpoint management service (EMS), identity management service, etc.

As previously described, when a reseller subscribes to a CSP-offered vPLC service, a vPLC may be created. At step 1002, a signal may be received to create a vPLC. In certain embodiments, the signal may be a request received when a reseller has subscribed to a CSP-offered vPLC service. The request may be an agreement between the CSP and the reseller, listing virtual models (e.g., nested, or segmented models), database, resource arrangements, customization details, etc. In other embodiments, the signal may be received from some components indicating that a vPLC is being created.

At step 1004, configuration information for the vPLC to be created may be received. In some embodiments, the configuration information may include tenancy information (e.g., tenancy identifier) for which the vPLC is created and information for identifying a realm to be associated with the vPLC. As discussed earlier, a tenancy is created for the reseller and a tenancy identifier that uniquely identifies that tenancy is also created for that reseller associated with the vPLC.

As discussed earlier, in a use case that the vPLC may be used as a virtual data center and may be associated with a different realm than the realm associated with the cloud infrastructure in the region provided by the CSP, the identity and trust profile information (e.g., passwords, credentials, etc.) of the different realm need to be associated with the vPLC. The association of the identity and trust profile information of a different realm may be accomplished by creating a mapping (or "shadow copy") of identity and trust profile information in the vPLC. More details will be discussed in FIG. 18.

Step 1006, which covers steps 1008 to 1018, may perform the process of creating a vPLC for the reseller R. At step 1008, a vPLC identifier for the vPLC may be created. The vPLC that is created for the reseller is treated as a resource and assigned a unique resource identifier, which is referred to as a vPLC identifier (vPLC ID), and the vPLC ID is associated with the reseller's tenancy.

At step 1010, a set of resources from the CSP-provided infrastructure in a region may be allocated to the vPLC. The set of resources allocated to the vPLC may be selected based on the contract between the reseller and the CSP. For example, reseller R may subscribe to one or more cloud services provided by the CSP, such as compute service and object storage service. Thus, the set of resources may include compute resources and object storage resources.

At step 1012, a namespace may be reserved for the vPLC. A resource allocation service (or resource manager (RM)) of the CSP may create and reserve a namespace to group different types of resources that can support the vPLC. A namespace may refer to a logical grouping or virtual boundary that helps organize and manage resources, prevents naming conflicts when multiple instances of similar resources are created. Thus, namespace provides a structured way to organize and group related resources. In some embodiments, namespace 0 is reserved for CSP. Namespace 1 and beyond are used for vPLCs. In certain implementations, a range of internet protocol (IP) addresses may be reserved and associated with the namespace for the vPLC for traffic segregation purpose.

At step 1014, a console may be created for the vPLC allowing reseller R, customers of the reseller and users associated with customers of resellers to configure, access, and manage resources deployed in the vPLC and visualize, access, and interact with reseller-offered cloud services. Additionally, reseller R may configure the console to provide different customized experience for different customers of the reseller.

At step 1016, a set of endpoints for the vPLC may be created. In some embodiments, some of the set of endpoints may be default endpoints (e.g., identity endpoint), which are available for use, and some endpoints are determined based on which cloud services the reseller subscribes to. For example, the reseller may subscribe to one or more CSP-offered cloud services, such as compute, storage, virtual cloud network (VCN), database, etc. As a result, in addition to the default identity endpoint for accessing identity service, endpoints for access the subscribed services may also be created.

At step 1018, vPLC-related information, such as vPLC ID, identity information of reseller and other information facilitating reseller-offered cloud services, may be stored in the namespace for the vPLC. At step 1020, the CSP may send a response and other information to the reseller R indicative of the created vPLC. The reseller may start managing the vPLC for customers of the reseller, such as creating customer accounts, configuring reseller-offered cloud services, etc.

Figure 11:
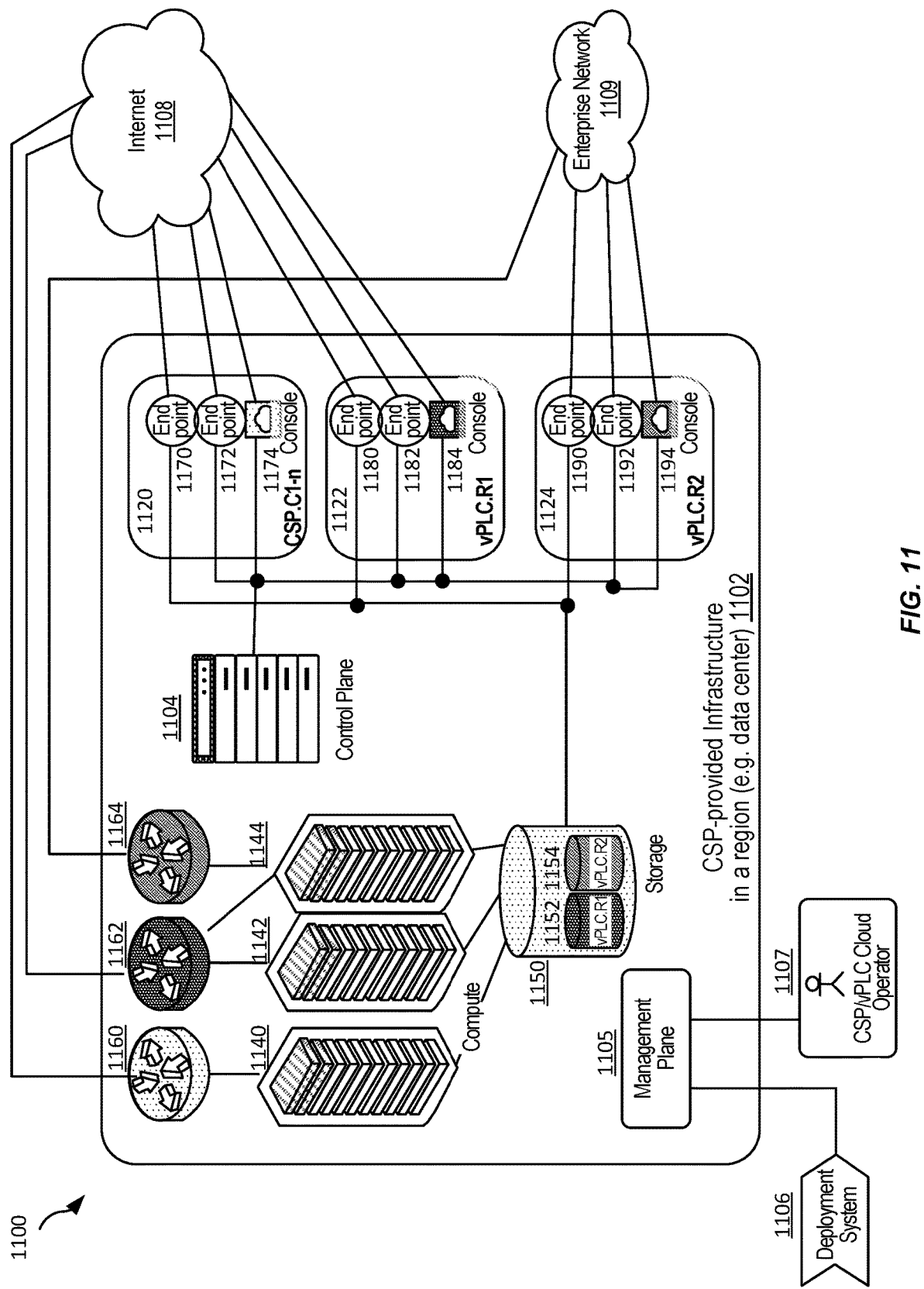
FIG. 11 is a block diagram of a distributed environment illustrating an example of virtual private label clouds (vPLCs) hosted by a CSP-provided infrastructure in a region, according to certain embodiments.

FIG. 11 is a block diagram of a distributed environment illustrating an example of virtual private label clouds (vPLCs) hosted by a CSP-provided infrastructure in a region, according to certain embodiments. FIG. 11 may be similar to FIG. 6, where both figures include securely isolated portions (or partitions) of CSP-provided regional infrastructure (e.g., first portion 602, second portion 604 and third portion 606 in FIG. 6) for CSP's direct customers, vPLC.R1 associated with reseller R1, and vPLC.R2 associated with reseller R2. Direct customers of CSP, customers of reseller R1 and customers of reseller R2 may access their respective partitions through one or more endpoints and consoles. The CSP-provided regional infrastructure 602 may also have a control plane, management plane, and gateway, as described in FIG. 6.

However, FIG. 11 illustrates a more detailed view of the interconnection among resources in the CSP-provided regional infrastructure, such as compute, storage, gateway, CP, and management plane. Additionally, direct non-reseller customers of CSP, customers of reseller R1, and customers of reseller R2, may access the CSP-provided regional infrastructure from either an internet or an enterprise network. For example, a gateway may be used to access the internet or enterprise network from a real application cluster (RAC) in the CSP-provided regional infrastructure.

FIG. 11 illustrates three cloud partitions running on the same CSP-provided regional infrastructure 1102, a CSP's native cloud 1120, and two vPLCs for resellers R1 and R2: vPLC.R1 1122 and vPLC.R2 1124. The CSP-provided regional infrastructure 1102 is operated by the CSP. The CSP-provided regional infrastructure 1102 may also include a control plane 1104 and a management plane 1105. As mentioned above, CP 1104 may be responsible for providing management, deployment, and orchestration functions with a cloud environment provided by a CSP. MP 1105 may be a collection of software components that are responsible for provisioning all the processes and workflows that are needed for a requested operation. Additionally, the software implementing cloud services may originate from the deployment system 1106 and go into the data center in the region through the management plane 1105. Software updates (e.g., new services) for the control plane 1104 may be delivered by the deployment system 1106 through the management plane 1105. The CSP's administrators or reseller's operators 1107 deploying software/services can also access the CSP-provided regional infrastructure through the management plane 1105.

The compute resources, three real application clusters (RACs) 1140, 1142, and 1144, that share the same storage 1150 are partitioned and allocated for CSP's native cloud 1120, vPLC.R1 1122 and vPLC.R2 1124, respectively. For example, RAC 1140 is dedicated to CSP's direct customers, RAC 1142 is designated for vPLC.R1, and RAC 1144 is for vPLC.R2.

The network resources may also be partitioned or shared between the CSP's direct customers and the resellers, allowing their computing resources to connect to the internet or enterprise network. For example, each RACs 1140, 1142, and 1144 uses its network gateway 1160, 1162, and 1164 to access the internet 1108 or enterprise network 1109. In some embodiments, two RACs may share the same network interface. For example, RAC 1142 and RAC 1144 share the same gateway 1162 to access the internet 1108.

The storage in FIG. 11 is simplified. The storage 1150 may include overall storage, dedicated storage, and different types of storage, such as block storage and object storage. In FIG. 11, vPLC.R1 and vPLC.R2 have their dedicated storage 1152 and 1154, respectively. The overall storage 1150 belongs to the CSP.

In FIG. 11, the CSP's native cloud 1120 may provide CSP-offered cloud services to CSP's direct non-reseller customers (e.g., CSP.C1-*n*), such as a corporation. Users associated with customers of resellers may access services via dedicated service endpoints that are part of their respective namespaces comprising fully qualified domain names (FQDNs), IP addresses, console experience, identity, etc. The CSP may provide individual consoles for each reseller, and the consoles provide services through endpoints. Endpoints that are associated with a console could be different based on what services are being provided to the customers of that reseller based on the reseller's subscription. For example, a customer of an individual reseller may send an access request through a dedicated endpoint or via a console.

Users can use the service endpoints 1170 and 1172 (two endpoints are shown but more are possible) that the CSP exposes, where the endpoints have DNS names. The native cloud 1120 may also include a console 1174 with a look and feel. The CSP's direct customers on the internet 1108 can access the CSP-provided regional infrastructure 1102 through public endpoints 1170 and 1172 to request instance launch or termination. The customers of reseller R1 on the internet 1108 can also access the CSP-provided regional infrastructure 1102 through public endpoints 1180 and 1182 to request instance launch or termination. The customers of reseller R2 on the enterprise network 1109 can access the CSP-provided regional infrastructure 1102 through dedicated endpoints 1190 and 1192 to request instance launch or termination. The control plane 1104 can then launch instances, terminates instances, configures the connectivity for those instances and orchestrates services in this data center. The network interface 1160 and 1162 (e.g., internet gateways (IGWs)) for CSP and vPLC.R1, respectively, may provide network interconnection to the internet 1108. The network interface 1164 (e.g., dynamic routing gateway (DRG)) for vPLC.R2 may provide network interconnection to the enterprise network 1109.

In FIG. 11, vPLC.R1 1122 and vPLC.R2 1124 share the same physical infrastructure. Their endpoints are unique to each reseller, for example, endpoints 1180 and 1182 for reseller R1 and endpoints 1190 and 1192 for reseller R2. The consoles 1184 and 1194 are customized for the reseller R1 and reseller R2, respectively. The vPLC's endpoints and consoles may connect to the internet or their enterprise network, depending on their needs. For example, in FIG. 11, vPLC.R1 connects to internet 1108 through network gateway 1162 (e.g., IGW). However, vPLC.R2 does not connect to internet and thus connects to an enterprise network 1109 through a secured network 1164 (e.g., FastConnect) instead. In FIG. 11, gateway 1162 may be sliced and shared by vPLC.R1 and vPLC.R2, and may be part of the orchestration that the CSP implements. In this example, part of vPLC.R2's data can go to the internet 1108, and part can go to its enterprise network 1109.

If the request comes in through the console 1194, it may go to the control plane 604. The control plane can determine that the request comes from vPLC.R2 1124, and can find an available resource (e.g., a computer) from the RAC designated for vPLC.R2 (i.e., 1144 in this case), provision, and then launch this resource. The control plane 604 may then reply to the reseller R2's customer through the console 1194 and provide an IP address for its network configuration (e.g., VCN). The control plane 1104 can orchestrate the gateway 1164 depending on how it is configured, either to the enterprise network 1109 or the internet 1108. The control plane can be aware of not only the request but also the requester, who is either CSP's direct customers, customers of reseller R1 or customers of reseller R2.

As discussed earlier, partitioning of a CSP-provided regional infrastructure can be performed for different vPLCs at various pre-defined infrastructure levels, for example, at the rack level, server level, hypervisor level or VM-level. To illustrate further, for partitioning at the rack level, a vPLC may have its own dedicated racks and the resources within it. For partitioning at the server level, multiple vPLCs may share a rack, but each vPLC has its dedicated servers. Yet, in another example, for partitioning at the hypervisor level, multiple vPLCs may share a server, but each vPLC has its dedicated hypervisors. For partitioning at the VM-level, multiple vPLCs may share a hypervisor, but each vPLC has its dedicated VMs. Thus, there can be two main vPLC infrastructure partitioning models (or the two ends of the spectrum) to achieve the multi-vPLC scheme: a segmented model and a nested model. A segmented model may refer to resource partitioning at the rack level. A nested model may refer to resource partitioning at the VM-level. However, other variations in between are possible considering operational efficiency (e.g., sharing control plane) and fragmentations (i.e., the partition of resources).

Figure 12:
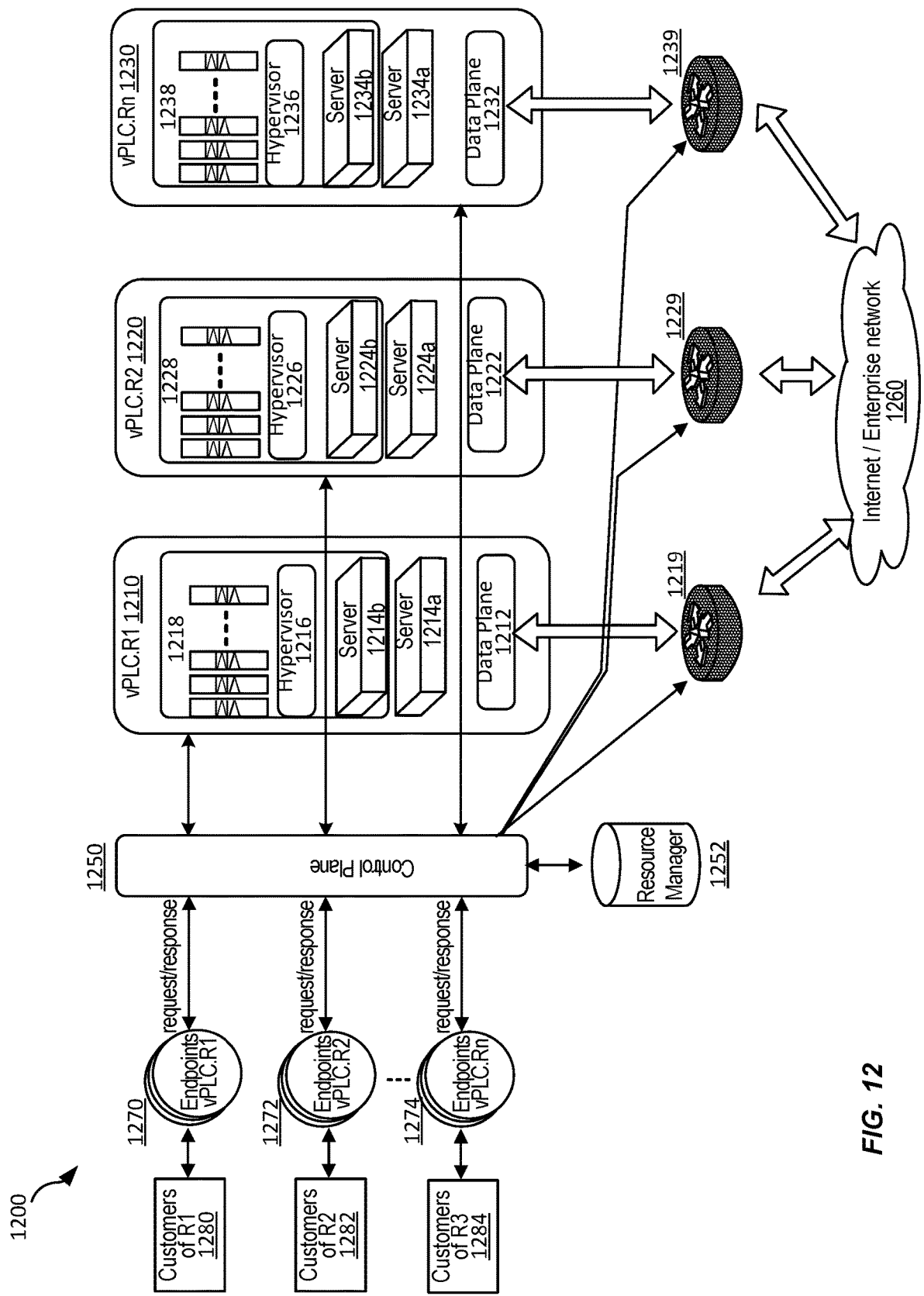
FIG. 12 is a block diagram illustrating a vPLC segmented model for resource partitioning, according to certain embodiments.

FIG. 12 is a block diagram illustrating a vPLC segmented model for resource partitioning, according to certain embodiments. In this model representing one end of the partitioning spectrum, each vPLC may have its dedicated resources, including compute resources and network resources, at the rack level. In other words, a rack may be exclusively allocated to a particular vPLC and not used by other vPLCs or by the CSP for providing CSP-offered services to its direct customers. The segmented model performs resource and usage tracking at the physical resource level based on affinity tagging (e.g., vPLC IDs and customer tenancy IDs). There could be the default behavior for each segment, but each segment can be customized by the reseller associated with the vPLC in that segment.

In FIG. 12, multiple vPLCs (e.g., vPLC.R1 1210, vPLC.R2 1220, and vPLC.Rn 1230) may exist in a CSP-provided infrastructure in a region (e.g., a data center). In certain embodiments, in a segmented model, as illustrated in FIG. 12, there could be physical partitions and logical partitions. For example, for physical partition, a vPLC may be assigned its dedicated hardware resources, for example, a rack, comprising one or more servers, and each server hosting one or more operating systems. In FIG. 12, A first rack is assigned to vPLC.R1 segment 1210, a second rack is assigned to vPLC.R2 segment 1220, and a third rack is assigned to vPLC.Rn segment 1230. Each vPLC may also have a dedicated networking switch (or referred to as a gateway), for example, gateway 1219 for vPLC.R1 1210, gateway 1229 for vPLC.R2 1220, and gateway 1239 for vPLC.Rn 1230, connecting to the internet/enterprise network 1260. Thus, in FIG. 12, vPLC.R1 1210 has dedicated servers 1214*a-b*, a hypervisor 1216 running on server 1214*b* and hosting VMs 1218*a-n*, and a gateway (e.g., IGW) 1219. Similarly, vPLC.R2 1220 has dedicated servers 1224*a-b*, a hypervisor 1226 running on server 1224*b* and hosting VMs 1228*a-n*, and a gateway 1229. vPLC.Rn 1230 has dedicated servers 1234*a-b*, a hypervisor 1236 running on server 1234*b* and hosting VMs 1238*a-n*, and a gateway 1239.

For logical partition, there is a common control plane 1250 and resource manager 1252 that are managed and operated by the CSP for all vPLCs. However, a data plane may be dedicated to each vPLC in the segmented model. For example, each vPLC.R1, vPLC.R2, and vPLC.Rn has its own data plane 1212, 1222 and 1232, respectively. In some embodiments, the resource manager 1252 may be part of a management plane. In other embodiments, the resource manager 1252 may be separate from the management plane.

In some embodiments, a user associated with a customer of reseller R1 1280 may send a request through one of vPLC.R1 endpoints 1270 to launch a VM instance or a bare metal server. Suppose the request is to launch a new VM instance. In that case, the control plane 1250 may work with identity service to check the user's proper credential for vPLC.R1, and then the resource manager 1252 may identify all the resources dedicated to vPLC.R1, such as IP address ranges. Then, a VM instance (e.g., 1218*a*) is launched on hypervisor 1216 in the vPLC.R1 segment 1210. After that, a response is sent back to the requesting user by the control plane 1250 through a vPLC.R1 endpoint 1270. If the request is for a bare metal server (e.g., 1214*a*), the resources for vPLC.R1 may be provisioned and assigned to vPLC.R1 with all necessary configurations by the resource manager 1252. A similar process may be performed for a request from a user associated with a customer of reseller R2 1282 to be fulfilled by vPLC.R2 segment 1220, and a request from a user associated with a customer of reseller Rn 1284 to be fulfilled by vPLC.Rn segment 1230. Each process for a vPLC may be performed independent of another vPLC, and concurrently with another vPLC.

The vPLC segmented model may have some advantages, such as physical separation, and a shared common control plane 1250 that the CSP operates. Additionally, the resource manager 1252 manages the resources across the vPLCs 1210-1230. However, resources, including networking and storage, are replicated to be designated for each vPLC and thus may have scaling challenges. Small footprints, such as a single rack or server, are also less feasible under this model. But, vPLC segmented model may still have shared power, cooling, etc. As mentioned above, the segmented model is just one end of the spectrum, and there are various ways to partition based on resources and efficiency.

Figure 13:
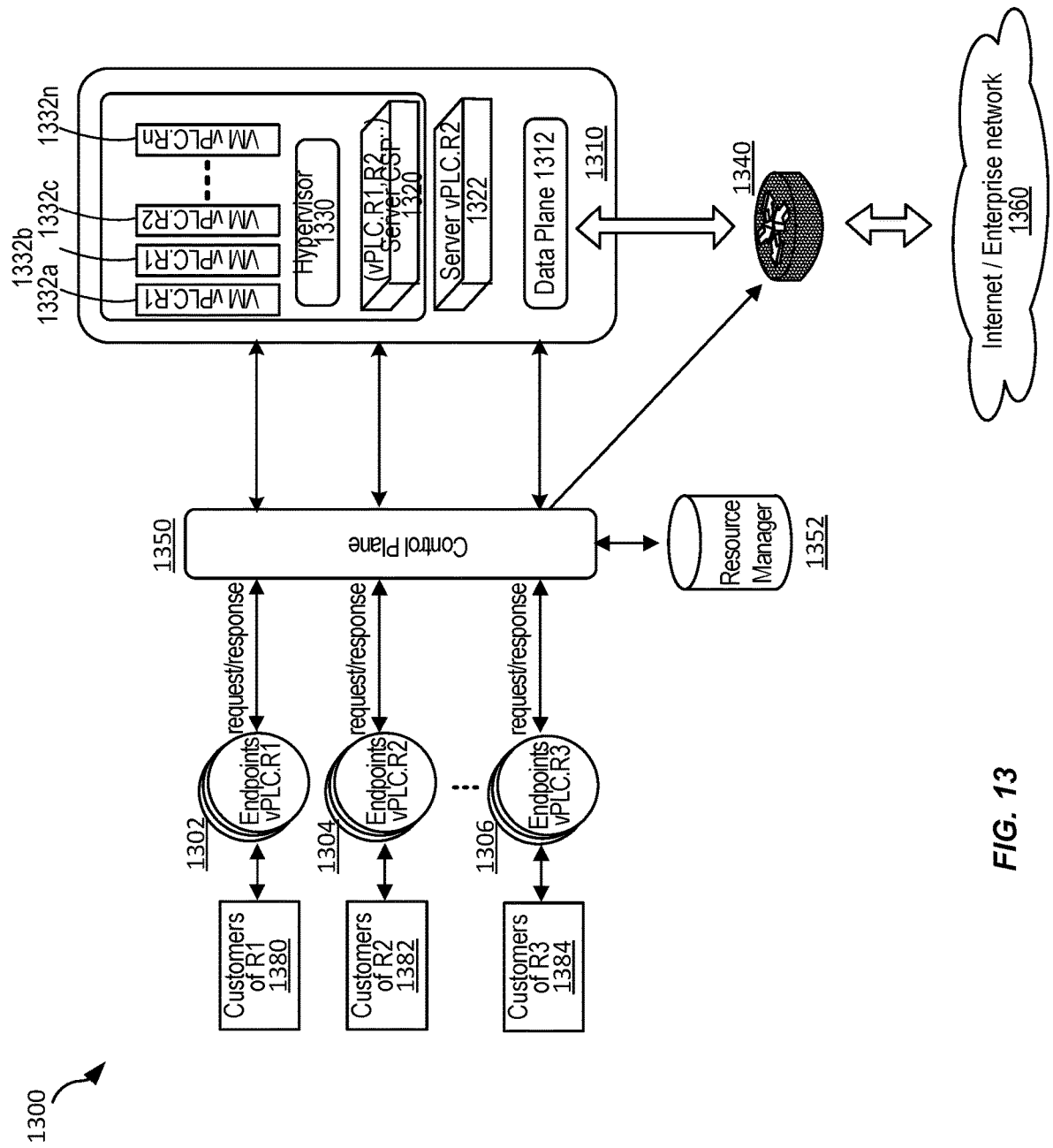
FIG. 13 is a block diagram illustrating a vPLC nested model for resource partitioning, according to certain embodiments.

FIG. 13 is a block diagram illustrating a vPLC nested model for resource partitioning, according to certain embodiments. The nested model in FIG. 13 illustrates the other end of the spectrum of resource partitioning at VM-level. In other words, a VM may be exclusively allocated to a particular vPLC and not used by other vPLCs or by the CSP for providing CSP-offered services to its direct customers. However, a hypervisor, a server, or a rack may be shared between customers of the CSP and customers of one or more vPLCs. In some embodiments, the nested model may have a base layer as a foundation for sharing, such as hypervisor, that no customer has visibility into, and an abstract layer, for example, VMs, may be built on top of the base layer, allowing each reseller to create a clone and customize the abstract layer for the reseller's customers.

In the embodiment of FIG. 13, all vPLCs (e.g., vPLC.R1, vPLC.R2, and vPLC.Rn) are hosted on a single segment with a shared infrastructure shown as "server CSP" 1320 (e.g., a bare metal server) operated by the CSP, where the "server CSP" 1320 may have the control plane function. The server CSP 1320 may be configured to host the hypervisor 1330 that manages the virtual machines (VMs) 1332*a-n* running on the hypervisor. In some embodiments, a segment may comprise multiple racks. Here, two VM instances for vPLC.R1 1332*a-b*, one VM instance for vPLC.R2 1332*c*, and one VM instance for vPLC.Rn 1332*n* reside on a shared hypervisor 1330. All vPLCs share the same data plane 1312 in the segment 1310. In some embodiments, a segment may comprise multiple racks. Since hypervisors, servers, and racks may be shared by multiple vPLCs, the servers for these vPLCs may come from different racks.

FIG. 13 further illustrates a variation of the partitioning scenario in which a reseller R2's customer may request an additional bare metal server, server vPLC.R2 1322, which is provisioned as a dedicated server. In a vPLC nested model, a shared server pool can be placed anywhere space is available. Thus, it provides a low-cost point for resellers.

In FIG. 13, a gateway 1340 (e.g., IGW or DRG) shared by vPLCs has a connection to the internet or enterprise network if required. An incoming packet from internet/enterprise network 1360 may be tagged (i.e., encapsulated in each packet header) with vPLC-related information (e.g., a vPLC ID and a customer tenancy ID) at the gateway 1340 for tracking purposes to reach an appropriate vPLC. The packet encapsulation helps segregate traffic within the single segment 1310 shared by multiple vPLCs. As an example, a packet destined for a VM 1332*a* belonging to a tenancy associated with customer C1 of reseller R1 associated with vPLC.R1 may be encapsulated with a vPLC_ID.vPLC.R1 and customer tenancy ID (T_ID.R1.C1) in the packet header. The packet can then be routed to VMs 1332*a-b* partitioned for vPLC.R1 based on the vPLC ID (vPLC_ID.vPLC.R1). The customer tenancy ID (T_ID.R1.C1) associated with customer C1 of reseller R1 in the packet header can further help route the packet to tenant C1 running on VM 1332*a*. The packet is decapsulated before being delivered to VM 1332*a*.

Similarly, a packet destined for a VM 1332*c* belonging to a tenancy associated with customer C1 of reseller R2 associated with vPLC.R2 may be encapsulated with a vPLC_ID.vPLC.R2 and customer tenancy ID (T_ID.R2.C1) in the packet header. The packet can then be routed to resources partitioned for vPLC.R2 based on the vPLC ID (vPLC_ID.vPLC.R2). The customer tenancy ID (T_ID.R2.C1) associated with customer C1 of reseller R2 in the packet header can further help route the packet to tenant C1 running on VM 1332*c* in vPLC.R2. The packet is decapsulated before being delivered to VM 1332*c*.

An outgoing packet may be performed in a reverse process. For example, an outgoing packet originating from VM 1332*a* in vPLC.R1 and destined for internet 1360 may be encapsulated with vPLC_ID.vPLC.R1 and customer tenancy ID (T_ID.R1. C1) associated with customer C1 of reseller R1 in the packet header. When the packet reaches gateway 1340, the packet may be decapsulated before going to internet 1360. Similarly, an outgoing packet originating from VM 1332*c* in vPLC.R2 and destined for internet 1360 may be encapsulated with vPLC_ID.vPLC.R2 and customer tenancy ID (T_ID.R2.C1) associated with customer C1 of reseller R2 in the packet header. When the packet reaches gateway 1340, the packet may be decapsulated before going to internet 1360. As a result, both the incoming and outgoing traffic is segregated within the single segment 1310 shared by multiple vPLCs.

In some embodiments, in the nested model, one or more VMs may belong to CSP's direct customers and share the same hypervisor as other vPLCs.

Users of resellers accessing vPLC infrastructure are authenticated in both the segmented and nested models. A user associated with a customer of a particular reseller can access an endpoint and be authenticated as a user of a vPLC associated with the particular reseller by using the user's credential, for example, a username and a customer tenancy ID. For example, in some embodiments, in FIG. 13, a user associated with customer C1 of reseller R1 may send a request through one of vPLC.R1 endpoints 1302 to launch a VM instance. The particular vPLC.R1 endpoint 1302 may augment the request with vPLC ID for vPLC.R1. The control plane 1350 may work with identity service to check the user's proper credential for vPLC.R1 (e.g., username of the user and tenancy ID for customer C1). Then the resource manager 1352 can identify all the resources allocated to vPLC.R1, for example, server 1320 and hypervisor 1330, based on the vPLC ID, and VM 1332*a* based on the customer tenancy ID for customer C1. Then, VM instance 1332*a* is launched on hypervisor 1330 accordingly.

Figure 14:
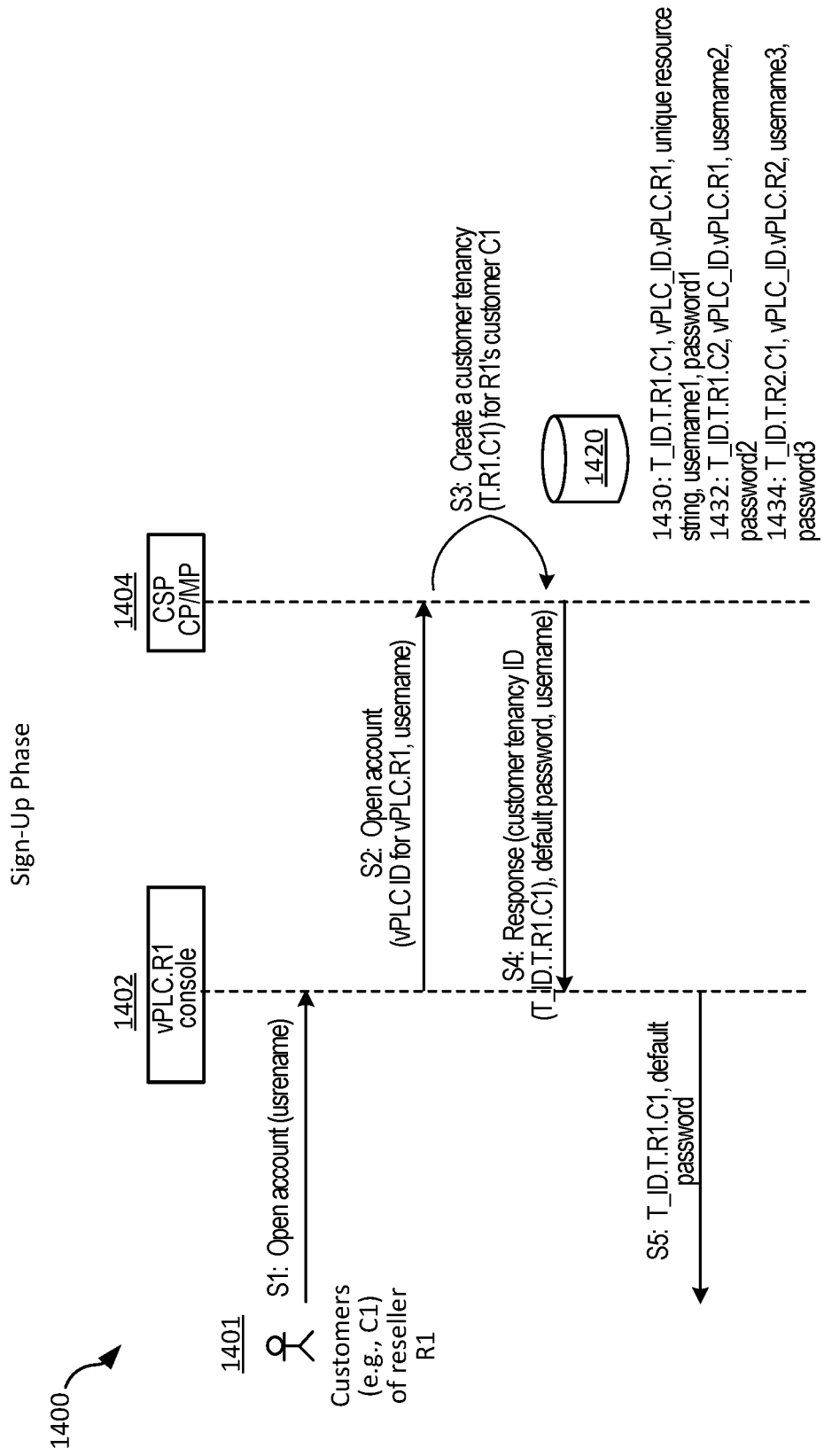
FIG. 14 is a flow diagram illustrating a sign-up process for customers of a reseller associated with a vPLC, according to certain embodiments.

FIG. 14 is a flow diagram illustrating a sign-up process for customers of a reseller associated with a vPLC, according to certain embodiments. When a direct customer of a CSP subscribes to or registers for (i.e., sign up) a cloud service provided by a CSP (i.e., CSP-provided cloud service), a tenancy or an account is created for that customer. Similarly, when a customer of an individual reseller subscribes to or registers for a cloud service provided by that reseller (i.e., reseller-provided cloud service), a tenancy or an account is created for that customer.

FIG. 14 illustrates the sign-up process for a particular customer C1 of a reseller R1. However, the sign-up process is applicable to customers of an individual reseller. In FIG. 14, at step S1, a customer C1 1401 of reseller R1 may use a sign-up portal on a console of vPLC.R1 1402 to sign up to create a new account by entering the user's identity credentials, such as username or account name (e.g., John). At step S2, vPLC1.R1 console 1402 can augment the sign-up request by adding a vPLC ID (e.g., vPLC_ID.vPLC.R1) identifying a vPLC created for reseller R1, to the user's credentials, and forward the sign-up request to CSP (control plane (CP) or management plane (MP)) 1404. In some embodiments, the creation of the account of customer C1 of reseller R1 may be handled by the reseller R1 with assistance from CSP's CP or MP.

At step S3, the CSP then creates a customer tenancy (or an account, T.R1.C1) for customer C1 1401 of reseller R1. A tenancy identifier (T_ID.T.R1.C1) is assigned to the newly created customer C1's tenancy (T.R1.C1). The vPLC ID (e.g., vPLC_ID.vPLC.R1) identifying vPLC.R1 for reseller R1 may be associated with the newly created customer tenancy ID (e.g., T_ID.T.R1.C1) for customer C1, shown in 1430, and stored in a database 1420 along with other credentials (e.g., account name and password). Other customers of reseller R1 and reseller R2 may also be stored in the database 1420. For example, customer tenancy ID of customer C2 of reseller R1 (i.e., R1.C2) is associated with vPLC ID for vPLC.R1-T_ID.T.R1.C2 and vPLC_ID.vPLC.R1, as shown in 1432. Customer tenancy ID of customer C2 of reseller R2 (i.e., R2.C1) is associated with vPLC ID for vPLC.R2-T_ID.T.R2.C1 and vPLC_ID.vPLC.R2, as shown in 1434.

The association between the vPLC ID and the tenancy ID of a customer of an individual reseller may provide isolation between the customer's tenancies within a vPLC. For example, the customer tenancy of R1.C1 may be securely isolated from customer tenancy of R1.C2 by using different customer tenancy IDs, T_ID.T.R1.C1 for customer C1 and T_ID.T.R1.C2 for customer C2, although both customer tenancies are within the same vPLC.R1. Tenancy associated with reseller R1 and tenancy associated with reseller R2 may be securely isolated using their respective vPLC IDs, vPLC_ID.vPLC.R1 for reseller R1 and vPLC_ID.vPLC.R2 for reseller R2.

At step S4, the CSP 1404 may return a handle, including the customer tenancy ID (e.g., T_ID.T.R1.C1), a temporary default password, and an account name back to the vPLC.R1 console 1402. At step S5, the vPLC.R1 console may receive the temporary credentials and forwards the customer tenancy ID and password to the customer C1 1401 of reseller R1. As shown in FIG. 14, customer C1 1401 of reseller R1 can interact directly with the reseller R1 through vPLC.R1 console 1402 to sign up and subscribe one or more reseller-offered cloud services. Similarly, CSP's customers may interact with CSP separately and sign up at a CSP's console (not shown) to subscribe CSP-offered cloud services.

As discussed above in relation to tenancy creation, a database of CSP (e.g., 1420 in FIG. 14) may store vPLC IDs, customer tenancy IDs, and their corresponding credentials. In certain embodiments, multiple customer tenancy IDs may be associated with the same vPLC ID, as shown in 1430 (T_ID.T.R1.C1 is associated with vPLC_ID.vPLC.R1) and 1432 (T_ID.T.R1.C2 is associated with vPLC_ID.vPLC.R1). A tenancy may be defined at the realm level, so tenancy may have a realm identifier associated with a vPLC.

Figure 15:
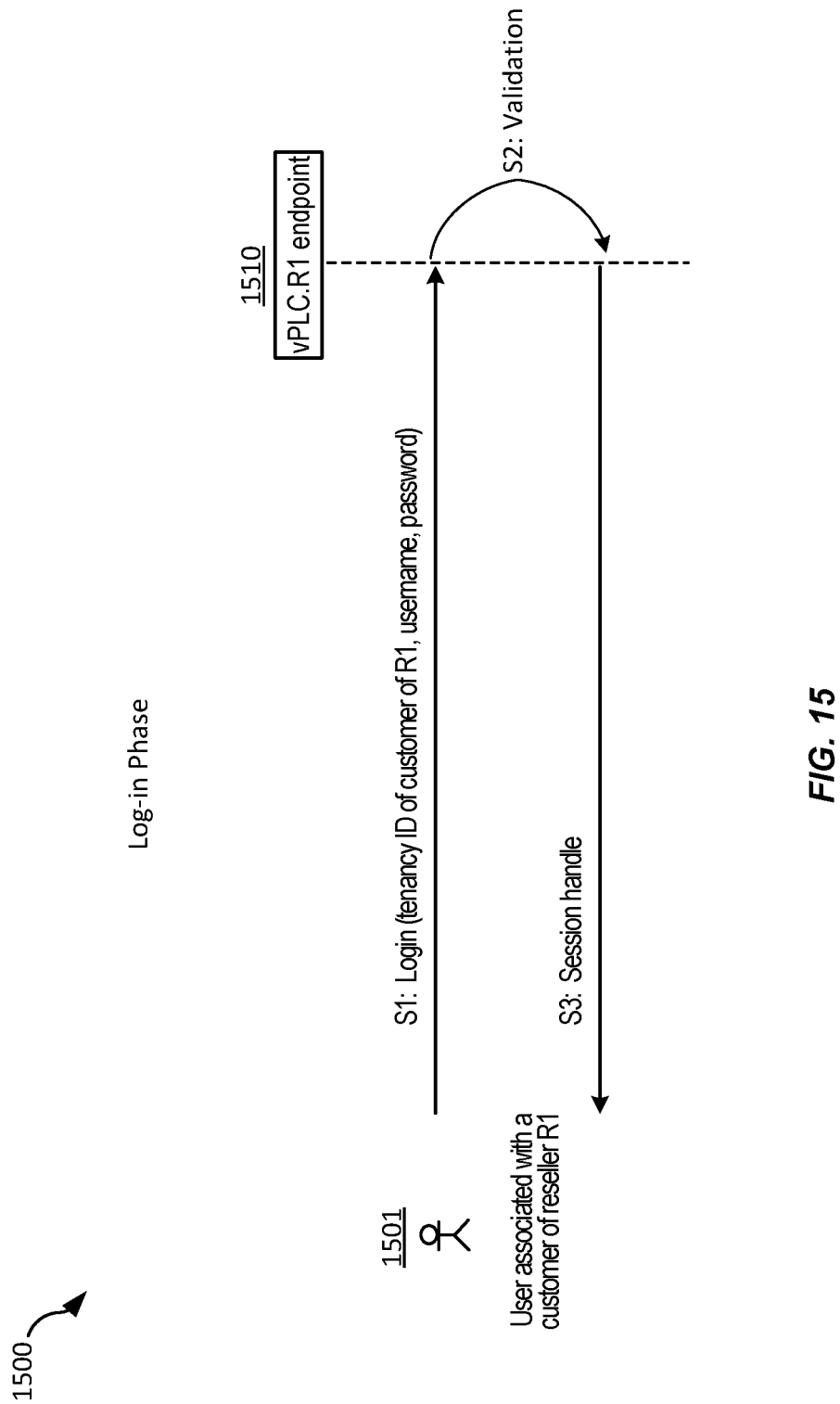
FIG. 15 is a flow diagram illustrating a login process for a user associated with a customer of a reseller associated with a vPLC, according to certain embodiments.

FIG. 15 is a flow diagram illustrating a login process for a user associated with a customer of a reseller associated with a vPLC, according to certain embodiments. In FIG. 15, steps S1 and S2 involve the login phase after a customer of an individual reseller has completed the sign-up process described in FIG. 14

At step S1, a user 1501 associated with a customer of reseller R1 can log in with customer tenancy ID (or CT ID), username, and password at vPLC.R1 endpoint 1510. At S2, the user 1501 and its customer tenancy may be verified at the vPLC.R1 endpoint 1510 by going through a validation process, which may include, but is not limited to, user authentication (e.g., verifying valid credentials such as username and password), session management (e.g., session tokens or timeout), and access control enforcement (based on access privilege, permission, and policies).

At step S3, the vPLC.R1 endpoint 1510 may return a session handle. A session handle may refer to a token or unique identifier returned to a customer after successfully logging in to the customer's account. The session handle may be used for subsequent requests to access the cloud services and resources (e.g., launching an instance) without the need to reauthenticate for each individual request during the active login session (or API session).

Cloud resource IDs (CIDs), including customer tenancy ID, can be generated for resources at the time of the creation of those resources. Virtual machines, accounts, tenancies, authorization policies, virtual network subnets, ACLs, and load balancers may be examples of cloud resources and can therefore be referenced by their respective CIDs.

Figure 16:
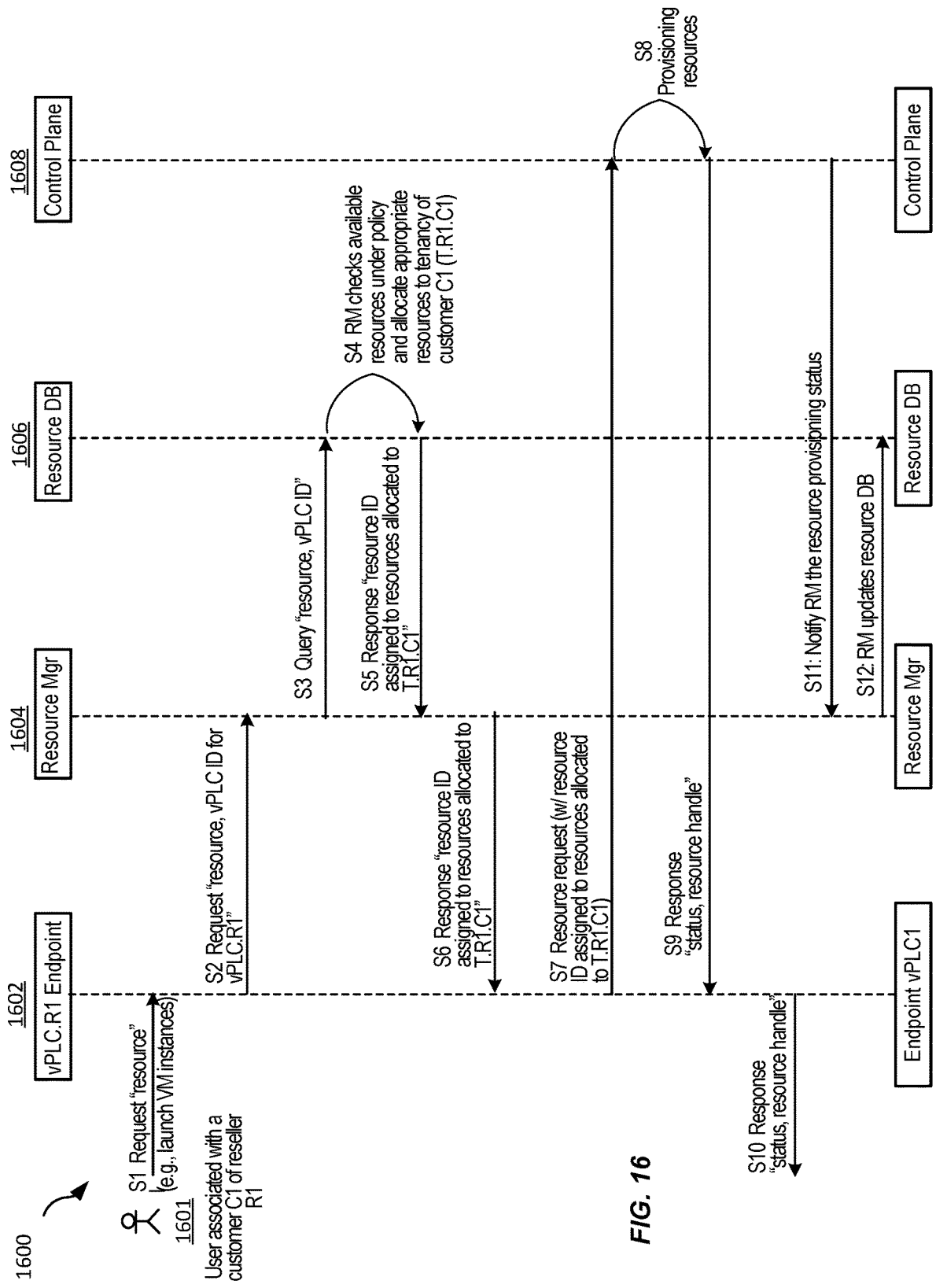
FIG. 16 is a flow diagram illustrating resource allocation and provisioning process for a customer of a reseller associated with a vPLC, according to certain embodiments.

FIG. 16 is a flow diagram illustrating resource allocation and provisioning process for a customer of a reseller associated with a vPLC, according to certain embodiments. The resource manager (RM) manages the resources of the CSP-provided cloud infrastructure in a region and the resource partitions assigned to each vPLC.

As discussed above, a vPLC-specific endpoint can be used by a user associated with a customer of a reseller to access resources associated with a vPLC and to perform one or more functions or operations involving resources allocated to the vPLC. In FIG. 16, at step S1, a user 1601 associated with a customer C1 of a reseller R1 may issue a request through a vPLC-specific endpoint, vPLC.R1 endpoint 1602, to launch a compute instance, for example, a VM instance with 1 GB RAM.

The vPLC.R1 endpoint 1602, at step S2, may augment (or annotate) the request to indicate that the request comes from a customer of reseller R1 by tagging a corresponding vPLC ID (e.g., vPLC_ID.vPLC.R1) for vPLC.R1 endpoint, and forwards the request to the resource manager (RM) 1604. In other words, the annotated information (e.g., vPLC ID) allows the request to be processed with all the policies associated with vPLC.R1 once the request has been authenticated. In some embodiments, the policies associated with a vPLC may include, for example, the type of resources, the amount of the resources allowed for allocation (i.e., capacity limit), permission, etc.

At step S3, the RM 1604 queries its database (i.e., resources database) 1606 to determine if the requested resources are available for vPLC.R1 under the policy. Based on the query, at step S4, the RM may perform the resource allocation after confirming the requested resources are available under the policy. In other words, RM allocates a portion of the resources that are already allocated to vPLC.R1 for reseller R1 to the customer tenancy (T.R1.C1) associated with customer C1 of reseller R1 (based on customer tenancy ID when the user login). This resource allocation may be performed by assigning or designating a portion of available cloud resources (already allocated to vPLC.R1) to the user associated with customer C1 based on the policy agreed between the customer C1 and reseller R1, such as capacity limit or permission, etc. For example, reseller R1 and its customer C1 may have a contract policy to allow maximum 100 GB of memory available for use. Currently, 80 GB has been allocated (or used). If the user associated with customer C1 requests 10 GB, RM can identify the CID for the 10 GB to be provisioned by the CP. If the user associated with customer C1 requests 30 GB, which would exceed the total 100 GB limit, the request may be denied.

At step S5, the RM 1604 obtains a cloud resource ID assigned to the resources (vPLC.R1.C1) allocated to the tenancy (T.R1.C1) of customer C1 of reseller R1 from the resource database. At step S6, RM passes the resource ID to the vPLC.R1 endpoint 1602. At step S7, the vPLC.R1 endpoint 1602 makes a resource request to the control plane (CP) 1608, asking for resources with the specific resource ID assigned to the resources allocated to the tenancy (T.R1.C1) of customer C1 of reseller R1. In other words, the resource manager 1604 can augment (e.g., step S6) the user's request with information related to the vPLC (e.g., resource ID assigned to vPLC.R1.C1) that can be used by the control plane 1608 for provisioning resources (e.g., step S8).

At step S8, the control plane may provision the requested resources (e.g., launching a specific VM instance and storage). Resources may include compute, networking, storage, etc. At step S9, the control plane 1608 may respond with a status and a resource handle to the vPLC.R1 endpoint 1602. A resource handle may refer to a unique resource identifier assigned to a provisioned resource, such as cloud resource ID assigned to a provisioned compute instance (e.g., VM), a storage volume, virtual cloud network (VCN or subnet), database, etc. The resource handle may allow customers to access and manage the provisioned resources through APIs or command-line tools.

At step S10, the status and resource handle are forwarded to the user 1601 associated with customer C1 of reseller R1. At step S11, the control plane may notify the RM about the resource provisioning status, for example, success or failure. At step S12, the RM may update a record in the resource DB 1606 tracking the resource usage of customer C1 associated with the user. Continuing with the above example, the record may be updated to indicate that the total amount of memory used by customer C1 is 90 GB after successful provisioning of 10 GB on top of the previously provisioned 80 GB, or remains to be 80 GB after the user's request was denied. The record kept by the resource DB may help enforce the policies associated with a vPLC.

Figure 17:
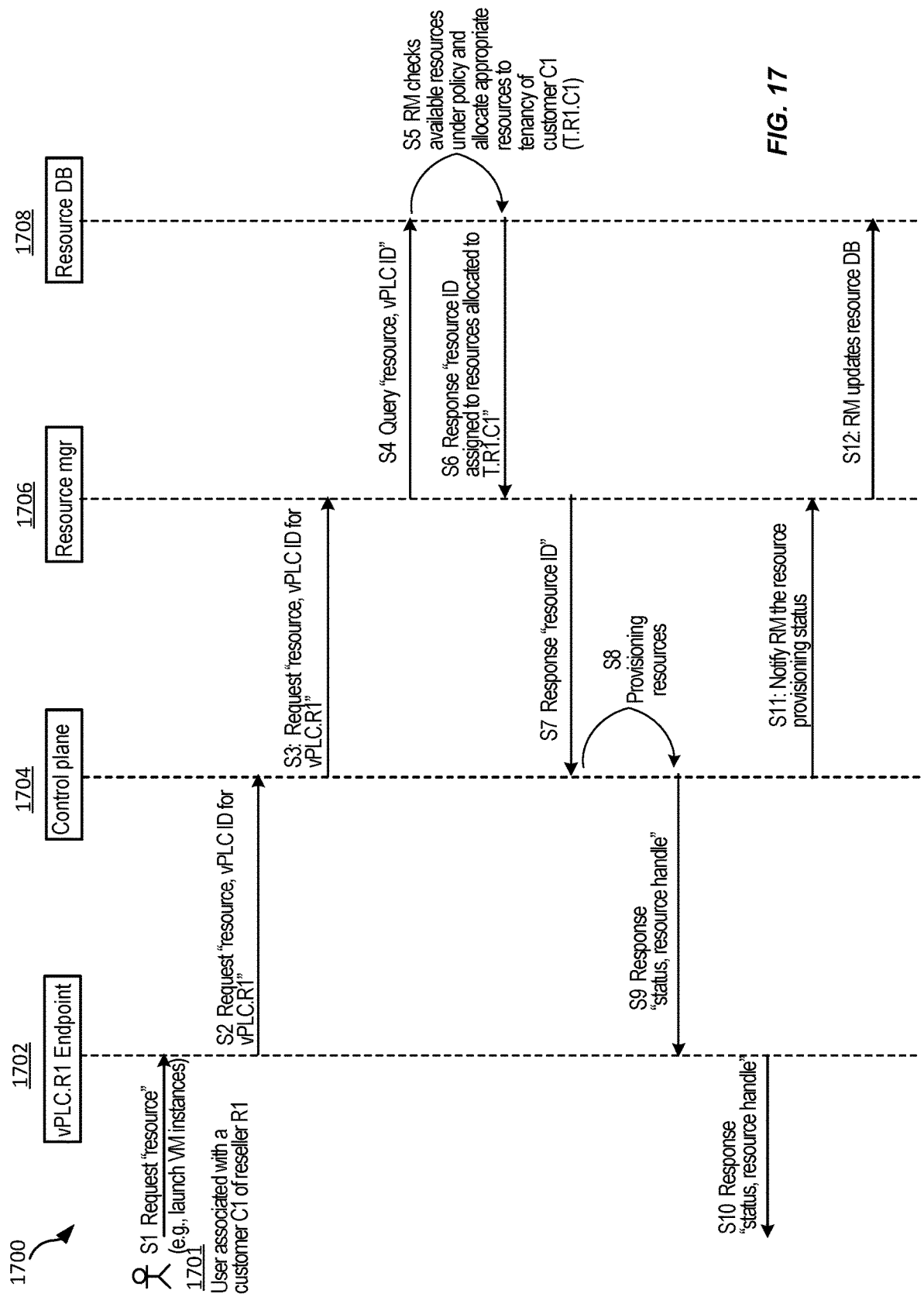
FIG. 17 is a flow diagram illustrating resource allocation and provisioning process for a customer of a reseller associated with a vPLC, according to certain embodiments.

FIG. 17 is a flow diagram illustrating resource allocation and provisioning process for a customer of a reseller associated with a vPLC, according to certain embodiments. FIG. 17 is an alternative embodiment of FIG. 16. Instead of using resource manager (RM) as a central role for receiving a request to communicate with all sub-systems and coordinate the resource allocation and provisioning processes, a control plane (CP) may also be used to play such a central role.

For example, in FIG. 17, at step S1, a user 1701 associated with a customer C1 of reseller R1 may issue a request to a vPLC-specific endpoint, vPLC.R1 endpoint 1702. The vPLC.R1 endpoint 1702, at step S2, may augment the request to indicate that the request comes from reseller R1's customer by tagging a corresponding vPLC ID, and forwards the request to the control plane (CP) 1704. At step S3, CP 1704 forwards the request to the resource manager (RM) 1706. At step S4, the RM 1706 queries its database (i.e., resources database) 1708 to determine if the requested resources are available for vPLC.R1. Based on the query, at step S5, the RM performs the resource allocation if the requested resources are available.

At step S6, the RM obtains a resource ID assigned to the resources (vPLC.R1.C1) allocated to the tenancy (T.R1.C1) of customer C1 of reseller R1 from the resource database. At step S7, RM passes the resource ID to CP 1704. At step S8, the control plane may provision the requested resources. At step S9, the control plane 1704 may respond with a status and a resource handle to the vPLC.R1 endpoint 1702. At step S10, the status and resource handle may be forwarded to the user 1701. At step S11, the control plane may notify the RM about the resource provisioning status. At step S12, the RM may update a record in the resource DB tracking the resource usage of the customer associated with the user.

As shown in FIG. 17, CP 1704 may play a central role by forwarding the resource request to RM 1706 (e.g., step S3) and receiving resource ID from RM (e.g., step S6), and provisioning the requested resources (e.g., step S8). Compared to FIG. 16, this embodiment avoids the need for the vPLC.R1 endpoint 1702 to perform extra steps, such as making a resource request to CP, as shown in steps S7 and S8 in FIG. 16.

Figure 18:
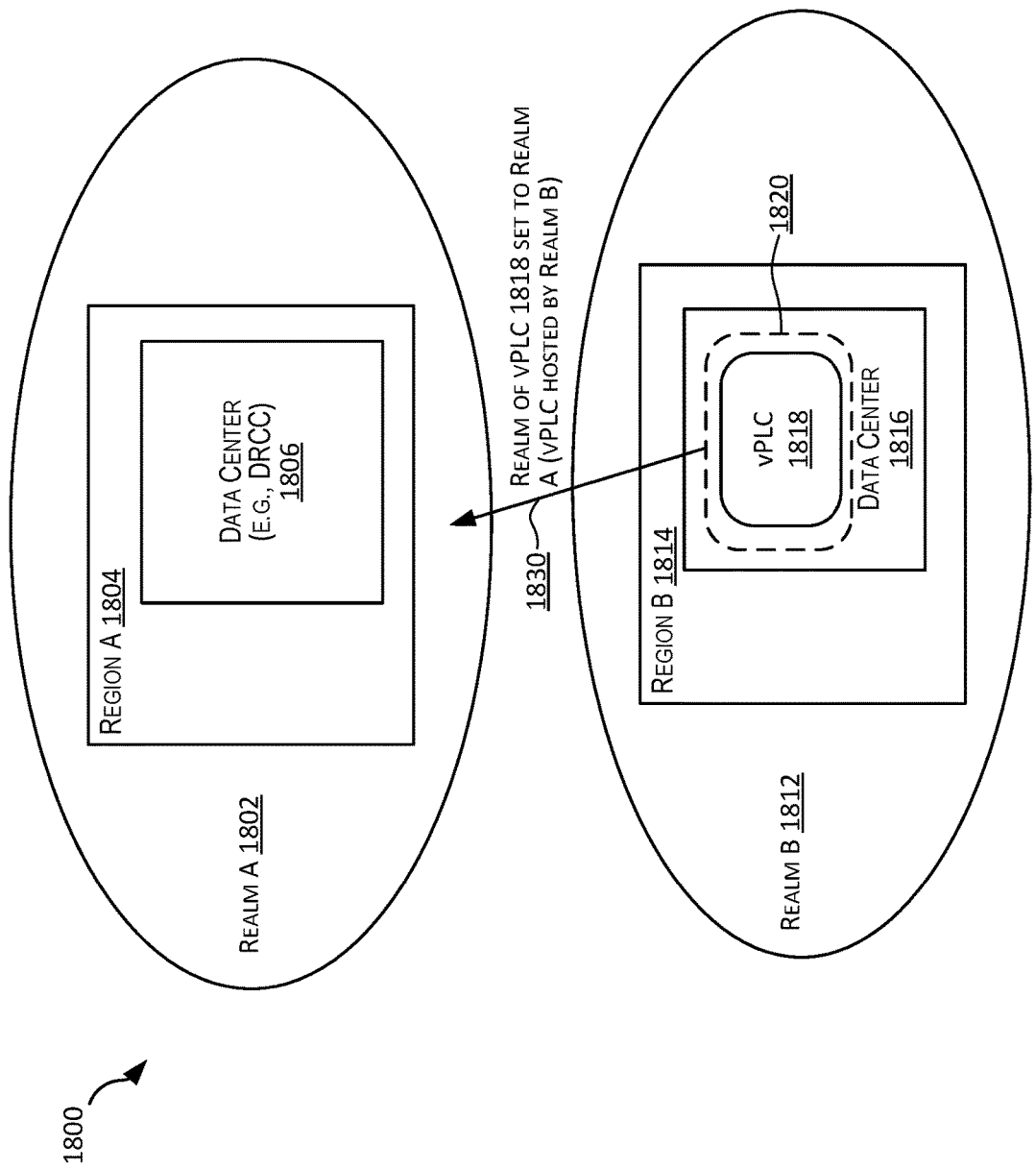
FIG. 18 is a simplified diagram illustrating a use case where a vPLC is hosted by infrastructure in a first realm but associated with a second different realm, according to certain embodiments.

FIG. 18 is a simplified diagram illustrating a use case where a vPLC is hosted by infrastructure in a first realm but associated with a second different realm, according to certain embodiments. In FIG. 18, there are two separate realms, realm A 1802 and realm B 1812 provided by a CSP. Each realm is a logical collection of regions. Realms are isolated from each other and do not share data. Accordingly, realm A 1802 is isolated from realm B 1812 and there is no sharing of data or communications between the two realms. A tenancy created for a customer of the CSP exists in a single realm and cannot be used to access another realm or a region in another realm. A realm enables the CSP to provide defined levels of service across regions in that realm that meet the specific organization needs. For example, one realm may be created by the CSP for heightened levels of security and separation, such as a "Government" realm created for government entities that are customers of the CSP. A second realm may be created by the CSP that has lower heightened levels of security and separation, such as a "Commercial" realm for non-government commercial customers of the CSP. Examples of realms that may be created by a CSP: (a) Commercial realm; (b) US Government FedRAMP Authorized realm; (c) US Government IL5 Authorized realm; (d) Country A Government realm; (e) Country B Government realm; and others. For example, in FIG. 18, Realm A 1802 may have a higher security posture than Realm B 1812.

A realm can have one or more regions. Each realm has its own identity and trust profile (e.g., passwords, credentials, etc.). These identity and trust profile information are shared between regions that are in the same realm, and thus the regions within a realm can communicate with each other. The identity and trust profile for a realm is configured such that cross-realm communications are not allowed.

In the example depicted in FIG. 18, realm A 1802 includes a region A 1804. The infrastructure provided by the CSP in region A 1804 is organized as data center 1806. In FIG. 18, data center 1806 is shown as a dedicated region cloud data center (DRCC) hosted at a customer premise. A DRCC may refer to a fully managed cloud region built with CSP-designed high-performance infrastructure to help customers bring cloud primitives and services closer to existing data and applications of the customer. DRCC may be dedicated to a single customer, and runs inside the customer's data center but is fully managed by the CSP.

In FIG. 18, realm B 1812 includes a region B 1814. The infrastructure provided by the CSP in region B 1814 is organized as data center 1816. As shown in FIG. 18, data center 1816 hosts a vPLC 1818. Accordingly, portions of infrastructure provided by the CSP in data center 1816 in region B 1812 is allocated to vPLC 1818. The vPLC 1818 is thus physically located in region B 1814 in realm B 1812.

As previously described, when a vPLC is created, as part of configuring the vPLC, the vPLC is associated with a particular realm. Typically, the vPLC is associated with the same realm that is associated with the region in which the CSP-provided regional infrastructure that hosts the vPLC is placed. In certain implementations, when a vPLC is configured, the vPLC may be associated with a realm that is different from the realm associated with the regional infrastructure that hosts the vPLC. For example, in the example depicted in FIG. 18, vPLC 1818 may be associated with realm A 1802 instead of realm B 1812. The dashed box 1820 and the associated arrow 1830 are meant to indicate that vPLC 1818 is physically hosted by data center 1816 in realm B 1812, but is logically or virtually associated with and belongs to realm A 1802. Realm B 1812 is referred to as the hosting realm or host realm for vPLC 1818. Realm A 1802 is referred to as the logical realm or virtual realm for vPLC 1818.

This causes vPLC 1818 and data center 1806 to be in the same realm, namely, realm A 1802. Since infrastructure in the same realm shares the same identity and trust profile, the vPLC 1818 is configured with the identity and trust profile of realm A 1802. The configuration of the identity and trust profile information of realm A 1802 may be accomplished by creating a mapping in the vPLC 1818. For example, the identity service APIs in the virtual realm (i.e., realm A 1802) may call the vPLC in the host realm (i.e., realm B 1812), which can accept the call and build trust (i.e., share the identity and trust profile information) between both realms. When an instance is created in a customer tenancy in the vPLC in the host realm, the resource ID and tenancy ID associated with the newly created instance in the host realm may be mapped to a new resource ID and tenancy ID in the virtual realm. Thus, a table of mappings (or "shadow tenancies") may be maintained in the host realm (i.e., realm B 1812). The same process and mapping are also performed in the virtual realm (i.e., realm A 1802). Thus, both the vPLC 1818 and realm A 1802 (i.e., virtual realm) share the same identity and trust profile information. As a result, since vPLC 1818 and data center 1806 are in realm A 1802, they are able to communicate with each other, even though vPLC 1818 is physically hosted by infrastructure in a different realm B 1812. The vPLC 1818 may not be able to communicate with other infrastructure in Region B 1814 that is associated with realm B 1812.

Additionally, vPLC 1818 is also logically associated with Region A 1804 even though the vPLC is physically hosted by Region B 1814. Region B 1814 is referred to as the hosting region or host region for vPLC 1818. Region A 1804 in realm A 1802 is referred to as the logical region or virtual region for vPLC 1818. The virtual realm and the virtual region for the vPLC may be configured when the vPLC is created.

As described about the resource ID for a resource includes a portion that identifies a realm associated with the resource and a portion that identifies a region associated with the resource. A vPLC is considered a resource and thus is assigned a resource ID. In certain implementations, the vPLC ID that uniquely identifies a vPLC is a type of resource ID. The vPLC ID includes a portion that identifies the virtual realm associated with the vPLC identified by the vPLC ID, and a portion that identifies the virtual region associated with the vPLC. Accordingly, for identity management purposes in realm A 1802, the vPLC is considered to be part of the realm and region identified by the vPLC ID corresponding to the vPLC.

In certain embodiments, configuring a vPLC in the manner described above, where the vPLC is hosted by one region and one realm but is associated with a different virtual region and a different virtual realm may be performed utilizing virtual bootstrap environment (ViBE) technology. A ViBE may refer to a virtual cloud network (VCN) that is provisioned in the overlay of an existing region (e.g., a "host region"). Once provisioned, a ViBE is connected to a new region using a communication channel (e.g., an IPSec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust in the new region, and deploy the remaining services in the new region. Utilizing the virtual bootstrap environment can prevent circular dependencies between bootstrapping resources by utilizing resources of the host region. Services can be staged and tested in the ViBE prior to the physical region (e.g., the target region) being available.

For example, in some embodiments, realm B 1812 may create a ViBE within its realm, where the ViBE is shared with the identity and trust profile information of realm A 1802. The ViBE in realm B 1812 may then be used to bootstrap a new region in realm A 1802. Further details related to ViBE are described in the following applications, the entire contents of which are incorporated herein by reference for all purposes:

(1) U.S. Non-Provisional application Ser. No. 18/105,779, filed on Feb. 3, 2023, entitled "VIRTUAL BOOTSTRAP ENVIRONMENT FOR BUILDING REGIONAL DATA CENTERS";
(2) U.S. Non-Provisional application Ser. No. 18/105,768, filed on Feb. 3, 2023, entitled "TECHNIQUES FOR A VIRTUAL BOOTSTRAP ENVIRONMENT IN A DISTRIBUTED VIRTUAL PRIVATE NETWORK"; and
(3) U.S. Non-Provisional application Ser. No. 18/105,779, filed on Feb. 3, 2023, entitled "TECHNIQUES FOR MIGRATING SERVICES FROM A VIRTUAL BOOTSTRAP ENVIRONMENT."

The architecture depicted in FIG. 18, where a vPLC is hosted by one region and one realm but is associated with a different virtual region and a different virtual realm, can be used for different purposes. For example, in the example depicted in FIG. 18, vPLC 1818 may function as a backup for data center 1806. This allows for having a backup for disaster recovery (DR), in different geographies. For example, where data center 1806 is a DRCC located at a customer's premise, the customer may ask the CSP to provide backup services for DRCC 1806. In response, the CSP may select vPLC 1818 for backing up DRCC 1806, where vPLC 1818 is physically hosted in region B 1812 that is far off from and in a different geography from region A 1802 that hosts the DRCC 1806. This may provide a more cost-effective solution for the CSP, instead of having to build another data center for the customer in realm A 1802 just for backup purposes. In certain implementations, the customer may not even know where the backup is performed, i.e., the presence and location of vPLC 1818 may be invisible to the customer. The vPLC being used for the backup may be physically hosted in a CSP-provided cloud in a different realm and region.

Since the goal for DR sites is to minimize the occurrence of correlated failures by introducing a geographic separation between the primary and DR sites and by avoiding concurrent modification of both the primary and secondary locations, the DRCC 1806 can enjoy DR guarantees once the CSP can ensure that the DRCC and the paired vPLC 1818 (and by extension its hosting region in realm B 1812) will not be modified concurrently.

FIG. 19 is a flow chart 1900 illustrating an example method for creating a vPLC where the vPLC is hosted by CSP-provided infrastructure in a particular region in a particular realm but is associated virtually with a different region in a different realm, according to certain embodiments. The processing depicted in FIG. 19 may be performed as part of the processing performed for creating a vPLC. In certain implementations, the processing depicted in FIG. 19 may be primarily performed by the CSP-provided infrastructure in the hosting region and realm.

Processing commences at 1902 when information is received identifying a host region in a host realm in which the vPLC is to be created is to be physically hosted. For example, for the embodiment depicted in FIG. 18, information may be received that a vPLC is to be created in region B 1814 in realm A 1812. The region and the realm identified in 1902 represent the host region and the host realm for the vPLC to be created.

At 1904, information may be received identifying a region in a particular realm, where the particular realm is different from the host realm identified in 1902, where the region identified in 1904 and the particular realm are to be associated as the virtual region and virtual realm for the vPLC to be created. For example, for the embodiment depicted in FIG. 18, information may be received that the vPLC is to be virtually associated with region A 1804 in realm A 1802.

At 1906, identity and trust profile information for the particular realm identified in 1904 is obtained. The information obtained in 1906 may include identity credentials including passwords, certificates, etc., associated with the realm that is to be the virtual realm for the vPLC.

At 1908, a vPLC ID is generated for the vPLC to be created, where the vPLC ID identifies the region and the particular realm identified in the information received in 1904.

At 1910, a vPLC is created in the host realm and resources are allocated to the vPLC, where the allocated resources are selected from resources in infrastructure provided by the CSP in the region identified in 1902 and in the realm identified in 1902. These resources may include one or more physical resources (e.g., racks, servers, routers, memory, or storage resources) and/or logical resources (e.g., hypervisors, virtual machines, virtual routers). For example, for the embodiment depicted in FIG. 18, resources are allocated to the vPLC from data center 1816.

At 1912, the vPLC is configured using the identity and trust profile information obtained in 1906. For example, for the embodiment depicted in FIG. 18, the vPLC may be configured using the identity and trust profile information for realm A 1802.

At 1914, the vPLC commences communication with CSP-provided infrastructure in the particular realm identified in 1904, which is the virtual realm for the vPLC. For example, for the embodiment depicted in FIG. 18, vPLC 1818 communicates with data center 1806. The communication may be initiated by vPLC 1818 or by data center 1806.

Virtual Private Label Clouds (vPLCs)—Metadata Customization

Figure 20:
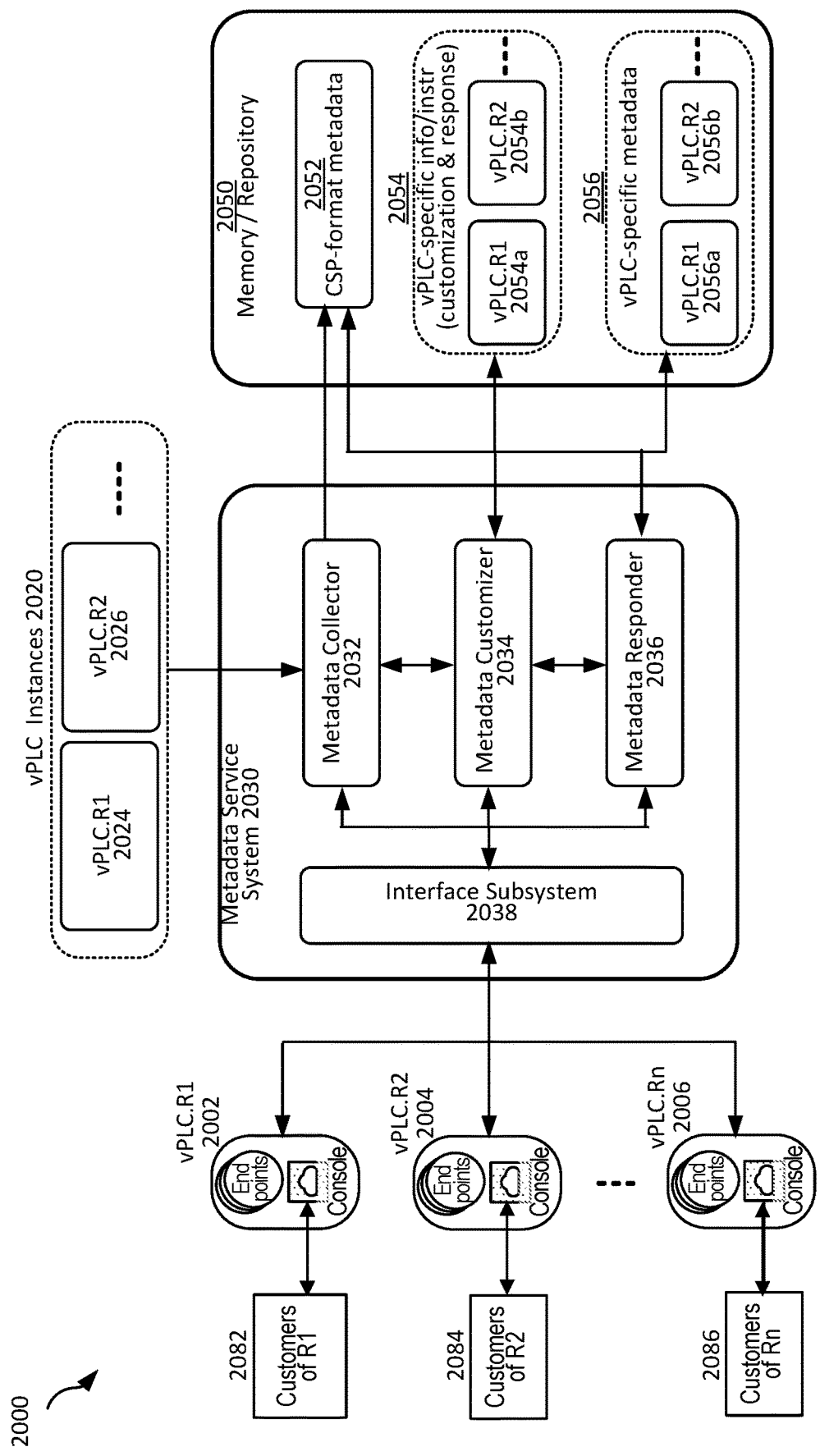
FIG. 20 is a block diagram illustrating a distributed environment providing metadata service, according to certain embodiments.

FIG. 20 is a block diagram illustrating a distributed environment providing metadata service, according to certain embodiments. Distributed environment 2000 depicted in FIG. 20 is merely an example and is not intended to unduly limit the scope of claimed embodiments. Many variations, alternatives, and modifications are possible. For example, in some implementations, distributed environment 2000 may have more or fewer systems or components than those shown in FIG. 20, may combine two or more systems, or may have a different configuration or arrangement of systems. The systems, subsystems, and other components depicted in FIG. 20 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

FIG. 20, a distributed environment 2000 may include vPLC instances 2020, metadata service (MD) system 2030, an overall repository/memory 2050, and a set of endpoints (2002, 2004, and 2006). As shown in FIG. 20, the metadata service system 2030 may include, but is not limited to, a metadata collection subsystem (called metadata collector) 2032 for collecting metadata information, a metadata customizer 2034 for customizing metadata, a metadata responder 2036 for responding to requests for metadata, and an interface subsystem 2038 for providing an interface to the metadata service system. A set of vPLC instances 2020, including vPLC.R1 2024, vPLC.R2 2026, and so on, may be communicatively coupled with the metadata service system 2030.

The overall repository 2050, which may be non-volatile memory (NV), database, disk, etc., may include three repositories used for storing information from or providing information to the metadata service system: (1) a first repository (CSP-format metadata repository) 2052 for storing CSP-format metadata; (2) a second repository (vPLC-specific information repository) 2054 for storing vPLC-specific information for customization instructions and response instructions; and (3) a third repository (vPLC-specific metadata repository) 2056 for vPLC-specific metadata.

A set of vPLC-specific endpoints and consoles, vPLC.R1 2002, vPLC.R1 2004, and vPLC.Rn 2006, may be provided to customers of reseller R1 2082, customers of reseller R2 2084, and customers of reseller Rn 2086 for accessing and performing functions with respect to the metadata service.

As shown in FIG. 20, the vPLC instances 2020 may include vPLCs allocated to resellers from the CSP-provided infrastructure in a region. For example, vPLC.R1 2024 may be an isolated portion of the CSP-provided infrastructure in a region and allocated to reseller R1 to provide reseller-offered cloud services, such as metadata service. vPLC.R2 2026 may be an isolated portion of the CSP-provided infrastructure in a region and allocated to reseller R2 to provide reseller-offered cloud services, such as metadata service. In some embodiments, each vPLC instance may include resources, such as compute, storage, database, network, etc. The resources in each vPLC instance may have associated metadata, such as region, fault domain, domain names, etc.

In FIG. 20, the metadata collector 2032 in the metadata service system 2030 may collect metadata associated with the resources in each vPLC instance. The collected metadata (referred to herein as raw metadata (i.e., without customization)) associated with the resources in vPLC instances is in CSP-format, and may be stored in the first repository (CSP-format metadata repository) 2052. The raw metadata is in CSP-format (e.g., JSON blobs) because resources for vPLC are allocated from the CSP-provided infrastructure in a region. In certain embodiments, the CSP-format metadata 2052 collected from the vPLC instances 2020 may include static metadata and dynamic metadata. Examples of static metadata may include resource identifier (resource ID), console name, IP address, etc. Dynamic metadata may include information that may change over time, such as performance information (e.g., the number of CPUs used or the number of VMs running at a specific time).

In some embodiments, the collection of raw metadata may be performed periodically from the vPLC instances 2020. For example, some metadata may be dynamic and change with time, and thus is collected periodically for efficiency purposes when needed. In other embodiments, the collection of raw metadata may be performed upon request, for example, from customers of resellers (e.g., 2082-2086). As an example, when the metadata service (MDS) system 2030 receives a metadata request, it may check the CSP-format metadata repository 2052. If the CSP-format metadata is stored in the repository 2052, MDS system may retrieve the CSP-format metadata and perform customization based on the vPLC-specific customization instructions. If the CSP-format metadata is not in the repository 2052, the MDS system may need to go through the metadata collector 2032 to obtain the requested metadata from the specific vPLC instance (e.g., either vPLC.R1 2024 or vPLC.R2 2026) and perform customization based on the vPLC-specific customization instructions.

In FIG. 20, in some implementations, the metadata customizer 2034 may interact with the metadata collector 2032 and perform metadata customization by customizing raw metadata (i.e., CSP-format metadata) into vPLC-specific metadata using vPLC-specific customization instructions stored in a vPLC-specific information repository 2054. For example, a CSP-format metadata for a top-level domain name may be "oraclecloud.com." After the customization for vPLC.R1, the vPLC-specific metadata for the top-level domain name may become "vplcR1cloud.com."

The vPLC-specific information, stored in the second repository (vPLC-specific information repository) 2054, may include metadata customization instructions and response instructions. The metadata customization and response instructions 2054 may be vPLC-specific, and stored in separate partitions for vPLC.R1 and vPLC.R2, for example, in a namespace associated vPLC.R1 2054*a* and a namespace associated vPLC.R2 2054*b*.

The vPLC-specific customization instructions may be used by metadata customizer 2034 to customize the CSP-format metadata 2052 (or raw metadata) into vPLC-specific metadata 2056 (to be discussed later). The vPLC-specific metadata response instructions may be used by the metadata responder 2036 to determine how to respond to a metadata request. In some embodiments, the customization instructions and response instructions may be provided by an individual reseller associated with each vPLC, and may be different for different customers of the individual reseller. For example, the metadata customization for customer C1 of the reseller may display one subset of the customized vPLC-specific metadata at the reseller-level, and the metadata customization for customer C2 of the reseller may display another subset of the customized vPLC-specific metadata at the reseller-level.

A vPLC-specific customization instruction may provide instructions (e.g., configurations and rules) on how to translate CSP-format metadata into vPLC-specific metadata, and display the vPLC-specific metadata on a vPLC-specific console (e.g., console in vPLC.R1 2002 or console in vPLC.R2 2004). For example, in some implementations, vPLC-specific metadata customization instructions provided by a reseller associated with the vPLC may include, but are not limited to, types of metadata to be customized, the format to be customized for display, what metadata to be displayed for the customers of a reseller associated with the specific vPLC, and how to display the customized metadata (i.e., the user interface (UI) aspect).

For example, for types of metadata, metadata for region or availability domain may not be customized, and thus may still be displayed under CSP-format, such as "us-phoenix-1," indicating a first AD in the U.S. West region (Phoenix). However, a reseller may prefer to customize the top-level domain name metadata to indicate that a customer of the reseller is accessing a reseller-offered service. As an example, the CSP-format top-level domain "oraclecloud.com" may be customized to display as "vplcR1cloud.com."

For the format of metadata to be customized, in some embodiments, the customization instructions may indicate the types of metrics to be used for specific metadata. For example, the load of a virtual machine (VM) (i.e., resources being utilized) may be represented in many different ways, such as the number of CPUs used, total memory consumed in gigabytes, or storage space being used in terabytes. For another example, network performance may be represented in either latency (ns) or throughput (in GB/sec). For yet another example, the time reference, for launching live migration or terminating cloud resources (e.g., VMs) may be expressed in different formats, such as UTC timestamp (e.g., 2023-09-16T15:00:00Z) or day of the week and time (e.g., Saturday at 01:00 AM).

For what metadata to display, the instructions may want to display all static metadata, such as the operating system (OS) a VM is running in, and only some but not all dynamic metadata, such as performance information of the particular VM (e.g., the load of the VM) but not the total number of available VMs for use at any given time.

In some embodiments, a reseller may aggregate raw metadata in CSP-format, and modify it. For example, if raw metadata contains CPU cycle information of hardware resources, a reseller may customize to generate average usage of CPU cycles in a certain range based on the raw metadata. As another example, a reseller may add cost-saving information on top of the metadata the CSP has provided.

For how to display the customized metadata, the customization instruction may want to display the load of a VM in a graph over time, and provide a command line for metadata requests in addition to the pull-down menu. A reseller may like to display a logo if the reseller is an organization.

The vPLC-specific metadata (i.e., the customized metadata from CSP-format metadata using customization instructions) may be stored in the third repository (vPLC-specific metadata repository) 2056 that includes separate partitions for different vPLCs. Each vPLC has its own customized metadata. For example, vPLC-specific metadata for vPLC.R1 may be customized metadata based on CSP-format metadata collected from vPLC.R1 2024 and stored in a namespace associated with vPLC.R1 2056*a*. vPLC-specific metadata for vPLC.R2 may be customized metadata based on CSP-format metadata collected from vPLC.R2 2026 and stored in a namespace associated with vPLC.R2 2056*b*.

In some embodiments, metadata may be pre-generated in two ways: (1) pre-generated CSP-format metadata, and (2) pre-generated customized vPLC-specific metadata. Pre-generated CSP-format metadata may refer to the raw metadata collected by the metadata collector 2032 from vPLC instances 2020 and then stored in CSP-format metadata repository 2052 before the MDS system receives any request from a user associated with a customer of a reseller. Pre-generated customized vPLC-specific metadata may refer to the metadata that has been customized based on the raw metadata (i.e., the CSP-format metadata) either taken directly from the vPLC instances 2020 or from CSP-format metadata repository 2052, and stored into vPLC-specific metadata repository 2056 before the MDS system receives any request from a user associated with a customer of a reseller.

In other embodiments, a vPLC-specific metadata may be customized on-the-fly without accessing either CSP-format metadata repository 2052 or vPLC-specific metadata repository 2056. For example, when the MDS system 2030 receives a request from a user associated with a customer of a reseller, it may collect raw metadata from vPLC instances 2020, customize the raw metadata into a vPLC-specific metadata using vPLC-specific customization instructions 2054, and send to the requesting user directly. Metadata created by such an on-the-fly customization process may be referred to as on-the-fly customized metadata. In some embodiments, the vPLC-specific metadata created during the on-the-fly customization process may be cached in the repository 2056 for future use.

The metadata responder 2036 may be responsible for taking metadata requests from customers of resellers and responding to the requesting customers. For example, when the MDS system 2030 receives a metadata request, the metadata responder 2036 in the MDS system may check the vPLC-specific response instructions 2054 to determine whether (1) pre-generated customized vPLC-specific metadata stored in 2056 can satisfy the request, (2) CSP-format metadata stored in 2052 should be used to perform customization to generate the response, or (3) on-the-fly customized metadata should be created. In some embodiments, a combination of the above three options may be used based on the request.

As an example, some raw metadata need not be customized according to the vPLC-specific customization instructions, for example, metadata for region as discussed above, and can be just collected from vPLC instances 2020 and stored directly in the vPLC-specific metadata repository 2056. Therefore, the metadata responder may only need to access vPLC-specific metadata repository 2056 to prepare the response. For another example, a request for metadata (e.g., network performance) may change more frequently, and change faster than the collection frequency by the metadata collector 2032. Therefore, the on-the-fly customized metadata may be used.

For yet another example, a fully qualified domain name (FQDN) metadata may change less frequently because a user associated with a customer of a reseller usually accesses a particular cloud service (e.g., compute) for a period of time before switching to another cloud service (e.g., storage). For a metadata request involving FQDN metadata, pre-generated CSP-format metadata (e.g., compute.oraclecloud.com for compute service, and storage.oraclecloud.com for storage service) in repository 2052 may be used for efficiency reasons to perform customization to generate the response. Accessing pre-generated CSP-format metadata (i.e., merely accessing a storage) may be more efficient than collecting raw metadata from vPLC instances 2020, because collecting raw metadata from vPLC instances 2020 may involve several processing steps, such as identifying which particular vPLC instance and a particular resource within that vPLC, performing the metadata collecting function, and retrieving that raw metadata to metadata collector 2032.

Finally, for a request involving multiple metadata, a combination of the above three options may be used. For example, one metadata may need on-the-fly customized metadata, and another metadata may need pre-generated customized vPLC-specific metadata.

As shown in FIG. 20, the interface subsystem 2038 may be communicatively coupled with the set of vPLC-specific endpoints and consoles (referred to as endpoints only for convenience), vPLC.R1 2002, vPLC.R1 2004, and vPLC.Rn 2006, and responsible for interfacing with customers of resellers. For example, in FIG. 20, customers of reseller R1 2082 may request and receive vPLC-specific metadata for vPLC.R1 2024 through endpoints associated with vPLC.R1 2002 and the interface subsystem 2038. Similarly, customers of reseller R2 2084 may request and receive vPLC-specific metadata for vPLC.R2 2026 through endpoints associated with vPLC.R2 2004 and the interface subsystem 2038. In some embodiments, the metadata request may originate internally. For example, the metadata service may create pre-generate customized vPLC-specific metadata rather than waiting until a customer requests. In such case, raw metadata may be collected from a vPLC instance, for example, vPLC.R1 2024, by metadata collector 2032, customized by metadata customizer 2034 using vPLC-specific customization instructions for vPLC.R1 2054a, and then stored in vPLC.R1 2056a of the vPLC-specific metadata repository 2056.

As shown in FIG. 20, metadata service performed by the distributed environment 2000 can support multiple vPLCs concurrently. In some embodiments, the metadata service for each vPLC may be performed independently. For example, a metadata request from a user associated with a customer of reseller R1 may be received by one of the set of endpoints of vPLC.R1 2002, processed by MDS system 2030 by collecting raw metadata from vPLC.R1 instance 2024, customizing the collected raw data using vPLC.R1-specific customization instructions 2054a to generate customized vPLC.R1-specific metadata, and preparing a response using vPLC.R1-specific response instructions 2054a. As a result, the requesting user associated with the customer of reseller R1 may receive a response including the customized vPLC.R1-specific metadata.

Similarly, a metadata request from a user associated with a customer of reseller R2 may be received by one of the set of endpoints of vPLC.R2 2004, processed by MDS system 2030 by collecting raw metadata from vPLC.R2 instance 2026, customizing the collected raw data using vPLC.R2-specific customization instructions 2054b to generate customized vPLC.R2-specific metadata, and preparing a response using vPLC.R2-specific response instructions 2054b. As a result, the requesting user associated with the customer of reseller R2 may receive a response including customized vPLC.R2-specific metadata. The processing for metadata requests from the user associated with a customer of reseller R1 above may be performed independently of the processing for metadata requests from the user associated with a customer of reseller R2.

In some embodiments, metadata service may enable a reseller to manage metadata (e.g., add, modify, or remove) and control the use of some resources. For example, a spot (or preemptive) instance, running in vPLC.R1 2024, can be created by a user associated with a customer (e.g., 2082) of a reseller through a console, API, or other means. A spot (or preemptive) instance may be a compute instance that utilizes spare capacity at a steeply discounted rate, but can be reclaimed by a service provider (e.g., CSP or reseller) after giving a short notice when the capacity is needed elsewhere. The instance can automatically obtain metadata through metadata service about the impending reclamation of this spot (or preemptive) instance. For example, processes on the running instance may query, periodically or by event-driven, metadata related to information of the environment, such as static metadata (e.g., domain name) or dynamic metadata (e.g., an upcoming live migration, cost changes, etc.). Based on the obtained information (e.g., environment changes), the instance can be stopped gracefully. The metadata service may provide customized vPLC-specific metadata (either pre-generated or on the fly) on a vPLC-specific console (e.g., 2002) that allows the user to interact with the metadata service, for example, initiating a graceful stopping of the particular instance.

FIG. 21 is an example flowchart illustrating a metadata service setup process, according to certain embodiments. The processing depicted in FIG. 21 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 21 and described below is intended to be illustrative and non-limiting. Although FIG. 21 depicts the various processing steps occurring in a particular sequence or order, this is not intended to be limiting. In certain alternative embodiments, the processing may be performed in some different order or some steps may also be performed in parallel. It should be appreciated that in alternative embodiments, the processing depicted in FIG. 21 may include a greater number or a lesser number of steps than those depicted in FIG. 21.

In certain embodiments, for example, the processing depicted in FIG. 21 may be performed by one or more components that are tasked with setting up the metadata service. For example, obtaining metadata customization instructions may be performed by the CSP control plane (CP) and one or more subsystems in the metadata service system 2030.

At step 2110, a request may be received to set up a metadata service (MDS) for a vPLC. For example, a reseller R1 may subscribe to a vPLC service provided by the CSP. As a result, a vPLC is created for reseller R1 to provide reseller-offered and reseller-branded cloud services, including a metadata service, to customers of reseller R1. In some embodiments, the request may come from a component of CSP-provided regional infrastructure during the creation of the vPLC for reseller R1.

At step 2112, metadata customization instructions for vPLC-specific metadata customization and metadata response instruction for vPLC-specific metadata response may be obtained. For example, in FIG. 20, vPLC-specific metadata customization and response instructions may be obtained and stored in vPLC-specific information repository 2054 for each vPLC separately, such as vPLC.R1 2054 for instructions specific to vPLC.R1, and vPLC.R2 2054 for instructions specific to vPLC.R2.

At step 2114, the metadata service (MDS) system 2030 may commence metadata service-related functionality for the vPLC. For example, in FIG. 20, the MDS system 2030 may perform a metadata service for a vPLC.R1 by taking a metadata request from a user associated with a customer of reseller R1 2082, collecting raw metadata from vPLC.R1 2024, customizing the raw metadata in CSP-format using vPLC-specific customization instructions obtained from vPLC.R1 2054a to generate vPLC-specific metadata for responding to the request.

Figure 22:
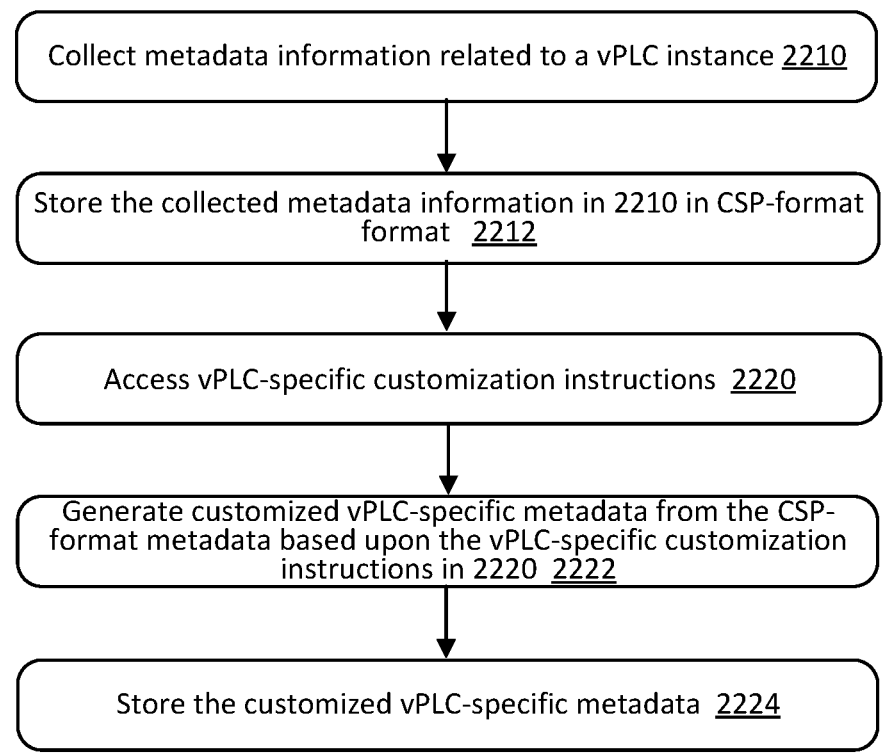
FIG. 22 is an example flowchart illustrating a metadata collection process of metadata service, according to certain embodiments.

FIG. 22 is an example flowchart illustrating a metadata collection process of metadata service, according to certain embodiments. The processing depicted in FIG. 22 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 22 and described below is intended to be illustrative and non-limiting. Although FIG. 22 depicts the various processing steps occurring in a particular sequence or order, this is not intended to be limiting. In certain alternative embodiments, the processing may be performed in some different order, or some steps may also be performed in parallel. It should be appreciated that in alternative embodiments the processing depicted in FIG. 22 may include a greater number or a lesser number of steps than those depicted in FIG. 22.

In certain embodiments, for example, the processing depicted in FIG. 22 may be performed by one or more components that are tasked with performing the metadata collection process of metadata service. For example, step 2210 may be performed by metadata collector 2032 to collect raw metadata, while step 2220 may be performed by metadata customizer 2034 for accessing customization instructions.

At step 2210, metadata related to a vPLC instance may be collected. For example, in FIG. 20, raw metadata for vPLC.R1 may be collected by metadata collector 2032 upon request by another component in the distributed environment based on a metadata request from a customer of reseller R1 2082 or based on an internal request, such as a periodic metadata collection process for efficiency purpose, for example, pre-generated CSP-format metadata or pre-generated customized vPLC-specific metadata.

At step 2212, the collected metadata information in 2212, which is in the CSP format, may be stored in the CSP-format metadata repository 2052. As discussed above, the collected raw metadata from vPLC instances 2020 and stored in the CSP-format metadata repository 2052 may occur before any metadata request from a user associated with a customer of a reseller. This early collection of raw metadata is referred to as pre-generated CSP-format metadata. Since the raw metadata is in CSP format and is common to all vPLC instances, the raw metadata is stored in the repository 2052 for use by all vPLCs.

At step 2220, vPLC specific customization instructions may be accessed to determine how to customize (or translate) the collected raw metadata (i.e., CSP-format metadata) into vPLC-specific metadata. For example, in FIG. 20, the customization instructions may indicate whether metadata is to be customized, what format or metrics are used for customization, which metadata should be displayed to a requesting customer, and how to display the customized metadata. For example, the customization instructions may indicate that metadata for the geographic region is not customized, and can be collected from vPLC instances 2020 and put directly into vPLC-specific metadata repository 2056. The load of VM may be represented as the number of CPUs used for one customer of a reseller and as the total memory consumed in gigabytes for another customer of the reseller.

At step 2222, customized vPLC-specific metadata is generated from the CSP-format metadata based upon the vPLC-specific customization instructions in 2220. For example, in FIG. 20, the CSP-format top-level domain metadata "oraclecloud.com" may be customized to be "vplcR1cloud.com" based on vPLC-specific customization instructions stored in vPLC.R1 2054a in vPLC-specific information repository 2054. In some embodiments, more than one customized vPLC-specific metadata may be generated from CSP-format metadata at a time instead of sequentially.

At step 2224, the customized vPLC-specific metadata may be stored. For example, in FIG. 20, customized vPLC-specific metadata may be generated before the MDS system 2030 receives any metadata request from a user associated with a customer of a reseller, and stored in vPLC-specific metadata repository 2056. In some embodiments, customized vPLC-specific metadata generated during the on-the-fly customization process may be cached in the vPLC-specific metadata repository 2056 for later use when another user associated with the same customer requests the same vPLC-specific metadata.

Figure 23:
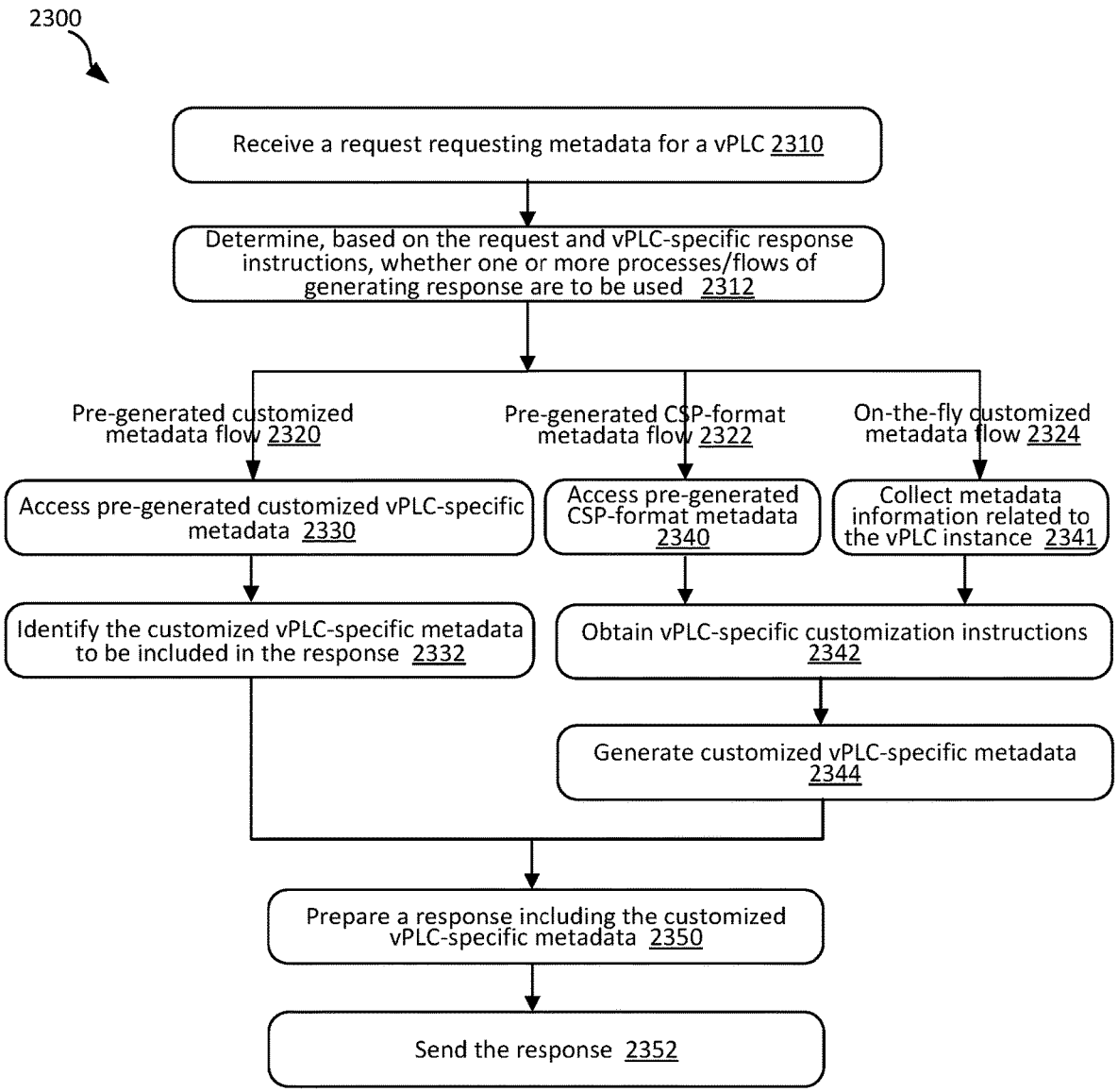
FIG. 23 is an example flowchart illustrating vPLC-specific metadata response process of metadata service, according to certain embodiments.

FIG. 23 is an example flowchart illustrating vPLC-specific metadata response process of metadata service, according to certain embodiments. The processing depicted in FIG. 23 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 23 and described below is intended to be illustrative and non-limiting. Although FIG. 23 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 23 may include a greater number or a lesser number of steps than those depicted in FIG. 23.

In certain embodiments, for example, the processing depicted in FIG. 23 may be performed by one or more components that are tasked with performing vPLC-specific metadata response process of metadata service. For example, step 2310 may be performed by vPLC-specific endpoints (2002-2006) and interface subsystem 2038 to receive and transfer requests to MDS system 2030. For another example, step 2350 may be performed by metadata responder 2036 for preparing a response.

At step 2310, a request requesting metadata for a vPLC may be received. For example, in FIG. 20, a user associated with customer C1 of reseller R1 may request metadata related to a VM instance through a compute service endpoint of a set of endpoints vPLC.R1 2002. The request may be received by the interface subsystem 2038 in the MDS system 2030. In some embodiments, the request may originate internally within the MDS system 2030.

At step 2312, one or more processes/flows (2320, 2322 and 2324) of generating a response to the request in 2310 may be used depending on the determination based on the request and the vPLC-specific response instructions. In some embodiments, the MDS system may determine only one of the flows, pre-generated customized vPLC-specific metadata flow 2320, pre-generated CSP-format metadata flow 2322, and on-the-fly customized metadata flow 2324, need to be used. For example, the request indicates that the requesting user associated with customer C1 of reseller R1 only wants the most up-to-date performance information for a VM. Accordingly, based on the request and response instructions, only the on-the-fly customized metadata flow 2324 may be used.

In other embodiments, the MDS system may determine that two processes (or flows) should be used to satisfy the request. For example, in a metadata request for both FQDN of a compute service and the region where the compute service is performed, both pre-generated customized metadata flow 2320 and pre-generated CSP-format metadata flow 2322 may be used. The pre-generated customized metadata flow may access vPLC-specific metadata repository 2056 to obtain the region metadata (e.g., us-phoenix-1), which does not need customization according to the customization instructions discussed earlier. The pre-generated CSP-format metadata flow may access the CSP-format metadata repository 2052 to obtain FQDN (e.g., compute.oraclecloud.com), which is less frequently changed, to generate vPLC-specific metadata (e.g., compute.vplcR1cloud.com) as discussed earlier.

In FIG. 23, pre-generated customized metadata flow 2320 covers steps 2330, 2332, 2350, and 2352. At step 2330, pre-generated customized vPLC-specific metadata stored in vPLC-specific metadata repository 2056 may be accessed. For example, in FIG. 20, if a metadata request is for vPLC.R1, then vPLC.R1 2054a may be accessed. If a metadata request is for vPLC.R2, then vPLC.R2 2054a may be accessed. At step 2332, the customized vPLC-specific metadata may be identified to be included in the response. As illustrated in the above example, region metadata (e.g., us-phoenix-1) may be identified to be included in the response. At step 2350, a response including the pre-generated customized vPLC-specific metadata may be prepared and generated. At step 2352, the generated response may be sent to the requester, either the user associated with the customer of the reseller or another component in the MDS system 2030.

Referring back to FIG. 23, pre-generated CSP-format metadata flow 2322 may cover steps 2340, 2342, 2344, 2350, and 2352. At step 2340, pre-generated CSP-format metadata may be accessed. The pre-generated CSP-format metadata may be stored in the CSP-format metadata repository 2052 and common to all vPLCs. At step 2342, vPLC-specific customization instructions may be obtained. For example, in FIG. 20, vPLC-specific customization instructions for vPLC.R1 may be obtained from the namespace associated with vPLC.R1 2054a in the vPLC-specific information repository 2054 to determine how to customize the obtained pre-generated CSP-format metadata in 2340. vPLC-specific customization instructions for vPLC.R2 may be obtained from the namespace associated with vPLC.R2 2054b in the vPLC-specific information repository 2054 to determine how to customize the obtained pre-generated CSP-format metadata in 2340.

At step 2344, customized vPLC-specific metadata may be generated based on the vPLC-specific customization instructions. For example, in FIG. 20, customized vPLC-specific metadata for a request from a user associated with a customer of reseller R1 may be generated based on the customization instructions obtained from vPLC.R1 2054a. Customized vPLC-specific metadata for a request from a user associated with a customer of reseller R2 may be generated based on the customization instructions obtained from vPLC.R2 2054b.

At step 2350, a response including the customized vPLC-specific metadata may be prepared and generated. At step 2352, the generated response may be sent to the requester, either the user associated with the customer of the reseller or another component in the MDS system 2030.

Referring back to FIG. 23, on-the-fly customized metadata flow 2324 may cover steps 2341, 2342, 2344, 2350, and 2352. At step 2341, raw metadata information related to the vPLC instance may be collected. For example, in FIG. 20, raw metadata in CSP-format related to vPLC.R1 may be collected from vPLC.R1 instance 2024, and raw metadata in CSP-format related to vPLC.R2 may be collected from vPLC.R2 instance 2026. At step 2342, vPLC-specific customization instructions may be obtained. For example, in FIG. 20, vPLC-specific customization instructions for vPLC.R1 may be obtained from the namespace associated with vPLC.R1 2054*a* in the vPLC-specific information repository 2054 to determine how to customize the raw metadata collected from vPLC.R1 instance 2024. vPLC-specific customization instructions for vPLC.R2 may be obtained from the namespace associated with vPLC.R2 2054*b* in the vPLC-specific information repository 2054 to determine how to customize the raw metadata collected from vPLC.R2 instance 2026. Steps 2344, 2350, and 2352 are the same between pre-generated CSP-format metadata flow 2322 and on-the-fly customized metadata flow 2324, and can performed as discussed in relation to on-the-fly customized metadata flow 2324.

Example CSPI Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed is first set up. In some instances, the provisioning can be done manually, a provisioning tool may be utilized to provision the resources, and/or deployment tools may be utilized to deploy the code once the infrastructure is provisioned.

Figure 24:
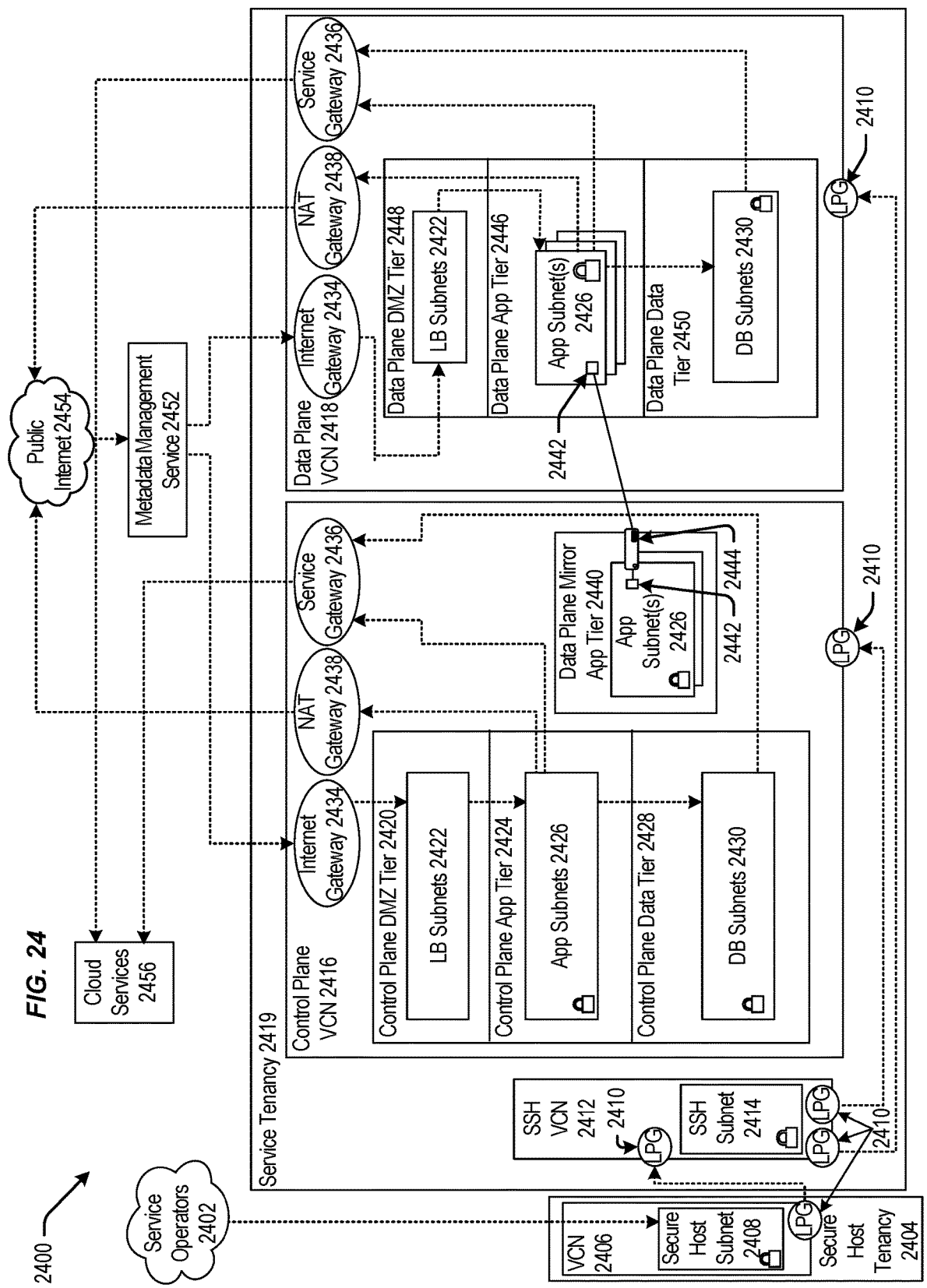
FIG. 24 is a block diagram illustrating one pattern for implementing a cloud infrastructure as a service system, according to at least one embodiment.

FIG. 24 is a block diagram 2400 illustrating an example pattern of an IaaS architecture, according to at least one embodiment. Service operators 2402 can be communicatively coupled to a secure host tenancy 2404 that can include a virtual cloud network (VCN) 2406 and a secure host subnet 2408. In some examples, the service operators 2402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 2406 and/or the Internet.

The VCN 2406 can include a local peering gateway (LPG) 2410 that can be communicatively coupled to a secure shell (SSH) VCN 2412 via an LPG 2410 contained in the SSH VCN 2412. The SSH VCN 2412 can include an SSH subnet 2414, and the SSH VCN 2412 can be communicatively coupled to a control plane VCN 2416 via the LPG 2410 contained in the control plane VCN 2416. Also, the SSH VCN 2412 can be communicatively coupled to a data plane VCN 2418 via an LPG 2410. The control plane VCN 2416 and the data plane VCN 2418 can be contained in a service tenancy 2419 that can be owned and/or operated by the IaaS provider.

The control plane VCN 2416 can include a control plane demilitarized zone (DMZ) tier 2420 that acts as a perimeter network (e.g., portions of a corporate network between the corporate intranet and external networks). The DMZ-based servers may have restricted responsibilities and help keep breaches contained. Additionally, the DMZ tier 2420 can include one or more load balancer (LB) subnet(s) 2422, a control plane app tier 2424 that can include app subnet(s) 2426, a control plane data tier 2428 that can include database (DB) subnet(s) 2430 (e.g., frontend DB subnet(s) and/or backend DB subnet(s)). The LB subnet(s) 2422 contained in the control plane DMZ tier 2420 can be communicatively coupled to the app subnet(s) 2426 contained in the control plane app tier 2424 and an Internet gateway 2434 that can be contained in the control plane VCN 2416, and the app subnet(s) 2426 can be communicatively coupled to the DB subnet(s) 2430 contained in the control plane data tier 2428 and a service gateway 2436 and a network address translation (NAT) gateway 2438. The control plane VCN 2416 can include the service gateway 2436 and the NAT gateway 2438.

The control plane VCN 2416 can include a data plane mirror app tier 2440 that can include app subnet(s) 2426. The app subnet(s) 2426 contained in the data plane mirror app tier 2440 can include a virtual network interface controller (VNIC) 2442 that can execute a compute instance 2444. The compute instance 2444 can communicatively coupled with the app subnet(s) 2426 of the data plane mirror app tier 2440 to app subnet(s) 2426 that can be contained in a data plane app tier 2446.

The data plane VCN 2418 can include the data plane app tier 2446, a data plane DMZ tier 2448, and a data plane data tier 2450. The data plane DMZ tier 2448 can include LB subnet(s) 2422 that can be communicatively coupled to the app subnet(s) 2426 of the data plane app tier 2446 and the Internet gateway 2434 of the data plane VCN 2418. The app subnet(s) 2426 can be communicatively coupled to the service gateway 2436 of the data plane VCN 2418 and the NAT gateway 2438 of the data plane VCN 2418. The data plane data tier 2450 can also include the DB subnet(s) 2430 that can be communicatively coupled to the app subnet(s) 2426 of the data plane app tier 2446.

The Internet gateway 2434 of the control plane VCN 2416 and of the data plane VCN 2418 can be communicatively coupled to a metadata management service 2452 that can be communicatively coupled to public Internet 2454. Public Internet 2454 can be communicatively coupled to the NAT gateway 2438 of the control plane VCN 2416 and of the data plane VCN 2418. The service gateway 2436 of the control plane VCN 2416 and of the data plane VCN 2418 can be communicatively coupled to cloud services 2456.

In some examples, the service gateway 2436 of the control plane VCN 2416 or of the data plane VCN 2418 can make application programming interface (API) calls to cloud services 2456 without going through public Internet 2454. The API calls to cloud services 2456 from the service gateway 2436 can be one-way: the service gateway 2436 can make API calls to cloud services 2456, and cloud services 2456 can send requested data to the service gateway 2436. But, cloud services 2456 may not initiate API calls to the service gateway 2436.

In some examples, the secure host tenancy 2404 can be directly connected to the service tenancy 2419, which may be otherwise isolated. The secure host subnet 2408 can communicate with the SSH subnet 2414 through an LPG 2410 that may enable two-way communication over an otherwise isolated system. Connecting the secure host subnet 2408 to the SSH subnet 2414 may give the secure host subnet 2408 access to other entities within the service tenancy 2419.

The control plane VCN 2416 may allow users of the service tenancy 2419 to set up or otherwise provision desired resources. Desired resources provisioned in the control plane VCN 2416 may be deployed or otherwise used in the data plane VCN 2418. In some examples, the control plane VCN 2416 can be isolated from the data plane VCN 2418, and the data plane mirror app tier 2440 of the control plane VCN 2416 can communicate with the data plane app tier 2446 of the data plane VCN 2418 via VNICs 2442 that can be contained in the data plane mirror app tier 2440 and the data plane app tier 2446.

In some examples, users of the system, or customers, can make requests, for example create, read, update, or delete (CRUD) operations, through public Internet 2454 that can communicate the requests to the metadata management service 2452. The metadata management service 2452 can communicate the request to the control plane VCN 2416 through the Internet gateway 2434. The request can be received by the LB subnet(s) 2422 contained in the control plane DMZ tier 2420. The LB subnet(s) 2422 may determine that the request is valid, and in response to this determination, the LB subnet(s) 2422 can transmit the request to app subnet(s) 2426 contained in the control plane app tier 2424. If the request is validated and requires a call to public Internet 2454, the call to public Internet 2454 may be transmitted to the NAT gateway 2438 that can make the call to public Internet 2454. Metadata that may be desired to be stored by the request can be stored in the DB subnet(s) 2430.

In some examples, the data plane mirror app tier 2440 can facilitate direct communication between the control plane VCN 2416 and the data plane VCN 2418. For example, changes, updates, or other suitable modifications to configuration may be desired to be applied to the resources contained in the data plane VCN 2418. Via a VNIC 2442, the control plane VCN 2416 can directly communicate with, and can thereby execute the changes, updates, or other suitable modifications to configuration to, resources contained in the data plane VCN 2418.

In some embodiments, the control plane VCN 2416 and the data plane VCN 2418 can be contained in the service tenancy 2419. In this case, the user, or the customer, of the system may not own or operate either the control plane VCN 2416 or the data plane VCN 2418. Instead, the IaaS provider may own or operate the control plane VCN 2416 and the data plane VCN 2418, both of which may be contained in the service tenancy 2419. This embodiment can enable isolation of networks that may prevent users or customers from interacting with other users', or other customers', resources. Also, this embodiment may allow users or customers of the system to store databases privately without needing to rely on public Internet 2454, which may not have a desired level of threat prevention, for storage.

In other embodiments, the LB subnet(s) 2422 contained in the control plane VCN 2416 can be configured to receive a signal from the service gateway 2436. In this embodiment, the control plane VCN 2416 and the data plane VCN 2418 may be configured to be called by a customer of the IaaS provider without calling public Internet 2454. Customers of the IaaS provider may desire this embodiment since database(s) that the customers use may be controlled by the IaaS provider and may be stored on the service tenancy 2419, which may be isolated from public Internet 2454.

Figure 25:
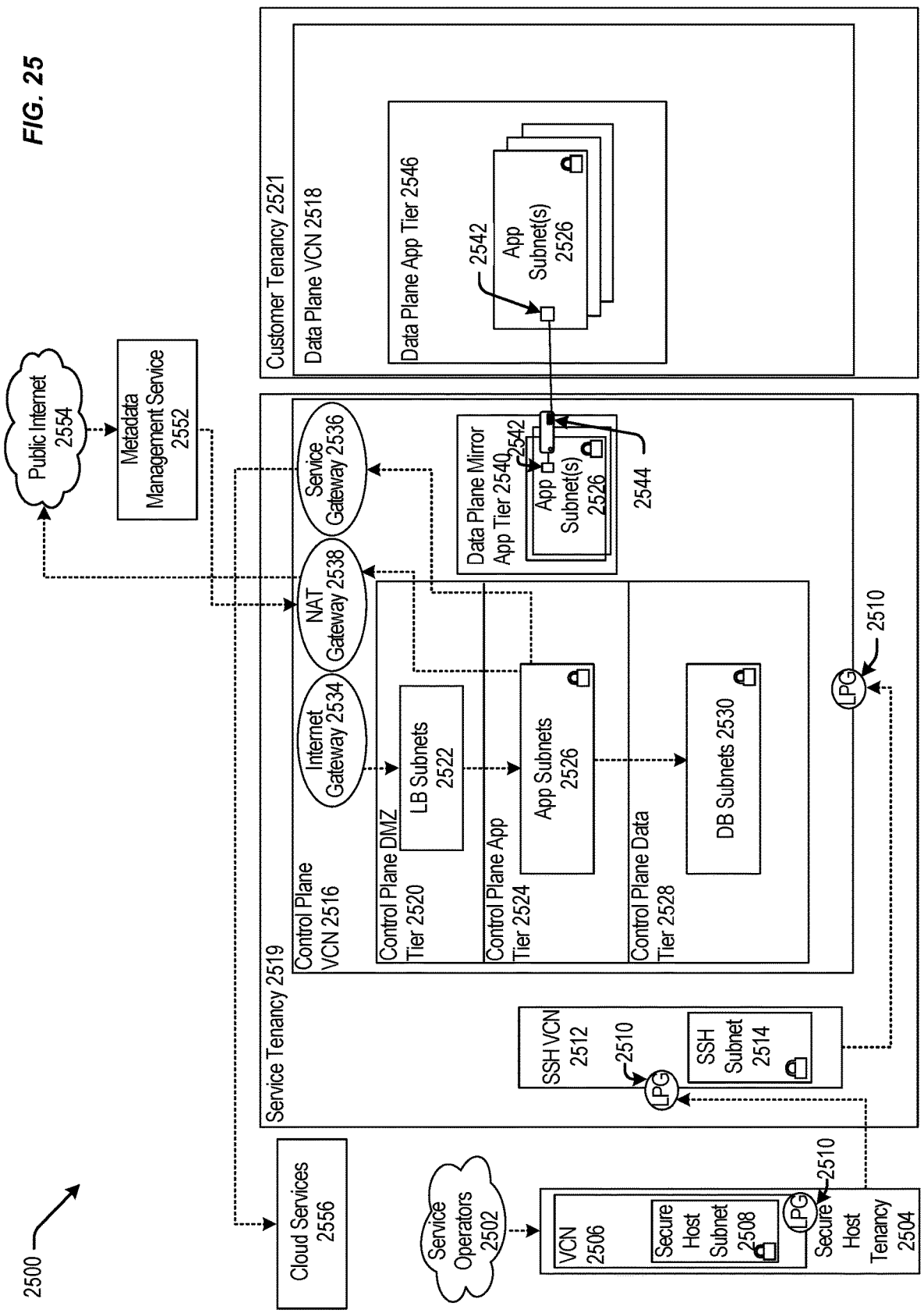
FIG. 25 is a block diagram illustrating another pattern for implementing a cloud infrastructure as a service system, according to at least one embodiment.

FIG. 25 is a block diagram 2500 illustrating another example pattern of an IaaS architecture, according to at least one embodiment. Service operators 2502 (e.g., service operators 2402 of FIG. 24) can be communicatively coupled to a secure host tenancy 2504 (e.g., the secure host tenancy 2404 of FIG. 24) that can include a virtual cloud network (VCN) 2506 (e.g., the VCN 2406 of FIG. 24) and a secure host subnet 2508 (e.g., the secure host subnet 2408 of FIG. 24). The VCN 2506 can include a local peering gateway (LPG) 2510 (e.g., the LPG 2410 of FIG. 24) that can be communicatively coupled to a secure shell (SSH) VCN 2512 (e.g., the SSH VCN 2412 of FIG. 24) via an LPG 2410 contained in the SSH VCN 2512. The SSH VCN 2512 can include an SSH subnet 2514 (e.g., the SSH subnet 2414 of FIG. 24), and the SSH VCN 2512 can be communicatively coupled to a control plane VCN 2516 (e.g., the control plane VCN 2416 of FIG. 24) via an LPG 2510 contained in the control plane VCN 2516. The control plane VCN 2516 can be contained in a service tenancy 2519 (e.g., the service tenancy 2419 of FIG. 24), and the data plane VCN 2518 (e.g., the data plane VCN 2418 of FIG. 24) can be contained in a customer tenancy 2521 that may be owned or operated by users, or customers, of the system.

The control plane VCN 2516 can include a control plane DMZ tier 2520 (e.g., the control plane DMZ tier 2420 of FIG. 24) that can include LB subnet(s) 2522 (e.g., LB subnet(s) 2422 of FIG. 24), a control plane app tier 2524 (e.g., the control plane app tier 2424 of FIG. 24) that can include app subnet(s) 2526 (e.g., app subnet(s) 2426 of FIG. 24), a control plane data tier 2528 (e.g., the control plane data tier 2428 of FIG. 24) that can include database (DB) subnet(s) 2530 (e.g., similar to DB subnet(s) 2430 of FIG. 24). The LB subnet(s) 2522 contained in the control plane DMZ tier 2520 can be communicatively coupled to the app subnet(s) 2526 contained in the control plane app tier 2524 and an Internet gateway 2534 (e.g., the Internet gateway 2434 of FIG. 24) that can be contained in the control plane VCN 2516, and the app subnet(s) 2526 can be communicatively coupled to the DB subnet(s) 2530 contained in the control plane data tier 2528 and a service gateway 2536 (e.g., the service gateway 2436 of FIG. 24) and a network address translation (NAT) gateway 2538 (e.g., the NAT gateway 2438 of FIG. 24). The control plane VCN 2516 can include the service gateway 2536 and the NAT gateway 2538.

The control plane VCN 2516 can include a data plane mirror app tier 2540 (e.g., the data plane mirror app tier 2440 of FIG. 24) that can include app subnet(s) 2526. The app subnet(s) 2526 contained in the data plane mirror app tier 2540 can include a virtual network interface controller (VNIC) 2542 (e.g., the VNIC of 2442) that can execute a compute instance 2544 (e.g., similar to the compute instance 2444 of FIG. 24). The compute instance 2544 can facilitate communication between the app subnet(s) 2526 of the data plane mirror app tier 2540 and the app subnet(s) 2526 that can be contained in a data plane app tier 2546 (e.g., the data plane app tier 2446 of FIG. 24) via the VNIC 2542 contained in the data plane mirror app tier 2540 and the VNIC 2542 contained in the data plane app tier 2546.

The Internet gateway 2534 contained in the control plane VCN 2516 can be communicatively coupled to a metadata management service 2552 (e.g., the metadata management service 2452 of FIG. 24) that can be communicatively coupled to public Internet 2554 (e.g., public Internet 2454 of FIG. 24). Public Internet 2554 can be communicatively coupled to the NAT gateway 2538 contained in the control plane VCN 2516. The service gateway 2536 contained in the control plane VCN 2516 can be communicatively coupled to cloud services 2556 (e.g., cloud services 2456 of FIG. 24).

In some examples, the data plane VCN 2518 can be contained in the customer tenancy 2521. In this case, the IaaS provider may provide the control plane VCN 2516 for each customer, and the IaaS provider may, for each customer, set up a unique compute instance 2544 that is contained in the service tenancy 2519. Each compute instance 2544 may allow communication between the control plane VCN 2516, contained in the service tenancy 2519, and the data plane VCN 2518 that is contained in the customer tenancy 2521. The compute instance 2544 may allow resources, that are provisioned in the control plane VCN 2516 that is contained in the service tenancy 2519, to be deployed or otherwise used in the data plane VCN 2518 that is contained in the customer tenancy 2521.

In other examples, the customer of the IaaS provider may have databases that live in the customer tenancy 2521. In this example, the control plane VCN 2516 can include the data plane mirror app tier 2540 that can include app subnet(s) 2526. The data plane mirror app tier 2540 can reside in the data plane VCN 2518, but the data plane mirror app tier 2540 may not live in the data plane VCN 2518. That is, the data plane mirror app tier 2540 may have access to the customer tenancy 2521, but the data plane mirror app tier 2540 may not exist in the data plane VCN 2518 or be owned or operated by the customer of the IaaS provider. The data plane mirror app tier 2540 may be configured to make calls to the data plane VCN 2518 but may not be configured to make calls to any entity contained in the control plane VCN 2516. The customer may desire to deploy or otherwise use resources in the data plane VCN 2518 that are provisioned in the control plane VCN 2516, and the data plane mirror app tier 2540 can facilitate the desired deployment, or other usage of resources, of the customer.

In some embodiments, the customer of the IaaS provider can apply filters to the data plane VCN 2518. In this embodiment, the customer can determine what the data plane VCN 2518 can access, and the customer may restrict access to public Internet 2554 from the data plane VCN 2518. The IaaS provider may not be able to apply filters or otherwise control access of the data plane VCN 2518 to any outside networks or databases. Applying filters and controls by the customer onto the data plane VCN 2518, contained in the customer tenancy 2521, can help isolate the data plane VCN 2518 from other customers and from public Internet 2554.

In some embodiments, cloud services 2556 can be called by the service gateway 2536 to access services that may not exist on public Internet 2554, on the control plane VCN 2516, or on the data plane VCN 2518. The connection between cloud services 2556 and the control plane VCN 2516 or the data plane VCN 2518 may not be live or continuous. Cloud services 2556 may exist on a different network owned or operated by the IaaS provider. Cloud services 2556 may be configured to receive calls from the service gateway 2536 and may be configured to not receive calls from public Internet 2554. Some cloud services 2556 may be isolated from other cloud services 2556, and the control plane VCN 2516 may be isolated from cloud services 2556 that may not be in the same region as the control plane VCN 2516. For example, the control plane VCN 2516 may be located in "Region 1," and cloud service "Deployment 24," may be located in Region 1 and in "Region 2." If a call to Deployment 24 is made by the service gateway 2536 contained in the control plane VCN 2516 located in Region 1, the call may be transmitted to Deployment 24 in Region 1. In this example, the control plane VCN 2516, or Deployment 24 in Region 1, may not be communicatively coupled to, or otherwise in communication with, Deployment 24 in Region 2.

Figure 26:
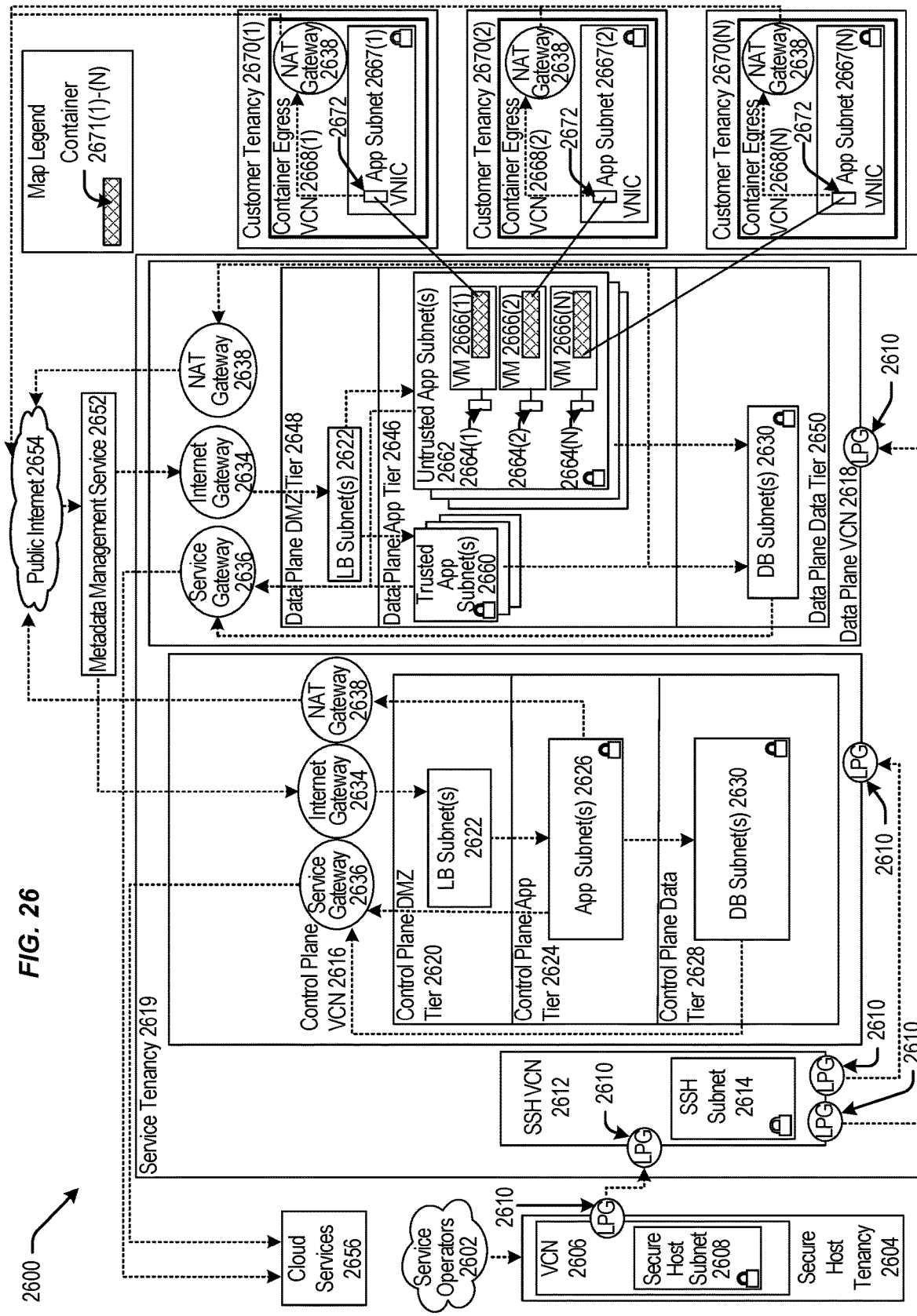
FIG. 26 is a block diagram illustrating another pattern for implementing a cloud infrastructure as a service system, according to at least one embodiment.

FIG. 26 is a block diagram 2600 illustrating another example pattern of an IaaS architecture, according to at least one embodiment. Service operators 2602 (e.g., service operators 2402 of FIG. 24) can be communicatively coupled to a secure host tenancy 2604 (e.g., the secure host tenancy 2404 of FIG. 24) that can include a virtual cloud network (VCN) 2606 (e.g., the VCN 2406 of FIG. 24) and a secure host subnet 2608 (e.g., the secure host subnet 2408 of FIG. 24). The VCN 2606 can include an LPG 2610 (e.g., the LPG 2410 of FIG. 24) that can be communicatively coupled to an SSH VCN 2612 (e.g., the SSH VCN 2412 of FIG. 24) via an LPG 2610 contained in the SSH VCN 2612. The SSH VCN 2612 can include an SSH subnet 2614 (e.g., the SSH subnet 2414 of FIG. 24), and the SSH VCN 2612 can be communicatively coupled to a control plane VCN 2616 (e.g., the control plane VCN 2416 of FIG. 24) via an LPG 2610 contained in the control plane VCN 2616 and to a data plane VCN 2618 (e.g., the data plane 2418 of FIG. 24) via an LPG 2610 contained in the data plane VCN 2618. The control plane VCN 2616 and the data plane VCN 2618 can be contained in a service tenancy 2619 (e.g., the service tenancy 2419 of FIG. 24).

The control plane VCN 2616 can include a control plane DMZ tier 2620 (e.g., the control plane DMZ tier 2420 of FIG. 24) that can include load balancer (LB) subnet(s) 2622 (e.g., LB subnet(s) 2422 of FIG. 24), a control plane app tier 2624 (e.g., the control plane app tier 2424 of FIG. 24) that can include app subnet(s) 2626 (e.g., similar to app subnet(s) 2426 of FIG. 24), a control plane data tier 2628 (e.g., the control plane data tier 2428 of FIG. 24) that can include DB subnet(s) 2630. The LB subnet(s) 2622 contained in the control plane DMZ tier 2620 can be communicatively coupled to the app subnet(s) 2626 contained in the control plane app tier 2624 and to an Internet gateway 2634 (e.g., the Internet gateway 2434 of FIG. 24) that can be contained in the control plane VCN 2616, and the app subnet(s) 2626 can be communicatively coupled to the DB subnet(s) 2630 contained in the control plane data tier 2628 and to a service gateway 2636 (e.g., the service gateway of FIG. 24) and a network address translation (NAT) gateway 2638 (e.g., the NAT gateway 2438 of FIG. 24). The control plane VCN 2616 can include the service gateway 2636 and the NAT gateway 2638.

The data plane VCN 2618 can include a data plane app tier 2646 (e.g., the data plane app tier 2446 of FIG. 24), a data plane DMZ tier 2648 (e.g., the data plane DMZ tier 2448 of FIG. 24), and a data plane data tier 2650 (e.g., the data plane data tier 2450 of FIG. 24). The data plane DMZ tier 2648 can include LB subnet(s) 2622 that can be communicatively coupled to trusted app subnet(s) 2660 and untrusted app subnet(s) 2662 of the data plane app tier 2646 and the Internet gateway 2634 contained in the data plane VCN 2618. The trusted app subnet(s) 2660 can be communicatively coupled to the service gateway 2636 contained in the data plane VCN 2618, the NAT gateway 2638 contained in the data plane VCN 2618, and DB subnet(s) 2630 contained in the data plane data tier 2650. The untrusted app subnet(s) 2662 can be communicatively coupled to the service gateway 2636 contained in the data plane VCN 2618 and DB subnet(s) 2630 contained in the data plane data tier 2650. The data plane data tier 2650 can include DB subnet(s) 2630 that can be communicatively coupled to the service gateway 2636 contained in the data plane VCN 2618.

The untrusted app subnet(s) 2662 can include one or more primary VNICs 2664(1)-(N) that can be communicatively coupled to tenant virtual machines (VMs) 2666(1)-(N). Each tenant VM 2666(1)-(N) can be communicatively coupled to a respective app subnet 2667(1)-(N) that can be contained in respective container egress VCNs 2668(1)-(N) that can be contained in respective customer tenancies 2670(1)-(N). Respective secondary VNICs 2672(1)-(N) can facilitate communication between the untrusted app subnet(s) 2662 contained in the data plane VCN 2618 and the app subnet contained in the container egress VCNs 2668(1)-(N). Each container egress VCNs 2668(1)-(N) can include a NAT gateway 2638 that can be communicatively coupled to public Internet 2654 (e.g., public Internet 2454 of FIG. 24).

The Internet gateway 2634 contained in the control plane VCN 2616 and contained in the data plane VCN 2618 can be communicatively coupled to a metadata management service 2652 (e.g., the metadata management system 2452 of FIG. 24) that can be communicatively coupled to public Internet 2654. Public Internet 2654 can be communicatively coupled to the NAT gateway 2638 contained in the control plane VCN 2616 and contained in the data plane VCN 2618. The service gateway 2636 contained in the control plane VCN 2616 and contained in the data plane VCN 2618 can be communicatively coupled to cloud services 2656.

In some embodiments, the data plane VCN 2618 can be integrated with customer tenancies 2670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 2646. Code to run the function may be executed in the VMs 2666(1)-(N), and the code may not be configured to run anywhere else on the data plane VCN 2618. Each VM 2666(1)-(N) may be connected to one customer tenancy 2670. Respective containers 2671(1)-(N) contained in the VMs 2666(1)-(N) may be configured to run the code. In this case, there can be a dual isolation (e.g., the containers 2671(1)-(N) running code, where the containers 2671(1)-(N) may be contained in at least the VM 2666(1)-(N) that are contained in the untrusted app subnet(s) 2662), which may help prevent incorrect or otherwise undesirable code from damaging the network of the IaaS provider or from damaging a network of a different customer. The containers 2671(1)-(N) may be communicatively coupled to the customer tenancy 2670 and may be configured to transmit or receive data from the customer tenancy 2670. The containers 2671(1)-(N) may not be configured to transmit or receive data from any other entity in the data plane VCN 2618. Upon completion of running the code, the IaaS provider may kill or otherwise dispose of the containers 2671(1)-(N).

In some embodiments, the trusted app subnet(s) 2660 may run code that may be owned or operated by the IaaS provider. In this embodiment, the trusted app subnet(s) 2660 may be communicatively coupled to the DB subnet(s) 2630 and be configured to execute CRUD operations in the DB subnet(s) 2630. The untrusted app subnet(s) 2662 may be communicatively coupled to the DB subnet(s) 2630, but in this embodiment, the untrusted app subnet(s) may be configured to execute read operations in the DB subnet(s) 2630. The containers 2671(1)-(N) that can be contained in the VM 2666(1)-(N) of each customer and that may run code from the customer may not be communicatively coupled with the DB subnet(s) 2630.

In other embodiments, the control plane VCN 2616 and the data plane VCN 2618 may not be directly communicatively coupled. In this embodiment, there may be no direct communication between the control plane VCN 2616 and the data plane VCN 2618. However, communication can occur indirectly through at least one method. An LPG 2610 may be established by the IaaS provider that can facilitate communication between the control plane VCN 2616 and the data plane VCN 2618. In another example, the control plane VCN 2616 or the data plane VCN 2618 can make a call to cloud services 2656 via the service gateway 2636. For example, a call to cloud services 2656 from the control plane VCN 2616 can include a request for a service that can communicate with the data plane VCN 2618.

Figure 27:
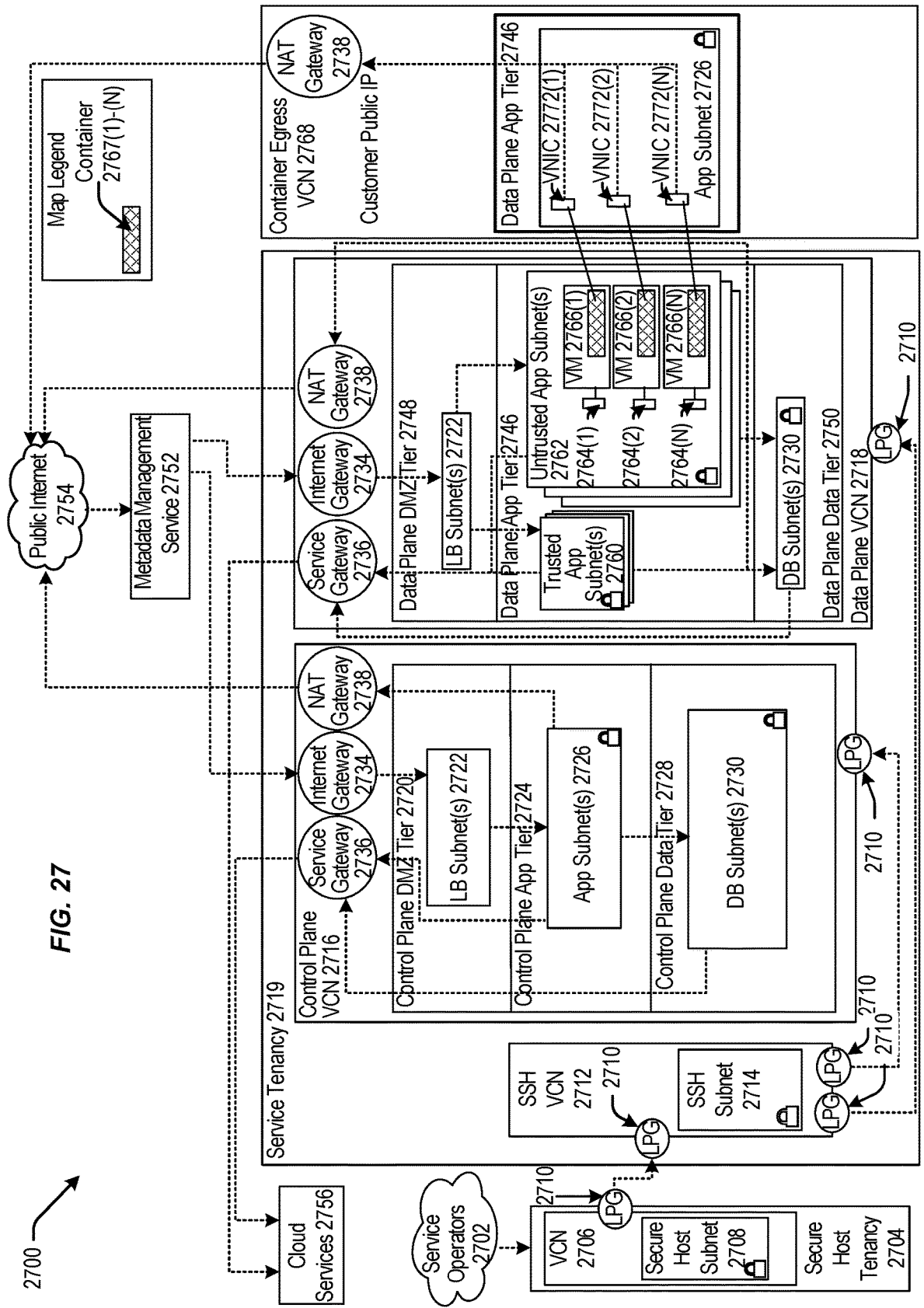
FIG. 27 is a block diagram illustrating another pattern for implementing a cloud infrastructure as a service system, according to at least one embodiment.
Figure 28:
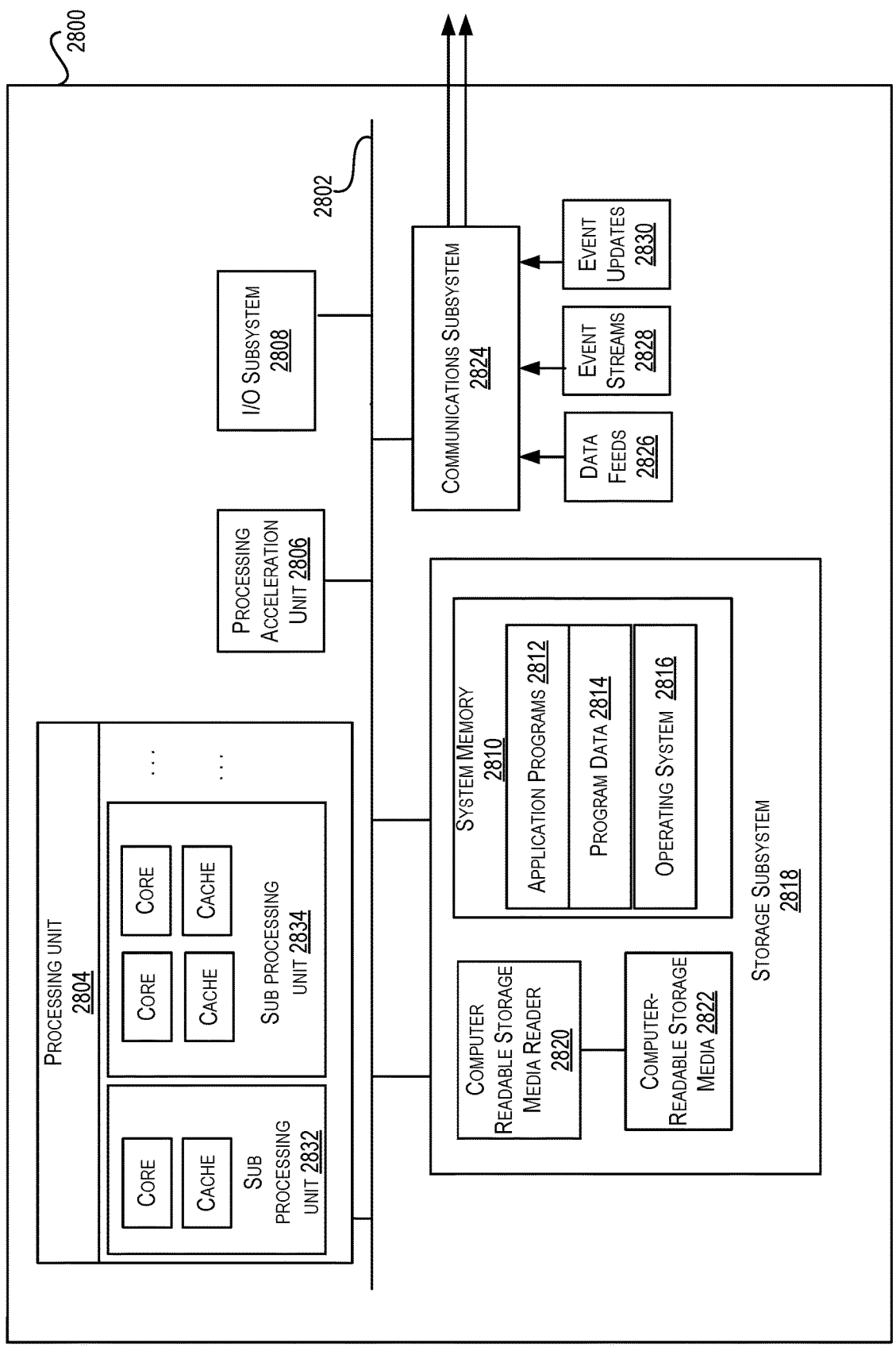
FIG. 28 is a block diagram illustrating an example computer system, according to at least one embodiment.

FIG. 27 is a block diagram 2700 illustrating another example pattern of an IaaS architecture, according to at least one embodiment. Service operators 2702 (e.g., service operators 2402 of FIG. 24) can be communicatively coupled to a secure host tenancy 2704 (e.g., the secure host tenancy 2404 of FIG. 24) that can include a virtual cloud network (VCN) 2706 (e.g., the VCN 2406 of FIG. 24) and a secure host subnet 2708 (e.g., the secure host subnet 2408 of FIG. 24). The VCN 2706 can include an LPG 2710 (e.g., the LPG 2410 of FIG. 24) that can be communicatively coupled to an SSH VCN 2712 (e.g., the SSH VCN 2412 of FIG. 24) via an LPG 2710 contained in the SSH VCN 2712. The SSH VCN 2712 can include an SSH subnet 2714 (e.g., the SSH subnet 2414 of FIG. 24), and the SSH VCN 2712 can be communicatively coupled to a control plane VCN 2716 (e.g., the control plane VCN 2416 of FIG. 24) via an LPG 2710 contained in the control plane VCN 2716 and to a data plane VCN 2718 (e.g., the data plane 2418 of FIG. 24) via an LPG 2710 contained in the data plane VCN 2718. The control plane VCN 2716 and the data plane VCN 2718 can be contained in a service tenancy 2719 (e.g., the service tenancy 2419 of FIG. 24).

The control plane VCN 2716 can include a control plane DMZ tier 2720 (e.g., the control plane DMZ tier 2420 of FIG. 24) that can include LB subnet(s) 2722 (e.g., LB subnet(s) 2422 of FIG. 24), a control plane app tier 2724 (e.g., the control plane app tier 2424 of FIG. 24) that can include app subnet(s) 2726 (e.g., app subnet(s) 2426 of FIG. 24), a control plane data tier 2728 (e.g., the control plane data tier 2428 of FIG. 24) that can include DB subnet(s) 2730 (e.g., DB subnet(s) 2630 of FIG. 26). The LB subnet(s) 2722 contained in the control plane DMZ tier 2720 can be communicatively coupled to the app subnet(s) 2726 contained in the control plane app tier 2724 and to an Internet gateway 2734 (e.g., the Internet gateway 2434 of FIG. 24) that can be contained in the control plane VCN 2716, and the app subnet(s) 2726 can be communicatively coupled to the DB subnet(s) 2730 contained in the control plane data tier 2728 and to a service gateway 2736 (e.g., the service gateway of FIG. 24) and a network address translation (NAT) gateway 2738 (e.g., the NAT gateway 2438 of FIG. 24). The control plane VCN 2716 can include the service gateway 2736 and the NAT gateway 2738.

The data plane VCN 2718 can include a data plane app tier 2746 (e.g., the data plane app tier 2446 of FIG. 24), a data plane DMZ tier 2748 (e.g., the data plane DMZ tier 2448 of FIG. 24), and a data plane data tier 2750 (e.g., the data plane data tier 2450 of FIG. 24). The data plane DMZ tier 2748 can include LB subnet(s) 2722 that can be communicatively coupled to trusted app subnet(s) 2760 (e.g., trusted app subnet(s) 2660 of FIG. 26) and untrusted app subnet(s) 2762 (e.g., untrusted app subnet(s) 2662 of FIG. 26) of the data plane app tier 2746 and the Internet gateway 2734 contained in the data plane VCN 2718. The trusted app subnet(s) 2760 can be communicatively coupled to the service gateway 2736 contained in the data plane VCN 2718, the NAT gateway 2738 contained in the data plane VCN 2718, and DB subnet(s) 2730 contained in the data plane data tier 2750. The untrusted app subnet(s) 2762 can be communicatively coupled to the service gateway 2736 contained in the data plane VCN 2718 and DB subnet(s) 2730 contained in the data plane data tier 2750. The data plane data tier 2750 can include DB subnet(s) 2730 that can be communicatively coupled to the service gateway 2736 contained in the data plane VCN 2718.

The untrusted app subnet(s) 2762 can include primary VNICs 2764(1)-(N) that can be communicatively coupled to tenant virtual machines (VMs) 2766(1)-(N) residing within the untrusted app subnet(s) 2762. Each tenant VM 2766(1)-(N) can run code in a respective container 2767(1)-(N), and be communicatively coupled to an app subnet 2726 that can be contained in a data plane app tier 2746 that can be contained in a container egress VCN 2768. Respective secondary VNICs 2772(1)-(N) can facilitate communication between the untrusted app subnet(s) 2762 contained in the data plane VCN 2718 and the app subnet contained in the container egress VCN 2768. The container egress VCN can include a NAT gateway 2738 that can be communicatively coupled to public Internet 2754 (e.g., public Internet 2454 of FIG. 24).

The Internet gateway 2734 contained in the control plane VCN 2716 and contained in the data plane VCN 2718 can be communicatively coupled to a metadata management service 2752 (e.g., the metadata management system 2452 of FIG. 24) that can be communicatively coupled to public Internet 2754. Public Internet 2754 can be communicatively coupled to the NAT gateway 2738 contained in the control plane VCN 2716 and contained in the data plane VCN 2718. The service gateway 2736 contained in the control plane VCN 2716 and contained in the data plane VCN 2718 can be communicatively coupled to cloud services 2756.

In some examples, the pattern illustrated by the architecture of block diagram 2700 of FIG. 27 may be considered an exception to the pattern illustrated by the architecture of block diagram 2600 of FIG. 26 and may be desirable for a customer of the IaaS provider if the IaaS provider cannot directly communicate with the customer (e.g., a disconnected region). The respective containers 2767(1)-(N) that are contained in the VMs 2766(1)-(N) for each customer can be accessed in real-time by the customer. The containers 2767(1)-(N) may be configured to make calls to respective secondary VNICs 2772(1)-(N) contained in app subnet(s) 2726 of the data plane app tier 2746 that can be contained in the container egress VCN 2768. The secondary VNICs 2772(1)-(N) can transmit the calls to the NAT gateway 2738 that may transmit the calls to public Internet 2754. In this example, the containers 2767(1)-(N) that can be accessed in real-time by the customer can be isolated from the control plane VCN 2716 and can be isolated from other entities contained in the data plane VCN 2718. The containers 2767(1)-(N) may also be isolated from resources from other customers.

In other examples, the customer can use the containers 2767(1)-(N) to call cloud services 2756. In this example, the customer may run code in the containers 2767(1)-(N) that requests a service from cloud services 2756. The containers 2767(1)-(N) can transmit this request to the secondary VNICs 2772(1)-(N) that can transmit the request to the NAT gateway that can transmit the request to public Internet 2754. Public Internet 2754 can transmit the request to LB subnet(s) 2722 contained in the control plane VCN 2716 via the Internet gateway 2734. In response to determining the request is valid, the LB subnet(s) can transmit the request to app subnet(s) 2726 that can transmit the request to cloud services 2756 via the service gateway 2736.

It should be appreciated that IaaS architectures 2400, 2500, 2600, 2700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 28 illustrates an example computer system 2800, in which various embodiments may be implemented. The system 2800 may be used to implement any of the computer systems described above. As shown in the figure, computer system 2800 includes a processing unit 2804 that communicates with a number of peripheral subsystems via a bus subsystem 2802. These peripheral subsystems may include a processing acceleration unit 2806, an I/O subsystem 2808, a storage subsystem 2818 and a communications subsystem 2824. Storage subsystem 2818 includes tangible computer-readable storage media 2822 and a system memory 2810.

Bus subsystem 2802 provides a mechanism for letting the various components and subsystems of computer system 2800 communicate with each other as intended. Although bus subsystem 2802 is shown schematically as a single bus, alternative embodiments of the bus subsystem may utilize multiple buses. Bus subsystem 2802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2804, which can be implemented as one or more integrated circuits (e.g., a conventional microprocessor or microcontroller), controls the operation of computer system 2800. One or more processors may be included in processing unit 2804. These processors may include single core or multicore processors. In certain embodiments, processing unit 2804 may be implemented as one or more independent processing units 2832 and/or 2834 with single or multicore processors included in each processing unit. In other embodiments, processing unit 2804 may also be implemented as a quad-core processing unit formed by integrating two dual-core processors into a single chip.

In various embodiments, processing unit 2804 can execute a variety of programs in response to program code and can maintain multiple concurrently executing programs or processes. At any given time, some or all of the program code to be executed can be resident in processor(s) 2804 and/or in storage subsystem 2818. Through suitable programming, processor(s) 2804 can provide various functionalities described above. Computer system 2800 may additionally include a processing acceleration unit 2806, which can include a digital signal processor (DSP), a special-purpose processor, and/or the like.

I/O subsystem 2808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2800 may comprise a storage subsystem 2818 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2804 provide the functionality described above. Storage subsystem 2818 may also provide a repository for storing data used in accordance with the present disclosure.

As depicted in the example in FIG. 28, storage subsystem 2818 can include various components including a system memory 2810, computer-readable storage media 2822, and a computer readable storage media reader 2820. System memory 2810 may store program instructions that are loadable and executable by processing unit 2804. System memory 2810 may also store data that is used during the execution of the instructions and/or data that is generated during the execution of the program instructions. Various different kinds of programs may be loaded into system memory 2810 including but not limited to client applications, Web browsers, mid-tier applications, relational database management systems (RDBMS), virtual machines, containers, etc.

System memory 2810 may also store an operating system 2816. Examples of operating system 2816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2800 executes one or more virtual machines, the virtual machines along with their guest operating systems (GOSs) may be loaded into system memory 2810 and executed by one or more processors or cores of processing unit 2804.

System memory 2810 can come in different configurations depending upon the type of computer system 2800. For example, system memory 2810 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 2810 may include a basic input/output system (BIOS) containing basic routines that help to transfer information between elements within computer system 2800, such as during start-up.

Computer-readable storage media 2822 may represent remote, local, fixed, and/or removable storage devices plus storage media for temporarily and/or more permanently containing, storing, computer-readable information for use by computer system 2800 including instructions executable by processing unit 2804 of computer system 2800.

Computer-readable storage media 2822 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2822 may include, but is not limited to, Zip® drives, flash memory cards, universal serial bus (USB) flash drives, secure digital (SD) cards, DVD disks, digital video tape, and the like. Computer-readable storage media 2822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2800.

Machine-readable instructions executable by one or more processors or cores of processing unit 2804 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2824 provides an interface to other computer systems and networks. Communications subsystem 2824 serves as an interface for receiving data from and transmitting data to other systems from computer system 2800. For example, communications subsystem 2824 may enable computer system 2800 to connect to one or more devices via the Internet. In some embodiments communications subsystem 2824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2824 can provide wired network connectivity (e.g., Ethernet) in addition to or instead of a wireless interface.

In some embodiments, communications subsystem 2824 may also receive input communication in the form of structured and/or unstructured data feeds 2826, event streams 2828, event updates 2830, and the like on behalf of one or more users who may use computer system 2800.

By way of example, communications subsystem 2824 may be configured to receive data feeds 2826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2824 may also be configured to receive data in the form of continuous data streams, which may include event streams 2828 of real-time events and/or event updates 2830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2824 may also be configured to output the structured and/or unstructured data feeds 2826, event streams 2828, event updates 2830, and the like to one or more databases that may be in communication with one or more streaming data source computers coupled to computer system 2800.

Computer system 2800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    creating a first virtual private label cloud (vPLC) for a first reseller based upon a cloud service provider (CSP)-provided infrastructure in a region, wherein creating the first vPLC comprises allocating a first portion of the CSP-provided infrastructure to the first vPLC;
    creating a second vPLC for a second reseller based upon the CSP-provided infrastructure, wherein creating the second vPLC comprises allocating a second portion of the CSP-provided infrastructure to the second vPLC;
    using the first vPLC to provide one or more first reseller-offered cloud services to one or more customers of the first reseller;
    using the second vPLC to provide one or more second reseller-offered cloud services to one or more customers of the second reseller;
    creating a first set of metadata customization instructions for the first vPLC;
    creating a second set of metadata customization instructions for the second vPLC;
    generating a first customized metadata associated with the first vPLC based at least upon the first set of metadata customization instructions; and
    generating a second customized metadata associated with the second vPLC based at least upon the second set of metadata customization instructions.

2. The method of claim 1, wherein the first set of metadata customization instructions for the first vPLC is different from the second set of metadata customization instructions for the second vPLC.

3. The method of claim 1, wherein generating the first customized metadata associated with the first vPLC is performed independent of generating the second customized metadata associated with the second vPLC.

4. The method of claim 1, wherein generating the first customized metadata associated with the first vPLC occurs before receiving a request for the first customized metadata associated with the first vPLC.

5. The method of claim 4, further comprising storing the first customized metadata associated with the first vPLC in a repository before receiving the request.

6. The method of claim 4, wherein generating the first customized metadata associated with the first vPLC comprises:
    obtaining a raw metadata associated with the first vPLC before receiving the request; and
    applying the first set of metadata customization instructions to the obtained raw metadata associated with the first vPLC before receiving the request.

7. The method of claim 1, wherein generating the first customized metadata associated with the first vPLC occurs upon receiving a request for the first customized metadata associated with the first vPLC.

8. The method of claim 7, wherein generating the first customized metadata associated with the first vPLC comprises:
    obtaining a raw metadata associated with the first vPLC upon receiving the request; and
    applying the first set of metadata customization instructions to the obtained raw metadata associated with the first vPLC.

9. The method of claim 7, wherein generating the first customized metadata associated with the first vPLC comprises:
    obtaining a raw metadata associated with the first vPLC before receiving the request; and
    applying the first set of metadata customization instructions to the obtained raw metadata associated with the first vPLC upon receiving the request.

10. The method of claim 9, further comprising storing the first customized metadata associated with the first vPLC in a repository before receiving the request.

11. A non-transitory computer-readable medium storing computer-executable instructions that, when executed by one or more processors, cause the one or more processors to perform operations comprising:
    creating a first virtual private label cloud (vPLC) for a first reseller based upon a cloud service provider (CSP)-provided infrastructure in a region, wherein creating the first vPLC comprises allocating a first portion of the CSP-provided infrastructure to the first vPLC;
    creating a second vPLC for a second reseller based upon the CSP-provided infrastructure, wherein creating the second vPLC comprises allocating a second portion of the CSP-provided infrastructure to the second vPLC;
    using the first vPLC to provide one or more first reseller-offered cloud services to one or more customers of the first reseller;
    using the second vPLC to provide one or more second reseller-offered cloud services to one or more customers of the second reseller;
    creating a first set of metadata customization instructions for the first vPLC;
    creating a second set of metadata customization instructions for the second vPLC;
    generating a first customized metadata associated with the first vPLC based at least upon the first set of metadata customization instructions; and
    generating a second customized metadata associated with the second vPLC based at least upon the second set of metadata customization instructions.

12. The non-transitory computer-readable medium of claim 11, wherein the first set of metadata customization instructions for the first vPLC is different from the second set of metadata customization instructions for the second vPLC.

13. The non-transitory computer-readable medium of claim 11,
wherein generating the first customized metadata associated with the first vPLC occurs before receiving a request for the first customized metadata associated with the first vPLC; and
wherein generating the first customized metadata associated with the first vPLC comprises:
obtaining a raw metadata associated with the first vPLC before receiving the request; and
applying the first set of metadata customization instructions to the obtained raw metadata associated with the first vPLC before receiving the request.

14. The non-transitory computer-readable medium of claim 11,
wherein generating the first customized metadata associated with the first vPLC occurs upon receiving a request for the first customized metadata associated with the first vPLC; and
wherein generating the first customized metadata associated with the first vPLC comprises:
obtaining a raw metadata associated with the first vPLC upon receiving the request; and
applying the first set of metadata customization instructions to the obtained raw metadata associated with the first vPLC.

15. The non-transitory computer-readable medium of claim 11,
wherein generating the first customized metadata associated with the first vPLC occurs upon receiving a request for the first customized metadata associated with the first vPLC; and
wherein generating the first customized metadata associated with the first vPLC comprises:
obtaining a raw metadata associated with the first vPLC before receiving the request; and
applying the first set of metadata customization instructions to the obtained raw metadata associated with the first vPLC upon receiving the request.

16. A system, comprising:
one or more processors; and
one or more memories storing computer-executable instructions that, when executed by the one or more processors, cause the system to:
create a first virtual private label cloud (vPLC) for a first reseller based upon a cloud service provider (CSP)-provided infrastructure in a region, wherein creating the first vPLC comprises allocating a first portion of the CSP-provided infrastructure to the first vPLC;
create a second vPLC for a second reseller based upon the CSP-provided infrastructure, wherein creating the second vPLC comprises allocating a second portion of the CSP-provided infrastructure to the second vPLC;
use the first vPLC to provide one or more first reseller-offered cloud services to one or more customers of the first reseller;
use the second vPLC to provide one or more second reseller-offered cloud services to one or more customers of the second reseller;
create a first set of metadata customization instructions for the first vPLC;
create a second set of metadata customization instructions for the second vPLC;
generate a first customized metadata associated with the first vPLC based at least upon the first set of metadata customization instructions; and
generate a second customized metadata associated with the second vPLC based at least upon the second set of metadata customization instructions.

17. The system of claim 16, wherein generating the first customized metadata associated with the first vPLC is performed independent of generating the second customized metadata associated with the second vPLC.

18. The system of claim 16,
wherein generating the first customized metadata associated with the first vPLC occurs before receiving a request for the first customized metadata associated with the first vPLC; and
wherein generating the first customized metadata associated with the first vPLC comprises:
obtaining a raw metadata associated with the first vPLC before receiving the request; and
applying the first set of metadata customization instructions to the obtained raw metadata associated with the first vPLC before receiving the request.

19. The system of claim 16,
wherein generating the first customized metadata associated with the first vPLC occurs upon receiving a request for the first customized metadata associated with the first vPLC; and
wherein generating the first customized metadata associated with the first vPLC comprises:
obtaining a raw metadata associated with the first vPLC upon receiving the request; and
applying the first set of metadata customization instructions to the obtained raw metadata associated with the first vPLC.

20. The system of claim 16,
wherein generating the first customized metadata associated with the first vPLC occurs upon receiving a request for the first customized metadata associated with the first vPLC; and
wherein generating the first customized metadata associated with the first vPLC comprises:
obtaining a raw metadata associated with the first vPLC before receiving the request; and
applying the first set of metadata customization instructions to the obtained raw metadata associated with the first vPLC upon receiving the request.

* * * * *